(12) United States Patent
Hamerly et al.

(10) Patent No.: US 11,604,978 B2
(45) Date of Patent: Mar. 14, 2023

(54) LARGE-SCALE ARTIFICIAL NEURAL-NETWORK ACCELERATORS BASED ON COHERENT DETECTION AND OPTICAL DATA FAN-OUT

(71) Applicant: Massachusetts Institute of Technology, Cambridge, MA (US)

(72) Inventors: Ryan Hamerly, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 785 days.

(21) Appl. No.: 16/681,284

(22) Filed: Nov. 12, 2019

(65) Prior Publication Data

US 2021/0357737 A1 Nov. 18, 2021

Related U.S. Application Data

(60) Provisional application No. 62/798,267, filed on Jan. 29, 2019, provisional application No. 62/758,735, filed on Nov. 12, 2018.

(51) Int. Cl.
*G06N 3/067* (2006.01)
*G06N 3/04* (2006.01)

(52) U.S. Cl.
CPC ............ *G06N 3/0675* (2013.01); *G06N 3/04* (2013.01); *G06N 3/067* (2013.01)

(58) Field of Classification Search
CPC ......... G06N 3/0675; G06N 3/04; G06N 3/067
(Continued)

(56) References Cited

U.S. PATENT DOCUMENTS 4,567,569 A 1/1986 Caulfield et al.
4,633,428 A 12/1986 Byron
(Continued)

FOREIGN PATENT DOCUMENTS

CN 101630178 A 1/2010
WO 1991007714 A1 5/1991
(Continued)

OTHER PUBLICATIONS

International Search Report and Written Opinion in International Patent Application No. PCT/US2019/060935 dated Mar. 10, 2020, 16 pages.
(Continued)

*Primary Examiner* — Collin X Beatty
(74) *Attorney, Agent, or Firm* — Smith Baluch LLP

(57) ABSTRACT

Deep learning performance is limited by computing power, which is in turn limited by energy consumption. Optics can make neural networks faster and more efficient, but current schemes suffer from limited connectivity and the large footprint of low-loss nanophotonic devices. Our optical neural network architecture addresses these problems using homodyne detection and optical data fan-out. It is scalable to large networks without sacrificing speed or consuming too much energy. It can perform inference and training and work with both fully connected and convolutional neural-network layers. In our architecture, each neural network layer operates on inputs and weights encoded onto optical pulse amplitudes. A homodyne detector computes the vector product of the inputs and weights. The nonlinear activation function is performed electronically on the output of this linear homodyne detection step. Optical modulators combine the outputs from the nonlinear activation function and encode them onto optical pulses input into the next layer.

21 Claims, 27 Drawing Sheets

(58) Field of Classification Search
USPC .................................................... 359/237
See application file for complete search history.

(56) References Cited

U.S. PATENT DOCUMENTS

| | | | |
|---|---|---|---|
| 4,959,532 | A | 9/1990 | Owechko |
| 5,004,309 | A | 4/1991 | Caulfield et al. |
| 5,077,619 | A | 12/1991 | Toms |
| 5,095,459 | A | 3/1992 | Ohta et al. |
| 5,167,007 | A | 11/1992 | Toyoda |
| 5,297,232 | A | 3/1994 | Murphy |
| 5,428,711 | A | 6/1995 | Akiyama et al. |
| 5,699,449 | A | 12/1997 | Javidi |
| 5,784,309 | A | 7/1998 | Budil |
| 6,005,998 | A | 12/1999 | Lee |
| 7,173,272 | B2 | 2/2007 | Ralph |
| 7,660,533 | B1 | 2/2010 | Meyers et al. |
| 7,667,995 | B1 | 2/2010 | Leuenberger et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto et al. |
| 8,386,899 | B2 | 2/2013 | Goto et al. |
| 8,463,721 | B2 | 6/2013 | Prokhorov |
| 8,560,282 | B2 | 10/2013 | Macready et al. |
| 8,565,600 | B2 | 10/2013 | McGreer et al. |
| 8,604,944 | B2 | 12/2013 | Berkley et al. |
| 8,620,855 | B2 | 12/2013 | Bonderson |
| 8,837,544 | B2 | 9/2014 | Santori et al. |
| 9,250,391 | B2 | 2/2016 | McLaughlin et al. |
| 9,354,039 | B2 | 5/2016 | Mower et al. |
| 9,432,750 | B1 | 8/2016 | Li |
| 9,791,258 | B2 | 10/2017 | Mower et al. |
| 9,858,531 | B1 | 1/2018 | Monroe et al. |
| 10,268,232 | B2 | 4/2019 | Harris et al. |
| 10,359,272 | B2 | 7/2019 | Mower et al. |
| 10,608,663 | B2 | 3/2020 | Gould et al. |
| 10,619,993 | B2 | 4/2020 | Mower et al. |
| 10,634,851 | B2 | 4/2020 | Steinbrecher et al. |
| 10,768,659 | B2 | 9/2020 | Carolan et al. |
| 11,017,309 | B2 * | 5/2021 | Roques-Carmes .. G06N 3/0454 |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2005/0018295 | A1 | 1/2005 | Mendlovic et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2012/0171619 | A1 | 7/2012 | Heyderman et al. |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162798 | A1 | 6/2016 | Marandi et al. |
| 2016/0342887 | A1 | 11/2016 | Tieleman et al. |
| 2017/0031101 | A1 | 2/2017 | Miller |
| 2017/0285373 | A1 | 10/2017 | Zhang et al. |
| 2017/0302396 | A1 | 10/2017 | Tait et al. |
| 2017/0351293 | A1 | 12/2017 | Carolan et al. |
| 2018/0262291 | A1 | 9/2018 | Doster et al. |
| 2018/0267937 | A1 | 9/2018 | Pelc et al. |
| 2018/0274900 | A1 | 9/2018 | Mower et al. |
| 2018/0335574 | A1 | 11/2018 | Steinbrecher et al. |
| 2019/0019100 | A1 | 1/2019 | Roques-Carmes et al. |
| 2019/0244090 | A1 | 8/2019 | Englund |
| 2019/0266508 | A1 | 8/2019 | Bunyk et al. |
| 2019/0294199 | A1 | 9/2019 | Carolan et al. |
| 2019/0310070 | A1 | 10/2019 | Mower et al. |
| 2020/0018193 | A1 | 1/2020 | Neiser |
| 2020/0142441 | A1 * | 5/2020 | Bunandar ................ G02F 3/00 |
| 2020/0284989 | A1 | 9/2020 | Steinbrecher et al. |

FOREIGN PATENT DOCUMENTS

| | | |
|---|---|---|
| WO | 2005029404 A2 | 3/2005 |
| WO | 2006023067 A2 | 3/2006 |
| WO | 2008069490 A1 | 6/2008 |
| WO | 2018098230 A1 | 5/2018 |

OTHER PUBLICATIONS

Jarajreh et al., "Artificial neural network nonlinear equalizer for coherent optical OFDM." IEEE Photonics Technology Letters 27.4 (2014): 387-390.

Lahini, Y. et al., "Anderson Localization and Nonlinearity in One-Dimensional Disordered Photonic Lattices", Phys. Rev. Lett., 100, (Feb. 7, 2008), 4 pages.

Lahini, Y. et al., "Quantum Correlations in Two-Particle Anderson Localization", Phys. Rev. Lett., 105, (Oct. 15, 2010), p. 163905-1-163905-4.

Laing, A. et al., "High-fidelity operation of quantum photonic circuits", Applied Physics Letters, vol. 97, (2010), 5 pages.

Landauer, Irreversibility and heat generation in the computing process. IBM Journal of Research and Developments, 183-191 (1961).

Lanyon, B. P. et al., "Towards quantum chemistry on a quantum computer", Nature Chemistry 2, 106 (May 8, 2009), 20 pages.

Lawson et al., Basic linear algebra subprograms for Fortran usage. ACM Transactions on Mathematical Software (TOMS) 5, 308-323 (1979).

Lecun et al., "Deep learning," Nature, vol. 521, pp. 436-444, May 2015.

Lecun et al., Gradient-based learning applied to document recognition. Proceedings of the IEEE 86, 2278-2324 (1998).

Levi, L. et al., "Hyper-transport of light and stochastic acceleration by evolving disorder", Nat. Phys., vol. 8, (Dec. 2012), p. 912-917.

Li et al., Efficient and self-adaptive in-situ learning in multilayer memristor neural networks. Nature Communications 9, 2385 (2018). 8 pages.

Lin et al., All-optical machine learning using diffractive deep neural networks. Science 361, 1004-1008 (2018).

Lu et al., "16×16 non-blocking silicon optical switch based on electro-optic Mach-Zehnder interferometers," Optics Express, vol. 24, No. 9, 13 pages, DOI:10.1364/OE.24.009295 (Apr. 20, 2016).

Ma et al., "Optical switching technology comparison: optical mems vs. Other technologies," IEEE communications magazine, vol. 41, No. 11, pp. S16-S23, 2003.

Macready et al., "Criticality and Parallelism in Combinatorial Optimization," Science, vol. 271, pp. 56-59, Jan. 1996.

Marandi et al., Network of time-multiplexed optical parametric oscillators as a coherent Ising machine. Nature Photonics 8, 937 (2014). 6 pages.

Martin-Lopez, E. et al., "Experimental realization of Shor's quantum factoring algorithm using qubit recycling", Nat Photon 6, (Oct. 24, 2012), 7 pages.

McMahon et al., "A fully programmable 100-spin coherent Ising machine with all-to-all connections.," Science (New York, N.Y.), vol. 354, pp. 614-617, Nov. 2016.

Mead, "Neuromorphic electronic systems," Proceedings of the IEEE 78, 1629-1636 (1990).

Migdall, A. L. et al., "Tailoring single-photon and multiphoton probabilities of a single-photon on-demand source", Phys. Rev. A 66, (May 22, 2002), 4 pages.

Mikkelsen, J.C. et al., "Dimensional variation tolerant silicon-on-insulator directional couplers", Optics Express, vol. 22, No. 3, (Feb. 10, 2014), p. 3145-3150.

Miller, Are optical transistors the logical next step? Nature Photonics 4, 3 (2010). 3 pages.

(56) References Cited

OTHER PUBLICATIONS

Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages. (2013).
Miller, Energy consumption in optical modulators for interconnects. Optics Express 20, A293-A308 (2012).
Misra et al., "Artificial neural networks in hardware: A survey of two decades of progress," Neurocomputing 74, pp. 239-255 (2010).
Mohseni, M. et al., "Environment-assisted quantum walks in photosynthetic complexes", The Journal of Chemical Physics 129, (May 18, 2008), 8 pages.
Moore, Cramming more components onto integrated circuits. Electronics 114-117 (1965).
Mower et al., "High-fidelity quantum state evolution in imperfect photonic integrated circuits," Physical Review A, vol. 92, No. 3, p. 032322, 2015. 7 pages.
Mower, J. et al., "Efficient generation of single and entangled photons on a silicon photonic integrated chip", Phys. Rev. A 84, (Oct. 18, 2011), 8 pages.
Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.
Najafi, F. et al., "On-Chip Detection of Entangled Photons by Scalable Integration of Single-Photon Detectors", arXiv:1405.4244 [physics.optics] (May 16, 2014), 27 pages.
Nozaki et al., "Sub-femtojoule all-optical switching using a photonic-crystal nanocavity," Nature Photonics 4, pp. 477-483 (2010).
O'Brien, J. L. et al., "Demonstration of an all-optical quantum controlled-NOT gate", Nature 426, (Feb. 1, 2008), 5 pages.
Onsager, "Crystal Statistics. I. A Two-Dimensional Model with an Order-Disorder Transition," Physical Review, vol. 65, pp. 117-149, Feb. 1944.
Orcutt, J. S. et al., "Nanophotonic integration in state-of-the-art CMOS foundries", Optics Express, vol. 19, No. 3, (2011), pp. 2335-2346.
Pelissetto et al., "Critical phenomena and renormalization-group theory," Physics Reports, vol. 368, pp. 549-727, Oct. 2002.
Peng, Implementation of AlexNet with Tensorflow. https://github.com/ykpengba/AlexNet-A-Practical-Implementation (2018). Accessed Dec. 3, 2018. 2 pages.
Peretto, "Collective properties of neural networks: A statistical physics approach," Biological Cybernetics, vol. 50, pp. 51-62, Feb. 1984.
Pernice, W. et al., "High-speed and high-efficiency travelling wave single-photon detectors embedded in nanophotonic circuits", Nature Communications 3, 1325 (2012), 23 pages.
Peruzzo, A., et al., "Quantum walk of correlated particles", Science 329, (2010), 8 pages.
Politi, A. et al., "Integrated Quantum Photonics", IEEE Journal of Selected Topics in Quantum Electronics, vol. 5, Issue 6, (2009), 12 pages.
Politi, A. et al., "Silica-on-Silicon Waveguide Quantum Circuits", Science 320, (Feb. 1, 2008), 5 pages.
Poon et al., "Neuromorphic silicon neurons and large-scale neural networks: challenges and opportunities," Frontiers in Neuroscience, vol. 5, Article 108, 3 pages (2011).
Prucnal et al., "Recent progress in semiconductor excitable lasers for photonic spike processing," Advances in Optics and Photonics 8, pp. 228-299 (2016).
Psaltis et al., "Holography in artificial neural networks." Landmark Papers On Photorefractive Nonlinear Optics. 1995. 541-546.
Qiao et al., "16×16 non-blocking silicon electro-opticswitch based on mach zehnderinterferometers," in Optical Fiber Communication Conference, p. Th1C.2, Optical Society of America, 2016. 3 pages.
Ralph, T. C. et al., "Linear optical controlled-NOT gate in the coincidence basis", Phys. Rev. A, vol. 65, (Jun. 20, 2002), p. 062324-1-062324-5.
Feinberg et al., Making memristive neural network accelerators reliable. In 2018 IEEE International Symposium on High Performance Computer Architecture (HPCA), 52-65 (IEEE, 2018).
Fushman, I. et al., "Controlled Phase Shifts with a Single Quantum Dot", Science, vol. 320, (May 9, 2008), p. 769-772.
George et al., A programmable and configurable mixed-mode FPAA SoC. IEEE Transactions on Very Large Scale Integration (VLSI) Systems 24, 2253-2261 (2016).
Gilmer et al., Neural message passing for quantum chemistry. arXiv preprint arXiv:1704.01212 (2017). 14 pages.
Golub et al., "Calculating the singular values and pseudo-inverse of a matrix," Journal of the Society for Industrial and Applied Mathematics Series B Numerical Analysis, vol. 2, No. 2, pp. 205-224 (1965).
Graves et al., "Hybrid computing using a neural network with dynamic external memory," Nature, vol. 538, 21 pages (2016).
Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.
Grote et al., First long-term application of squeezed states of light in a gravitational-wave observatory. Physical Review Letters 110, 181101 (2013). 5 pages.
Gruber et al., "Planar-integrated optical vector-matrix multiplier," Applied Optics, vol. 39, p. 5367, Oct. 2000. 7 pages.
Gullans, M., et al., "Single-Photon Nonlinear Optics with Graphene Plasmons", Phys. Rev. Lett. 111, (Dec. 13, 2013), p. 247401-1-247401-5.
Gunn, C., "CMOS photonics for high-speed interconnects", Micro, IEEE 26, (Mar.-Apr. 2006), p. 58-66.
Haffner et al., Low-loss plasmon-assisted electro-optic modulator. Nature 556, 483 (2018). 17 pages.
Halasz et al., "Phase diagram of QCD," Physical Review D, vol. 58, p. 096007, Sep. 1998. 11 pages.
Hamerly et al., "Scaling advantages of all-to-all connectivity in physical annealers: the Coherent Ising Machine vs. D-Wave 2000Q," arXiv preprints, May 2018. 17 pages.
Harris et al. "Integrated source of spectrally filtered correlated photons for large-scale quantum photonic systems." Physical Review X 4.4 (2014): 041047. 10 pages.
Harris et al., "Bosonic transport simulations in a large-scale programmable nanophotonic processor," arXiv preprint arXiv:1507.03406, 2015. 8 pages.
Harris et al., "Efficient, compact and low loss thermooptic phase shifter in silicon," Optics Express, vol. 22, No. 9, pp. 10478-10489 (2014).
Hinton et al., "Reducing the dimensionality of data with neural networks," Science 313, pp. 504-507 (2006).
Hochberg, M. et al., "Silicon Photonics: The Next Fabless Semiconductor Industry", Solid-State Circuits Magazine, IEEE 5, 48 (Feb. 4, 2013), 11 pages.
Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.
Hong, C. K. et al., "Measurement of subpicosecond time intervals between two photons by interference", Phys. Rev. Lett., vol. 59, No. 18, (Nov. 2, 1987), p. 2044-2046.
Hopefield et al., "Neural computation of decisions in optimization problems," Biological Cybernetics, vol. 52, No. 3, pp. 141-152. 1955.
Hopefield, "Neural networks and physical systems with emergent collective computational abilities.," Proceedings of the National Academy of Sciences of the United States of America, vol. 79, pp. 2554-2558, Apr. 1982.

(56) References Cited

OTHER PUBLICATIONS

Horowitz, Computing's energy problem (and what we can do about it). In Solid-State Circuits Conference Digest of Technical Papers (ISSCC), 2014 IEEE International, 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.
Humphreys, P. C. et al., "LinearOptical Quantum Computing in a Single Spatial Mode", arXiv: 1305.3592, (Nov. 21, 2013), 7 pages.
Inagaki et al., Large-scale ising spin network based on degenerate optical parametric oscillators. Nature Photonics 10, 415 (2016).
Isichenko, "Percolation, statistical topography, and trans-port in random media," Reviews of Modem Physics, vol. 64, pp. 961-1043, Oct. 1992.
Jaekel et al., Quantum limits in interferometric measurements. EPL (Europhysics Letters) 13, 301 (1990).
Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22Nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc. of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.
Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kilper et al., Optical networks come of age, Opt. Photon. News, vol. 25, pp. 50-57, Sep. 2014.
Kim et al., A functional hybrid memristor crossbar-array/cmos system for data storage and neuromorphic applications. Nano Letters 12, 389-395 (2011).
Kirkpatrick et al., "Optimization by simulated annealing.," Science (New York, N.Y.), vol. 220, pp. 671-680, May 1983.
Knill et al., "The Bayesian brain: the role of uncertainty in neural coding and computation," Trends in Neurosciences, vol. 27, pp. 712-719, Dec. 2004.
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Kok et al. "Linear optical quantum computing with photonic qubits." Reviews of Modern Physics 79.1 (2007): 135.40 pages.
Koos et al., Silicon-organic hybrid (SOH) and plasmonic-organic hybrid (POH) integration. Journal of Lightwave Technology 34, 256-268 (2016).
Krizhevsky et al., Imagenet classification with deep convolutional neural networks. In Advances in neural information processing systems, 1097-1105 (2012).
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8x8 switch for high-speed WDM optical interconnection," Optics Express 20(27), 28734-28741 (2012).
Lin et al., "All-Optical Machine Learning Using Diffractive Deep Neural Networks," Apr. 2018. 20 pages.
Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.
Abu-Mostafa et al., "Optical neural computers." Scientific American 256.3 (1987): 88-95.
Albert et al., "Statistical mechanics of com-plex networks," Reviews of Modern Physics, vol. 74, pp. 47-97, Jan. 2002.
Almeida, V. R., et al., "All-optical control of light on a silicon chip", Nature, vol. 431, (Aug. 6, 2004), pp. 1081-1084.
Amir, A. et al., "Classical diffusion of a quantum particle in a noisy environment", Physical Review, E 79, 050105 (Feb. 5, 2009), 5 pages.
Amit et al., "Spin-glass models of neural networks," Physical Review A, vol. 32, pp. 1007-1018, Aug. 1985.
Anitha et al., Comparative study of high performance brauns multiplier using fpga. IOSR J Electron Commun Eng (IOSRJECE) 1, 33-37 (2012).
Appellant et al., "Information processing using a single dynamical node as complex system," Nature Communications 2,6 pages (2011).
Arjovsky et al., "Unitary Evolution Recurrent Neural Networks," arXiv:1511.06464, 9 pages (2015).
Aspuru-Guzik A. et al., "Simulated Quantum Computation of Molecular Energies", Science 309, 1704 (2005), 21 pages.
Aspuru-Guzik, A. et al., "Photonic quantum simulators", Nat. Phys., 8, 285 (2012), 29 pages.
Atabaki et al., Integrating photonics with silicon nanoelectronics for the next generation of systems on a chip. Nature 556, 349 (2018). 10 pages.
Baehr-Jones et al., "A 25 GB/s Silicon Photonics Platform," arXiv reprints. URL http://adsabs.harvard.edu/abs/2012arXiv1203.0767B, 1203.0767, 11 pages (2012).
Bao et al., "Atomic-Layer Graphene as a Saturable Absorber for Ultrafast Pulsed Lasers," Advanced Functional Materials 19, pp. 3077-3083 (2009).
Bao et al., "Monolayer graphene as a saturable absorber in a mode-locked laser," Nano Research, vol. 4, pp. 297-307, Mar. 2011.
Barahona, "On the computational complexity of Ising spin glass models," Journal of Physics A: Mathematical and General, vol. 15, pp. 3241-3253, Oct. 1982.
Bertsimas et al., "Robust optimization with simulated annealing," Journal of Global Optimization 48, pp. 323-334 (2010).
Bewick, Fast multiplication: algorithms and implementation. Ph.D. thesis, Stanford University (1994). 170 pages.
Bonneau et al., "Quantum interference and manipulation of entanglement in silicon wire waveguide quantum circuits." New Journal of Physics 14.4 (2012): 045003. 13 pages.
Brilliantov, "Effective magnetic Hamiltonian and Ginzburg criterion for fluids," Physical Review E, vol. 58, pp. 2628-2631, Aug. 1998.
Bromberg, Y. et al., "Bloch oscillations of path-entangled photons", Phys. Rev. Lett., vol. 105, (May 18, 2011), 5 pages.
Bromberg, Y. et al., "Quantum and Classical Correlations in Waveguide Lattices", Phys. Rev. Lett. 102, (Jun. 26, 2009), p. 253904-1-253904-4.
Broome, M. A. et al., "Photonic Boson Sampling in a Tunable Circuit", Science 339, 794 (Dec. 20, 2012), 6 pages.
Bruck et al., "On the power of neural networks for solving hard problems," Journal of Complexity, vol. 6, pp. 129-135, Jun. 1990.
Canziani et al., A. Evaluation of neural network architectures for embedded systems. In Circuits and Systems (ISCAS), 2017 IEEE International Symposium on, 1-4 (IEEE, 2017).
Cardenas et al., "Low loss etchless silicon photonic waveguides," Opt. Express, vol. 17, No. 6, pp. 4752-4757 (2009).
Carolan et al., "Universal linear optics," Science, vol. 349, pp. 711-716, Aug. 2015.
Caves, Quantum-mechanical noise in an interferometer. Physical Review D 23, 1693 (1981). 16 pages.

(56) References Cited

OTHER PUBLICATIONS

Centeno et al., "Optical bistability in finite-size nonlinear bidimensional photonic crystals doped by a microcavity," Phys. Rev., vol. 62, No. 12, pp. R7683-R7686 (2000).
Chan, "Optical flow switching networks," Proceedings of the IEEE, vol. 100, No. 5, pp. 1079-1091, 2012.
Chen et al., DianNao: A small-footprint high-throughput accelerator for ubiquitous machine-learning. ACM Sigplan Notices 49, 269-284 (2014).
Chen, J. et al., "Efficient photon pair sources based on silicon-on-insulator microresonators", SPIE, vol. 7815, (2010), 9 pages.
Chen, J. et al., "Frequency-bin entangled comb of photon pairs from a Silicon-on-insulator micro-resonator", Optics Express, vol. 19, No. 2, (Jan. 17, 2011), pp. 1470-1483.
Chen, L. et al., "Compact, low-loss and low-power 8×8 braodband silicon optical switch," Optics Express 20(17), 18977-18985 (2012).
Chen, Q. et al., "A Universal method for constructing N-port non-blocking optical router based on 2×2 optical switch", Optics Express 22, 12614 (Aug. 25-28, 2014), p. 357-361.
Cheng et al., "In-Plane Optical Absorption and Free Carrier Absorption in Graphene-on-Silicon Waveguides," IEEE Journal of Selected Topics in Quantum Electronics, vol. 20, pp. 43-48, Jan. 2014.
Farht et al., "Optical implementation of the Hopfield model," Applied Optics, vol. 24, p. 1469, May 1985. 7 pages.
Chetlur et al., cuDNN: Efficient primitives for deep learning. arXiv preprint arXiv:1410.0759 (2014). 9 pages.
Childs, A. et al., "Spatial search by quantum walk", Physical Review A, 70 (2), 022314 (Aug. 25, 2004), 12 pages.
Chung et al., A monolithically integrated large-scale optical phased array in silicon-on-insulator cmos. IEEE Journal of Solid-State Circuits 53, 275-296 (2018).
Cincotti, "Prospects on planar quantum computing." Journal of Lightwave Technology 27.24 (2009): 5755-5766.
Clements et al., "Optimal design for universal multiport interferometers," Optica, vol. 3, p. 1460, Dec. 2016. 6 pages.
Crespi, A. et al., "Integrated multimode interferometers with arbitrary designs for photonic boson sampling", Nat Photon 7, (May 26, 2013), p. 545-549.
Crespi, et al., "Anderson localization of entangled photons in an integrated quantum walk", Nat Photon 7, 322 (Apr. 3, 2013), 7 pages.
Dai, D. et al., "Novel concept for ultracompact polarization splitter-rotator based on silicon nanowires", Optics Express, vol. 19, No. 11, (May 23, 2011), pp. 10940-10949.
Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.
Dunningham et al., "Efficient comparison of path-lengths using Fourier multiport devices." Journal of Physics B: Atomic, Molecular and Optical Physics 39.7 (2006): 1579. 9 pages.
E. Ising, "Beitrag zurTheorie des Ferromagnetismus," Z. Phys., 1925. 6 pages.
Esser et al., "Convolutional networks for fast, energy-efficient neuromorphic computing," Proceedings of the National Academy of Sciences 113, 11,441-11,446 (2016).
Wang et al., Deep learning for identifying metastatic breast cancer. arXiv preprint arXiv: 1606.05718 (2016). 6 pages.
Werbos, Beyond regression: New tools for prediction and analysis in the behavioral sciences. Ph.D. dissertation, Harvard University (1974). 454 pages.
Whitfield, J. D. et al., "Simulation of electronic structure Hamiltonians using quantum computers", Molecular Physics 109, 735 (Dec. 19, 2010), 22 pages.
Wu et al., "An optical fiber network oracle for NP-complete problems," Light: Science & Applications, vol. 3, pp. e147-e147, Feb. 2014.
Xia, F., et al., "Mode conversion losses in silicon-on-insulator photonic wire based racetrack resonators", Optics Express, vol. 14, No. 9, (2006), p. 3872-3886.

Xu et al., "Experimental observations of bistability and instability in a two-dimensional nonlinear optical superlattice," Phys. Rev. Lett. 71, pp. 3959-3962 (1993).
Xue, P., et al., "Observation of quasiperiodic dynamics in a one-dimensional quantum walk of single photons in space," New J. Phys. 16 053009 (May 6, 2014), 11 pages.
Yang, M. et al., "Non-Blocking 4×4 Electro-Optic Silicon Switch for On-Chip Photonic Networks", Opt. Express, vol. 19, No. 1, (Dec. 20, 2010), p. 47-54.
Yao et al., Serial-parallel multipliers. In Signals, Systems and Computers, 1993. 1993 Conference Record of The Twenty-Seventh Asilomar Conference on, 359-363 (IEEE, 1993).
Young et al., Recent trends in deep learning based natural language processing. IEEE Computational Intelligence Magazine 13, 55-75 (2018).
Zhou, X.-Q., et al., "Calculating Unknown Eigenvalues with a Quantum Algorithm", Nat. Photon 7, (2013), pp. 223-228.
Ramanitra et al., "Scalable and multi-service passive optical access infrastructure using variable optical splitters." Optical Fiber Communication Conference. Optical Society of America, 2006, 3 pages.
Raussendorf, R. et al., "A one-way quantum computer", Phys. Rev. Lett. 86, 5188-5191 (2001).
Rechtsman et al., "Photonic floquet topological insulators," Optical Society of America, Technical Digest, 2 pages (2013).
Reck et al., "Experimental realization of any discrete unitary operator," Phys. Rev. Lett. 73, 58-61 (1994).
Reed, G. T. et al., "Silicon optical modulators", Nature Photonics, vol. 4, (2010), pp. 518-526.
Rendl et al., "Solving Max-Cut to optimality by intersecting semidefinite and polyhedral relaxations," Mathematical Programming, vol. 121, pp. 307-335, Feb. 2010.
Rios et al., "Integrated all-photonic non-volatile multilevel memory," Nature Photonics 9, pp. 725-732 (2015).
Rogalski, Progress in focal plane array technologies. Progress in Quantum Electronics 36, 342-473 (2012).
Rohit, A. et al., "8×8 space and wavelength selective cross-connect for simultaneous dynamic multi-wavelength routing", In Optical Fiber Communication Conference, OW1C-4 (Optical Society of America, (2013), 3 pages.
Rosenblatt, The perceptron: a probabilistic model for information storage and organization in the brain. Psychological Review 65, 386 (1958). 23 pages.
Russakovsky et al. ImageNet Large Scale Visual Recognition Challenge. International Journal of Computer Vision (IJCV) 115, 211-252 (2015).
Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.
Salandrino, A. et al., "Analysis of a three-core adiabatic directional coupler", Optics Communications, vol. 282, (2009), pp. 4524-4526.
Schaeff et al., "Scalable fiber integrated source for higher-dimensional path-entangled photonic quNits." Optics Express 20.15 (2012): 16145-16153.
Schirmer et al., "Nonlinear mirror based on two-photon absorption," Journal of the Optical Society of America B, vol. 14, p. 2865, Nov. 1997. 4 pages.
Schmidhuber, J., "Deep learning in neural networks: An overview," Neural Networks 61, pp. 85-117 (2015).
Schreiber, A. et al., "Decoherence and Disorder in Quantum Walks: From Ballistic Spread to Localization", Phys. Rev. Lett., 106, (Jan. 13, 2011), 5 pages.
Schwartz, T. et al., "Transport and Anderson localization in disordered two-dimensional photonic lattices", Nature, vol. 446, (Mar. 1, 2007), p. 52-55.
Selden, "Pulse transmission through a saturable absorber," British Journal of Applied Physics 18, 743 (1967). 7 pages.
Shafiee et al., "ISAAC: A convolutional neural network accelerator with in-situ analog arithmetic in crossbars," ACM/IEEE 43rd Annual International Symposium on Computer Architecture, in Proc. ISCA, 13 pages (2016).
Shen et al., "Deep learning with coherent nanophotonic circuits," Nature Photonics. Jun. 2017. 7 pages.

(56) References Cited

OTHER PUBLICATIONS

Shen et al., "Deep Learning with Coherent Nanophotonic Circuits," arXiv:1610.02365, pp. 189-190 (2016).
Shoji, Y. et al., "Low-crosstalk 2×2 thermo-optic switch with silicon wire waveguides," Optics Express 18(9), 9071-9075., published Apr. 15, 2010.
Silver et al. Mastering chess and shogi by self-play with a general reinforcement learning algorithm. arXiv preprint arXiv:1712.01815. (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Soljačić et al., "Optimal bistable switching in nonlinear photonic crystals," Physical Review E 66, pp. 055601-4 (2002).
Solli et al., "Analog optical computing." Nature Photonics 9.11 (2015): 704. 3 pages.
Spring, J. B. et al., "Boson sampling on a photonic chip", Science 339, (2013), 24 pages.
Srinivasan et al., 56 GB/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., "Large-scale nanophotonic phased array," Nature 493, pp. 195-199 (2013). URL http://dx.doi.org/10.1038/nature11727.
Sun et al., "Single-chip microprocessor that communicates directly using light," Nature 528, pp. 534-538 (2015). URL http://dx.doi.org/10.1038/nature16454.
Suzuki, K. et al., "Ultra-compact 8×8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabia, "Experimental scheme for qubit and qutrit symmetric informationally complete positive operator-valued measurements using multiport devices." Physical Review A 86.6 (2012): 062107. 8 pages.
Tait et al., "Broadcast and weight: An integrated network for scalable photonic spike processing," Journal of Lightwave Technology, vol. 32, No. 21, pp. 3427-3439, 2014.
Tait et al., "Photonic Neuromorphic Signal Processing and Computing," pp. 183-222, Springer, Berlin, Heidelberg, 2014.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577(2005).
Tanizawa, K. et al., "Ultra-compact 32×32 strictly-non-blocking Si-wire optical switch with fan-out LGA interposer," Optics Express 23(13), 17599-17606 (2015).
Thompson, M. G. et al., "Integrated waveguide circuits for optical quantum computing", IET Circuits Devices Syst., 2011, vol. 5, Iss. 2, pp. 94-102.
Timurdogan et al., An ultralow power athermal silicon modulator. Nature Communications 5, 4008 (2014). 11 pages.
Vandoorne et al., "Experimental demonstration of reservoir computing on a silicon photonics chip," Nature Communications 5, 6 pages (2014).
Vazquez et al., "Optical NP problem solver on laser-written waveguide plat-form," Optics Express, vol. 26, p. 702, Jan. 2018. 9 pages.
Vivien et al., "Zero-bias 40 gbit/s germanium waveguide photodetector on silicon," Opt. Express 20, 1096-1101 (2012).
W. A. Little, "The existence of persistent states in the brain," Mathematical Biosciences, vol. 19, No. 1-2, 1974. 20 pages.
Wang et al., "Coherent Ising machine based on degenerate optical parametric oscillators," Physical Review A, vol. 88, p. 063853, Dec. 2013. 9 pages.

\* cited by examiner

LARGE-SCALE ARTIFICIAL NEURAL-NETWORK ACCELERATORS BASED ON COHERENT DETECTION AND OPTICAL DATA FAN-OUT

CROSS-REFERENCE TO RELATED APPLICATION(S)

This application claims priority, under 35 U.S.C. § 119(e), to U.S. Application No. 62/798,267, filed Jan. 29, 2019, and to U.S. Application No. 62/758,735, filed Nov. 12, 2018, each of which is incorporated herein by reference in its entirety.

GOVERNMENT SUPPORT STATEMENT

This invention was made with Government support under Grant No. FA9550-16-1-0391 awarded by the Air Force Office of Scientific Research (AFOSR) and under Grant No. W911NF-18-2-0048 awarded by the Army Research Office. The Government has certain rights in the invention.

BACKGROUND

In recent years, deep neural networks have successfully tackled a wide range of problems including image analysis, natural language processing, game playing, physical chemistry, and medicine. The recent interest in deep neural networks is driven by (1) the availability of large training datasets and (2) substantial growth in computing power and the ability to train networks on graphics processing units (GPUs). But moving to more complex problems and higher network accuracies requires larger and deeper neural networks, which in turn require even more computing power. This motivates the development of special-purpose hardware optimized to perform neural-network inference and training.

To outperform a GPU, a special-purpose neural-network accelerator should have significantly lower energy consumption than a GPU since the performance of modern GPUs is limited by on-chip power, which in turn is limited by the heatsink. In addition, the neural-network accelerator should be fast, programmable, scalable to many neurons, compact, and compatible with training as well as inference.

An application-specific integrated circuits (ASIC) is one candidate for a special-purpose neural-network accelerator. A state-of-the-art ASIC can reduce the energy per multiply-and-accumulate (MAC) operation from 20 pJ/MAC for modern GPUs to around 1 pJ/MAC. However, ASICs are based on CMOS technology and therefore suffer from the interconnect problem—even in highly optimized architectures where data is stored in register files close to the logic units, most of the energy consumption comes from data movement, not logic. Analog crossbar arrays based on CMOS gates or memristors promise better performance but are limited in size and suffer from crosstalk and calibration issues.

By contrast, photonic neural-network accelerators reduce both the logic and data-movement energy consumption by performing (the linear part of) each neural-network layer in a passive, linear optical circuit. In this approach, the linear step is performed at high speed with no energy consumption beyond transmitter and receiver energy consumption. Optical neural networks based on free-space diffraction have been reported but require spatial light modulators or 3D-printed diffractive elements and are therefore not rapidly programmable. Nanophotonic circuits are a promising alternative, but the large footprint of directional couplers and phase modulators precludes scaling to large (e.g., N≥1000) numbers of neurons. To date, the goal of a large-scale, rapidly reprogrammable photonic neural network remains unrealized.

SUMMARY

Progress in deep learning has led to a resource crunch where performance is limited by computing power, which is in turn limited by energy consumption. Optics can increase the speed and reduce the energy consumption of neural networks, but current optical architectures suffer from limited connectivity and the large footprint of low-loss nanophotonic devices. The optical architectures presented here use homodyne detection and optical data fan-out to circumvent these limits. These optical architectures are scalable to large (e.g., millions of neurons) networks without sacrificing speed (e.g., GHz) or energy consumption (e.g., sub-fJ/operation).

One of these optical architectures is an optical neural network that includes at least one coherent light source, first and second optical fan-out elements, a two-dimensional array of homodyne receivers in optical communication with the first and second optical fan-out elements, electronic circuitry operably coupled to the two-dimensional array of homodyne receivers, and a light source operably coupled to the electronic circuitry. In operation, the coherent light source produces N optical weight signals, which are fanned out into M copies by the first optical fan-out element. (Here, M and N are positive integers, where N can be about 1,000 to about 10,000,000.) The second optical fan-out element create N copies of M optical input signals. The homodyne receivers produce electronic signals representing interference of each of the N copies of the M optical input signals with a corresponding copy of the M copies of the N optical weight signals. The electronic circuitry applies a nonlinear function to the electronic signals. And the light source emits an optical output signal representing a matrix multiplication of the M optical input signals with the N optical weight signals. For example, the optical input signal may encode a vector length N and each corresponding optical weight signal represents a row of a weight matrix that are multiplied together.

In some cases, the first and second optical fan-out elements, two-dimensional array of homodyne receivers, electronic circuitry, and light source form a convolutional layer in a series of layers in the optical neural network. The series of layers may include additional convolutional layers and at least one fully connected layer. There may also be another series of layers, in optical communication with the coherent light source, to compute a matrix multiplication of the N optical weight signals with another M optical input signals.

The N copies of the M optical input signals may propagate in free space between the second fan-out element and the array of homodyne receivers.

Each homodyne receiver in the array of homodyne receiver can include a two-port beam splitter and a differential detector in optical communication with the two-port beam splitter. The two-port beam splitter interferes the copy of the optical input signal and the corresponding optical weight signal. And the differential detector detects light emitted by outputs of the two-port beam splitter.

The electronic circuitry can include an array of analog-to-digital converters (ADCs), each of which is operably coupled to a corresponding homodyne receiver in the array of homodyne receivers; digital logic operably coupled to the array of ADCs; and an array of digital-to-analog converters (DACs) operably coupled to the digital logic and the light source. Each ADC digitizes the electronic signal emitted by the corresponding homodyne receiver. The digital logic applies the nonlinear function to the electronic signals from the array of ADCs. And the DACs convert the electronic signals into analog signals for modulating the light source.

The coherent light source may include a pulsed laser that emits an optical pulse train, in which case a beam splitter may split the optical pulse train into an array of optical pulse trains. An array of optical modulators, in optical communication with the beam splitter, may modulate each optical pulse train in the array of pulse trains with weights representing a corresponding row in a weight matrix.

The optical neural network may also include a beam splitter, in optical communication with the first optical fan-out element and the second optical fan-out element, to combine each of the N copies of the M optical input signals with the corresponding copy of the M copies of the N optical weight signals.

Other optical processors may implement a method for fanning out data in a digital optical neural network. This method may include, for each image in a set of images that represents an input to a layer in the digital optical neural network, breaking the image into a set of patches, each of which comprises $K_x \times K_y$ pixels. For each of these patches, the processor spatially convolving the patch with a box function. The processor also spatially convolving a corresponding kernel with a size of $K_x \times K_y$ with a lattice function having a horizontal lattice spacing of $K_x$ and a vertical lattice spacing of $K_y$. The processor then images the patch and the corresponding kernel onto a detector array.

Another example is a convolutional layer for a coherent optical neural network. This convolutional layer includes an image-plane transceiver array, a weight server transmitter array, a beam splitter in optical communication with the image-plane transceiver array and the weight server transmitter array, and a Fourier-plane transceiver array in a Fourier plane of the image-plane transceiver array and in optical communication with the beam splitter. In operation, the image-plane transceiver array emits an array of input signals and the weight server transmitter array emits an array of weight signals. The beam splitter combines the array of input signals with the array of weight signals. And the Fourier-plane transceiver array detects a homodyne product of a spatial Fourier transform of the array of input signals and a spatial Fourier transform of the array of weight signals.

The Fourier-plane transceiver array can emit an array of product signals representing the homodyne product of the spatial Fourier transform of the array of input signals and the spatial Fourier transform of the array of weight signals. In this case, the image-plane transceiver array can coherently detect a spatial Fourier transform of the array of product signals. Each transceiver in the Fourier-plane transceiver array can detect an in-phase component and a quadrature component of the product of the spatial Fourier transform of the array of input signals and the spatial Fourier transform of the array of weight signals. And each transceiver in the Fourier-plane transceiver array may include at least one detector element per output channel of the convolutional layer.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 3B:
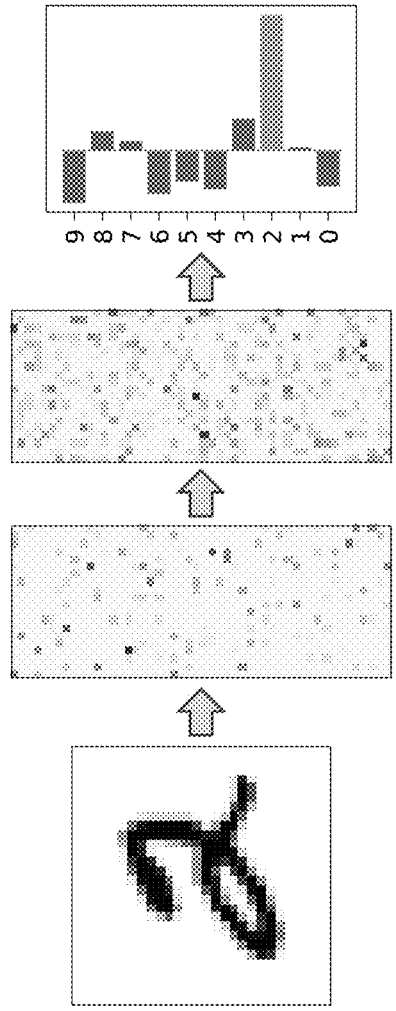
FIG. 3B illustrates classification of an MNIST image classified by the three-layer neural network in FIG. 3A (size 784→1000→1000→10).
Figure 3C:
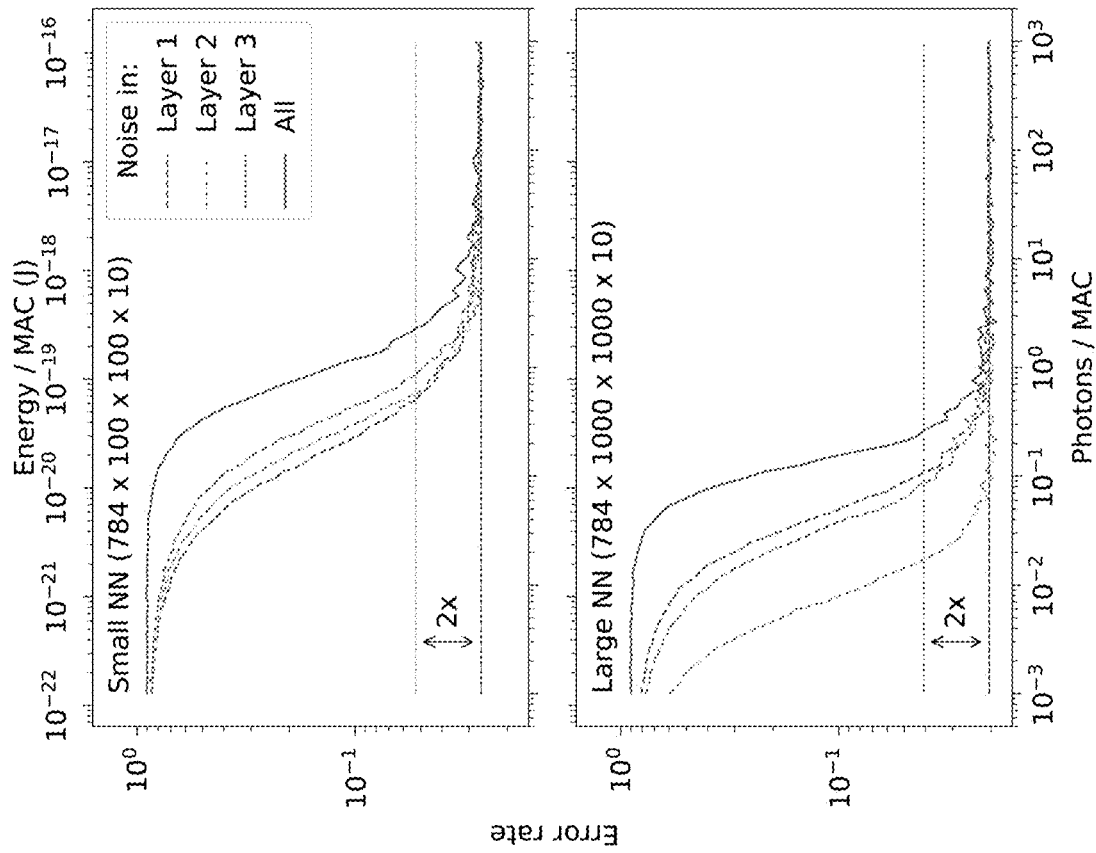
FIG. 3C is a plot of error rate as a function of photons per MAC $n_{mac}$ (equivalently energy $E_{mac}=(hc/\lambda)n_{mac}$, here $\lambda=1.55$ μm) for different sized versions of the three-layer neural network of FIG. 3A.
Figure 4A:
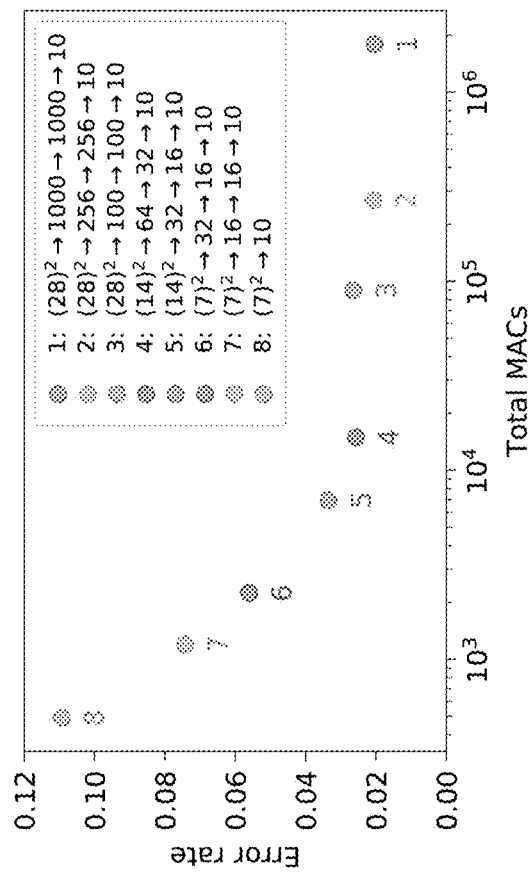
FIG. 4A is a plot of error rate as a function of number of MACs for different fully-connected neural networks trained on the MNIST database.
Figure 4B:
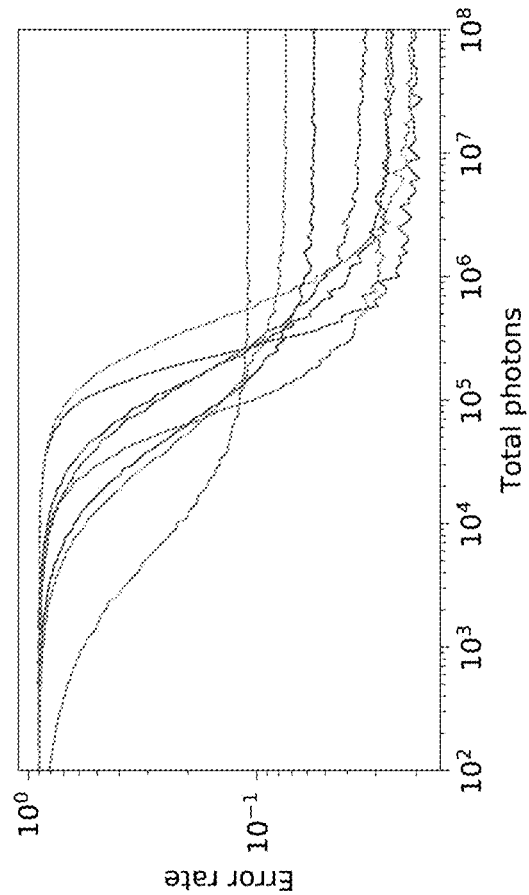
FIG. 4B is a plot of error rate as a function of total number of photons, for the same networks as in FIG. 4A.
Figure 4C:
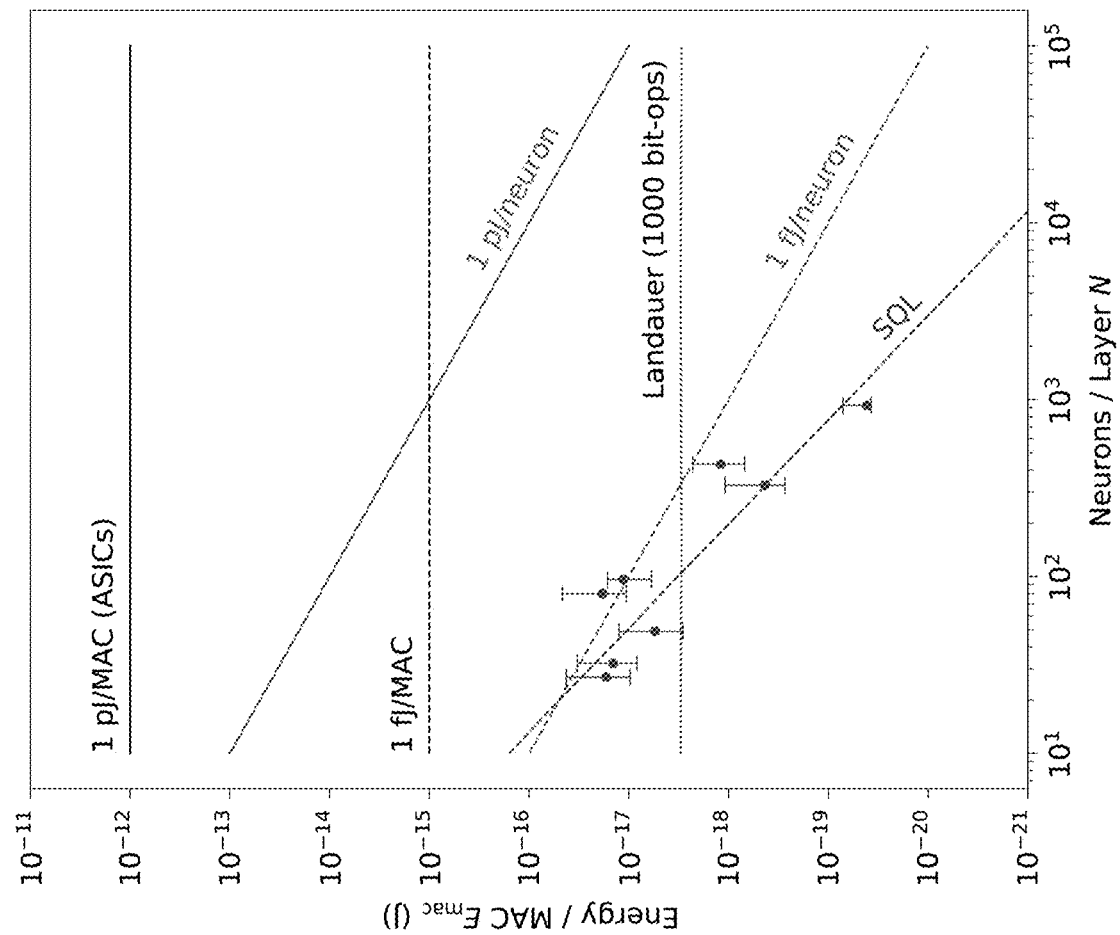

FIG. 4C is a plot of contributions to the neural network energy budget, with standard quantum limit (SQL) dots corresponding to the minimum $E_{mac}$ required to make the error rate $p_{err}(E_{mac})<1.5p_{err}(\infty)$ (error bars correspond to $p_{err}(E_{mac})=[1.2,2.0]p_{err}(\infty)$). $E_{mac}=n_{mac}(hc/\lambda)$, $\lambda=1.55$ μm. This SQL is calculated using the error rates in FIGS. 3B and 3C.

Figures 5A, 5B:
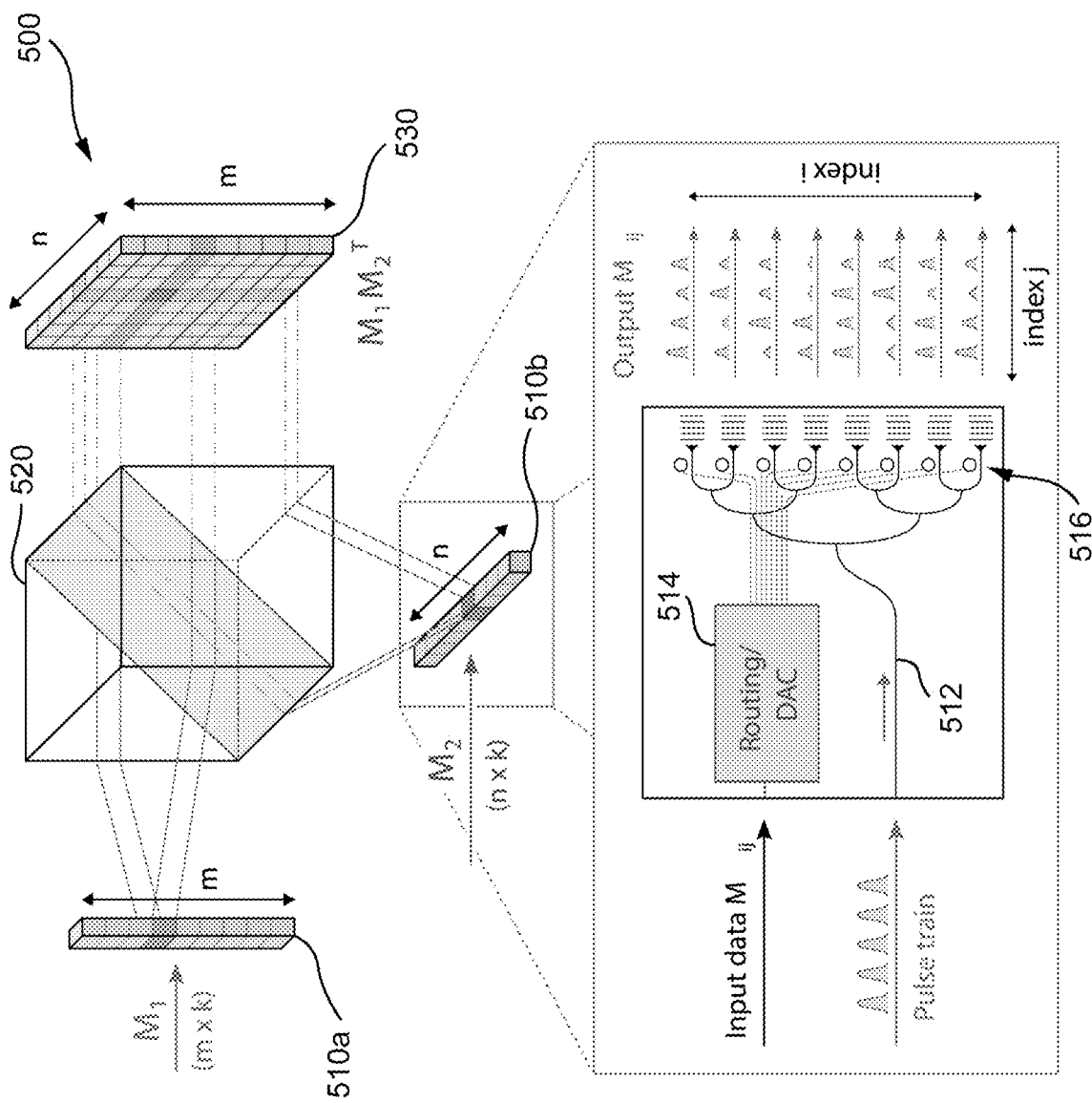

FIG. 5A illustrates matrix multiplication with a 2D detector array, two 1D transmitter arrays, and optical fan-out.

FIG. 5B is a schematic diagram of transmitter array suitable for performing matrix multiplication as in FIG. 5A.

Figure 5C:
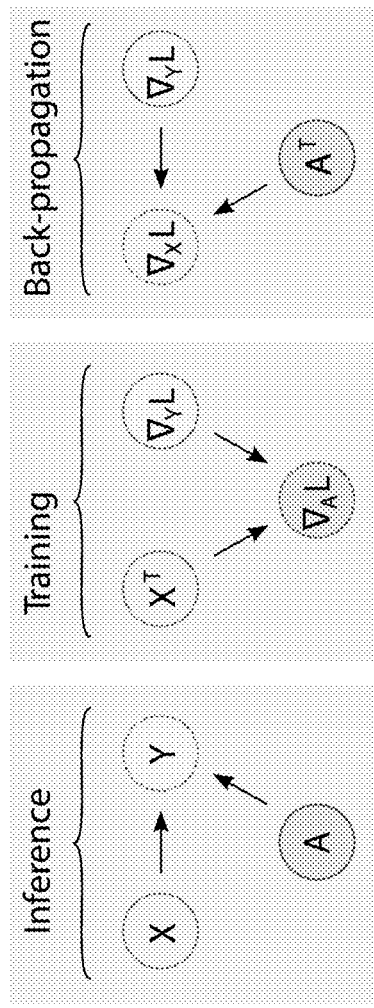

FIG. 5C illustrates matrix operations for inference, training and back-propagation in a deep neural network.

Figure 5D:
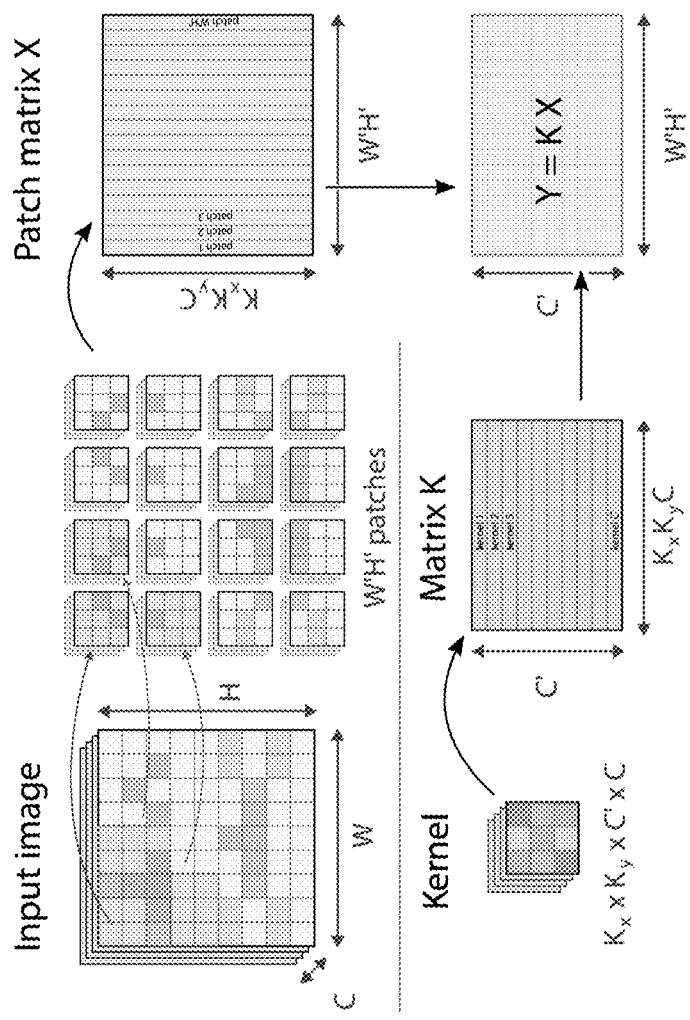

FIG. 5D illustrates patching technique to recast a convolution ($K_x=K_y=3$, $s_x=s_y=2$ shown) as a matrix-matrix multiplication.

Figure 6A:
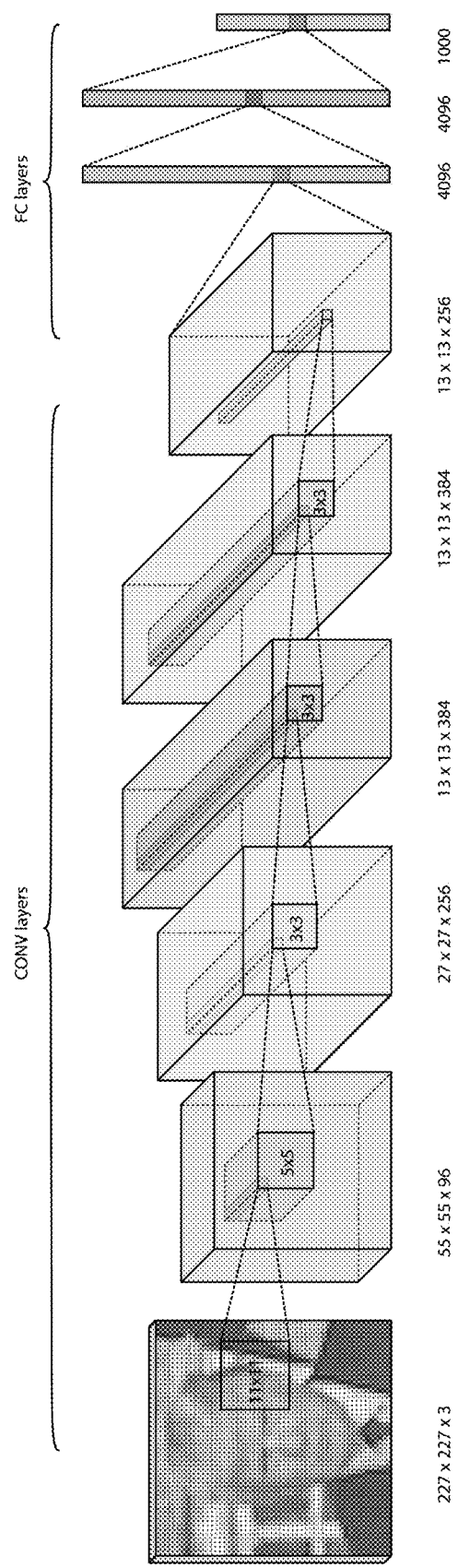

FIG. 6A is a schematic drawing of AlexNet, which includes 5 convolutional layers and 3 fully-connected layers (the pooling and normalization steps not shown).

Figure 6B:
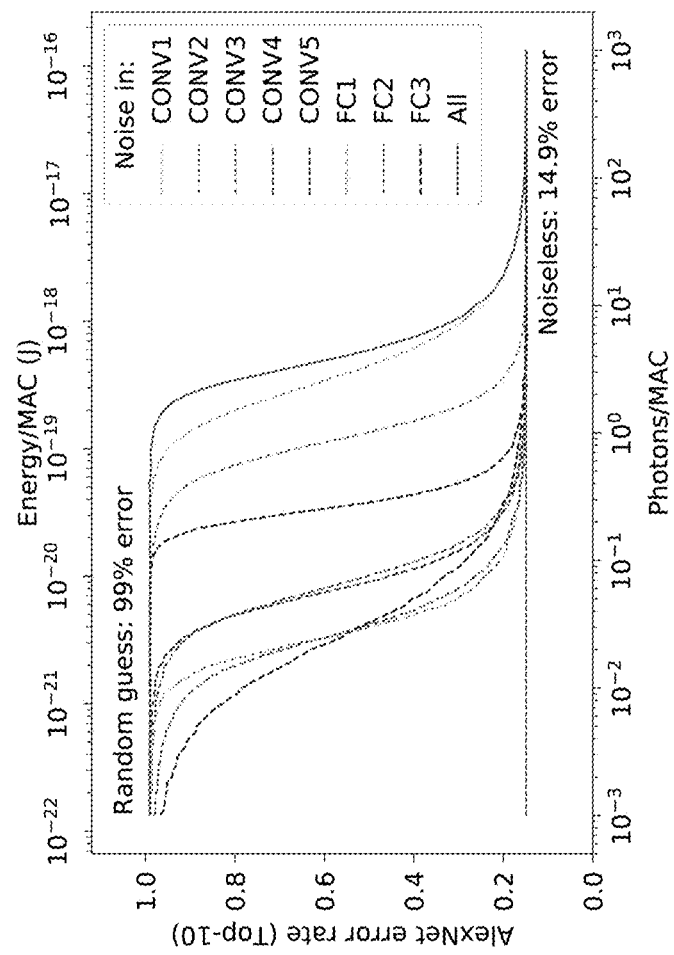

FIG. 6B is a plot of error rate for pre-trained AlexNet as a function of $n_{mac}$ (dashed lines show the effect of noise in a single layer, while the solid line shows the performance of the actual machine where all layers have noise).

Figure 7A:
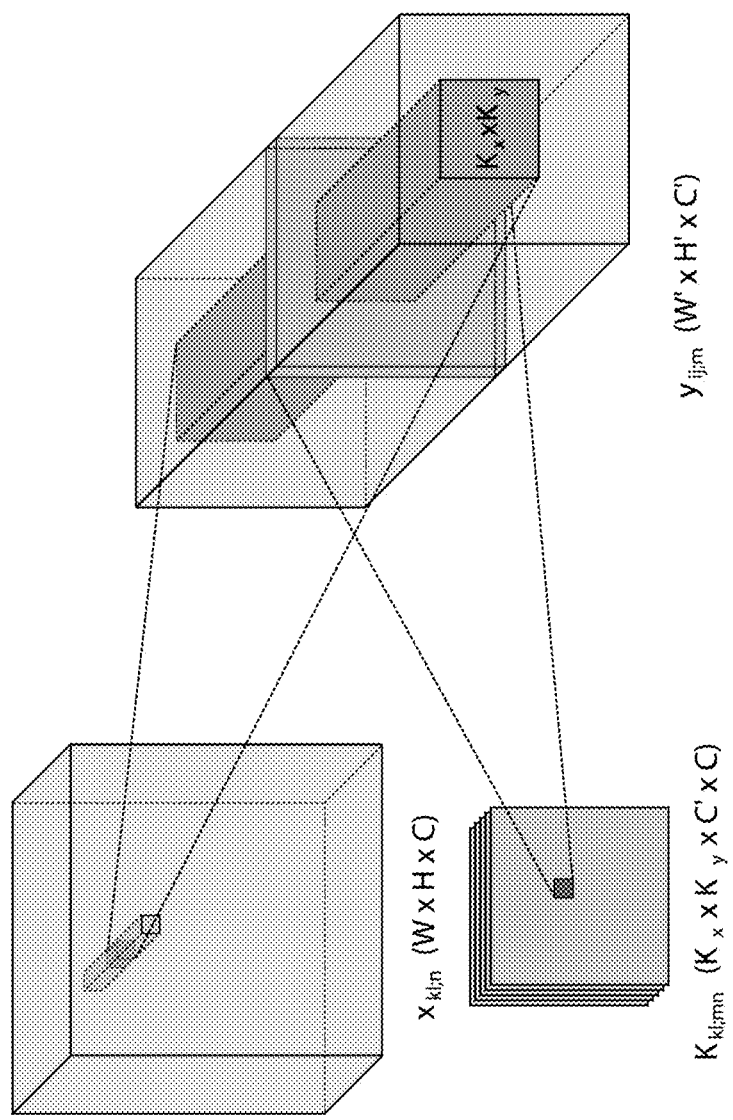

FIG. 7A shows the data fan-out in a convolutional layer: specifically how outputs $y_{ij;m}$ (right) depend on a particular input $x_{kl;n}$ (upper left) and a particular weight $K_{kl;mn}$ (lower left).

Figure 7C:
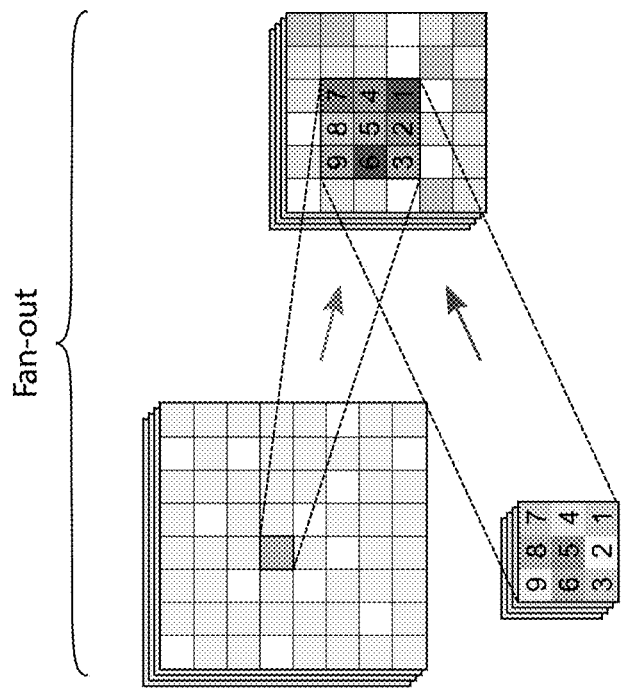
Figure 7B:
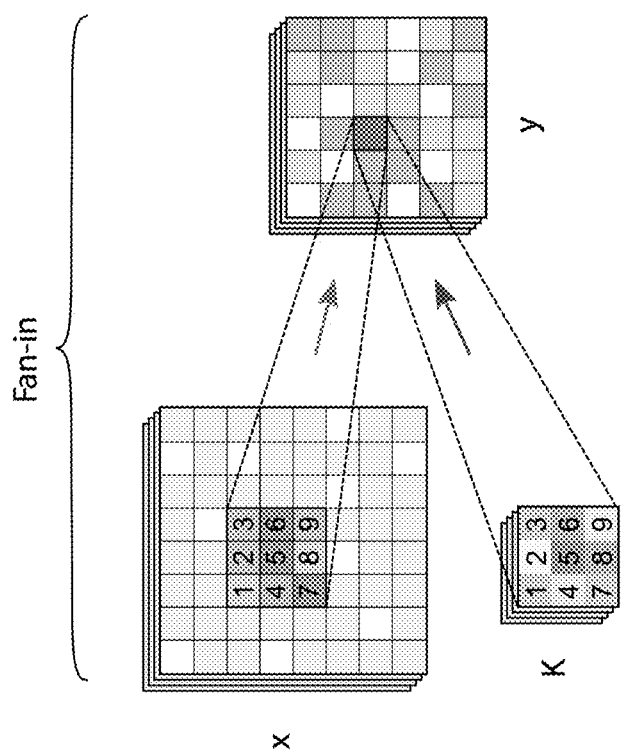

FIG. 7B illustrates a convolution as a weighted fan-in to a single output pixel $y_{ij}$.

FIG. 7C is a fan-out representation of a convolution.

Figure 8:
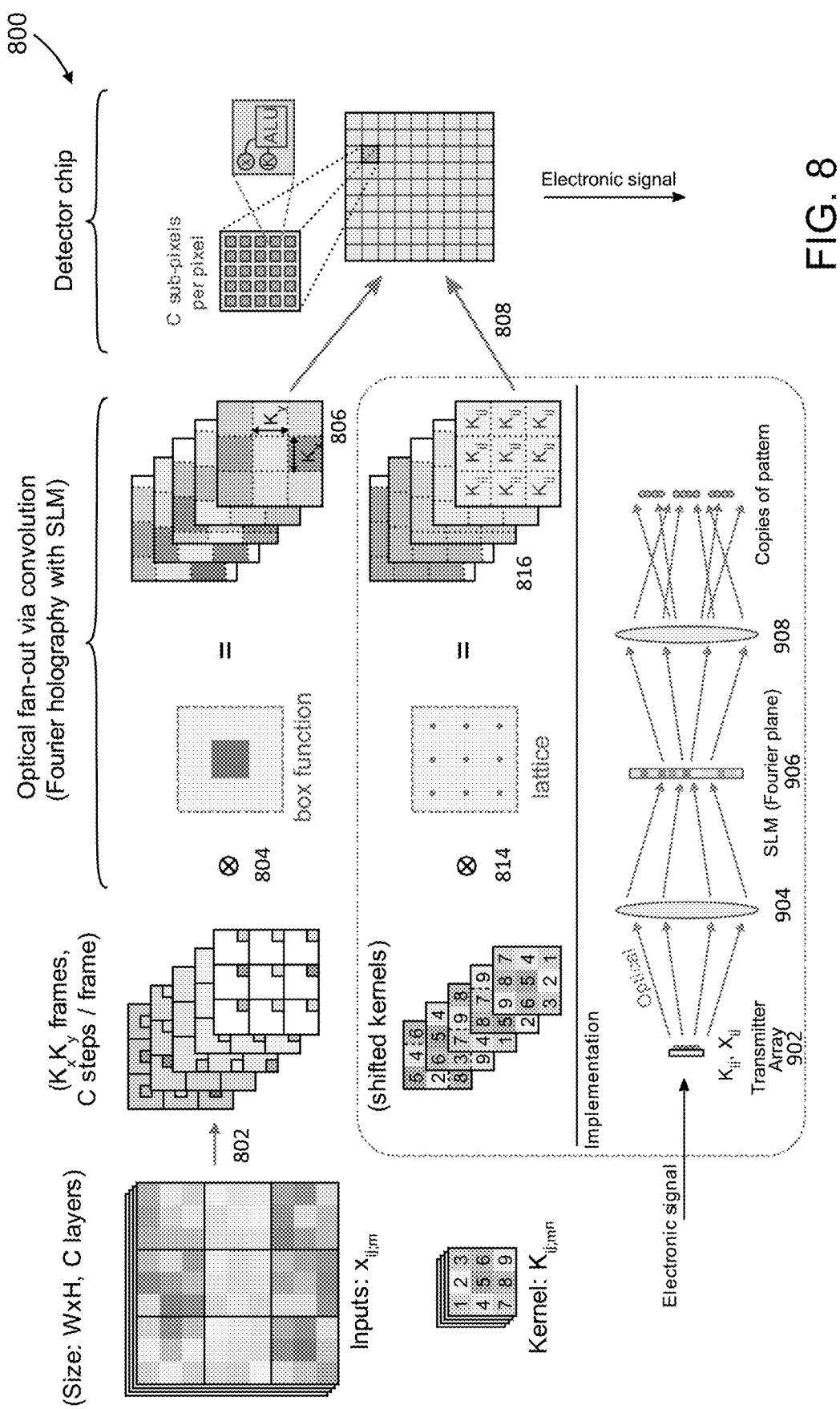

FIG. 8 illustrates a patch method for input fan-out in a digital optical convolutional neural network.

Figure 9A:
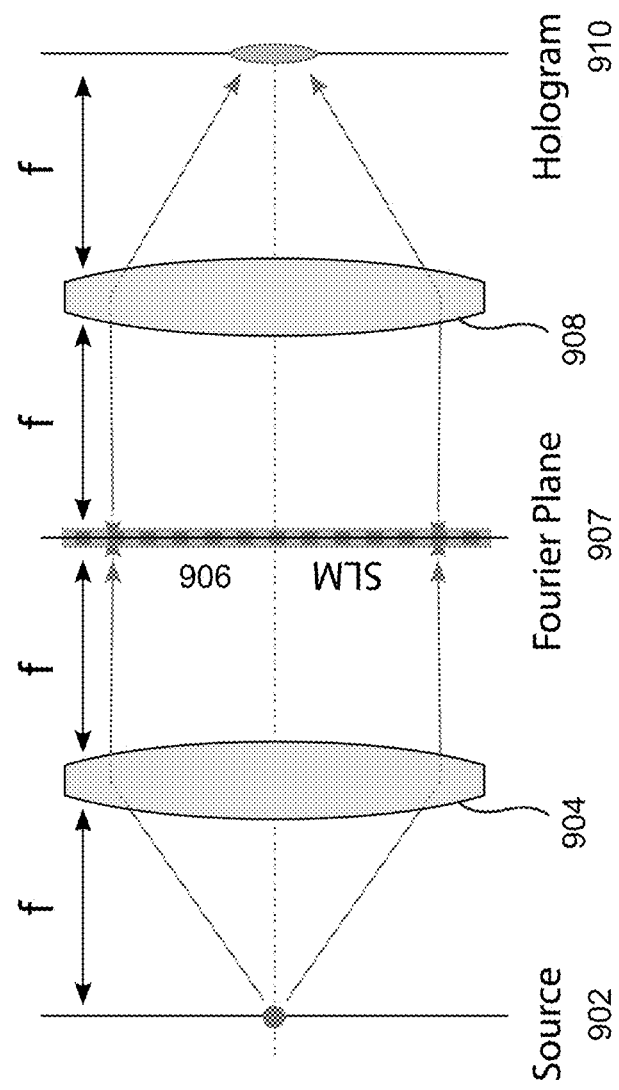

FIG. 9A shows conversion of a point source to a plane wave in the Fourier plane, whose amplitude and/or phase are modified with a spatial light modulator (SLM), to produce a signal that is Fourier-transformed to form a hologram.

Figure 9B:
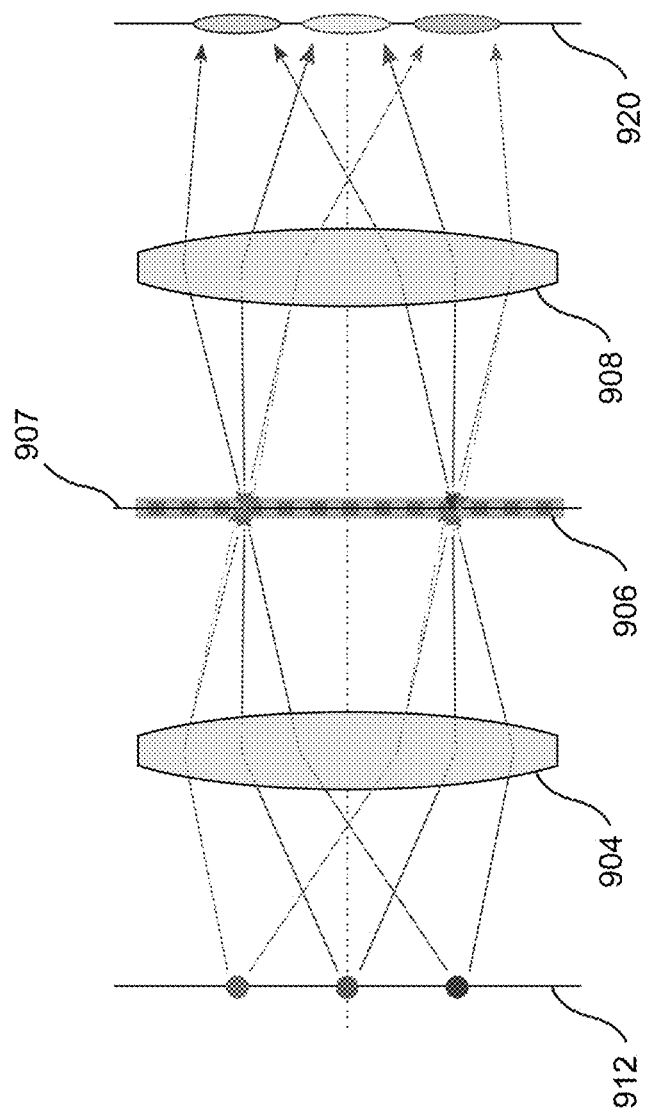

FIG. 9B illustrates multiple sources producing multiple non-overlapping holograms, correctly implementing an optical convolution.

Figure 10:
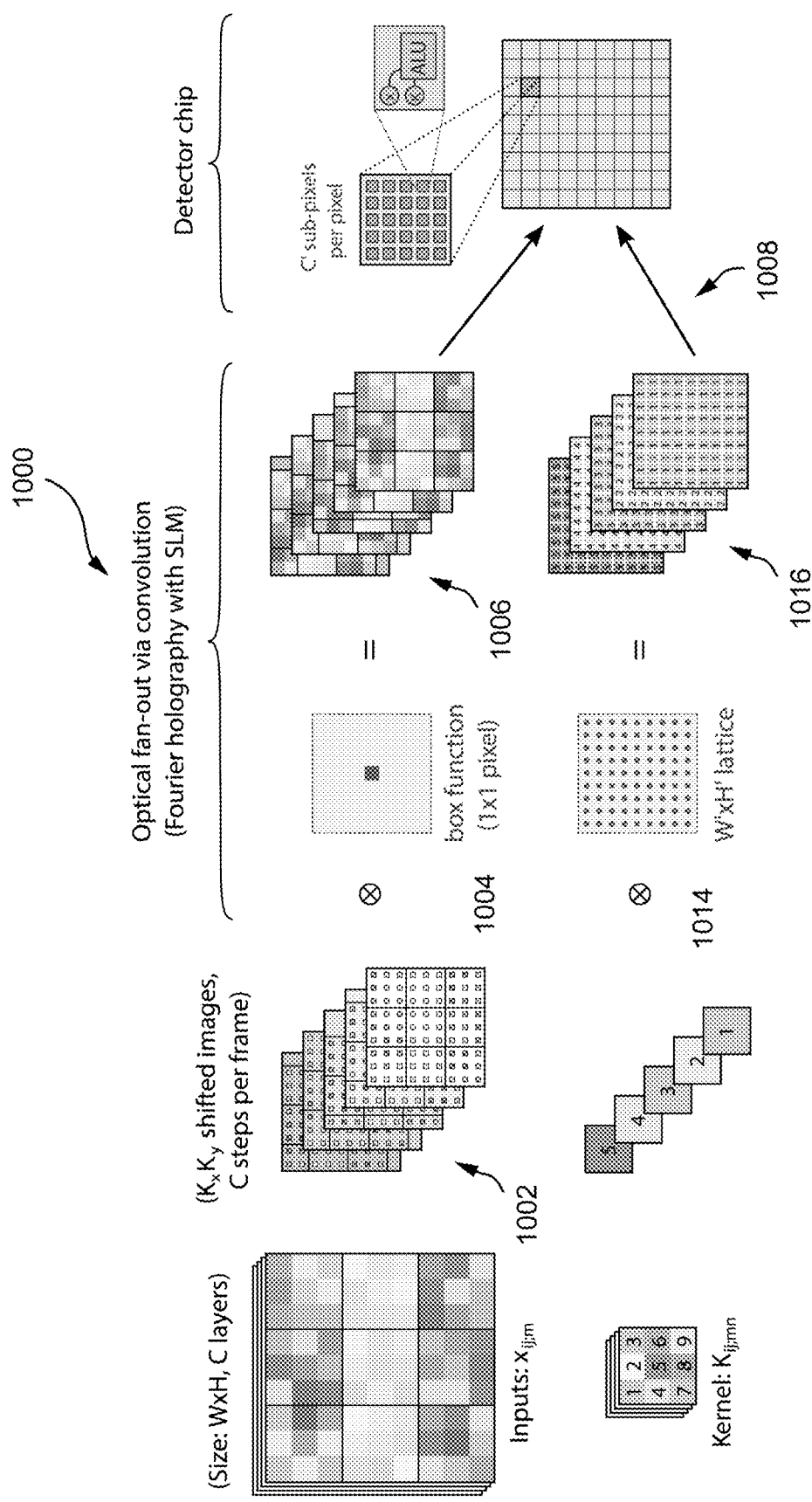

FIG. 10 illustrates the shift method for input and kernel fan-out in a digital optical convolutional neural network.

Figure 11A:
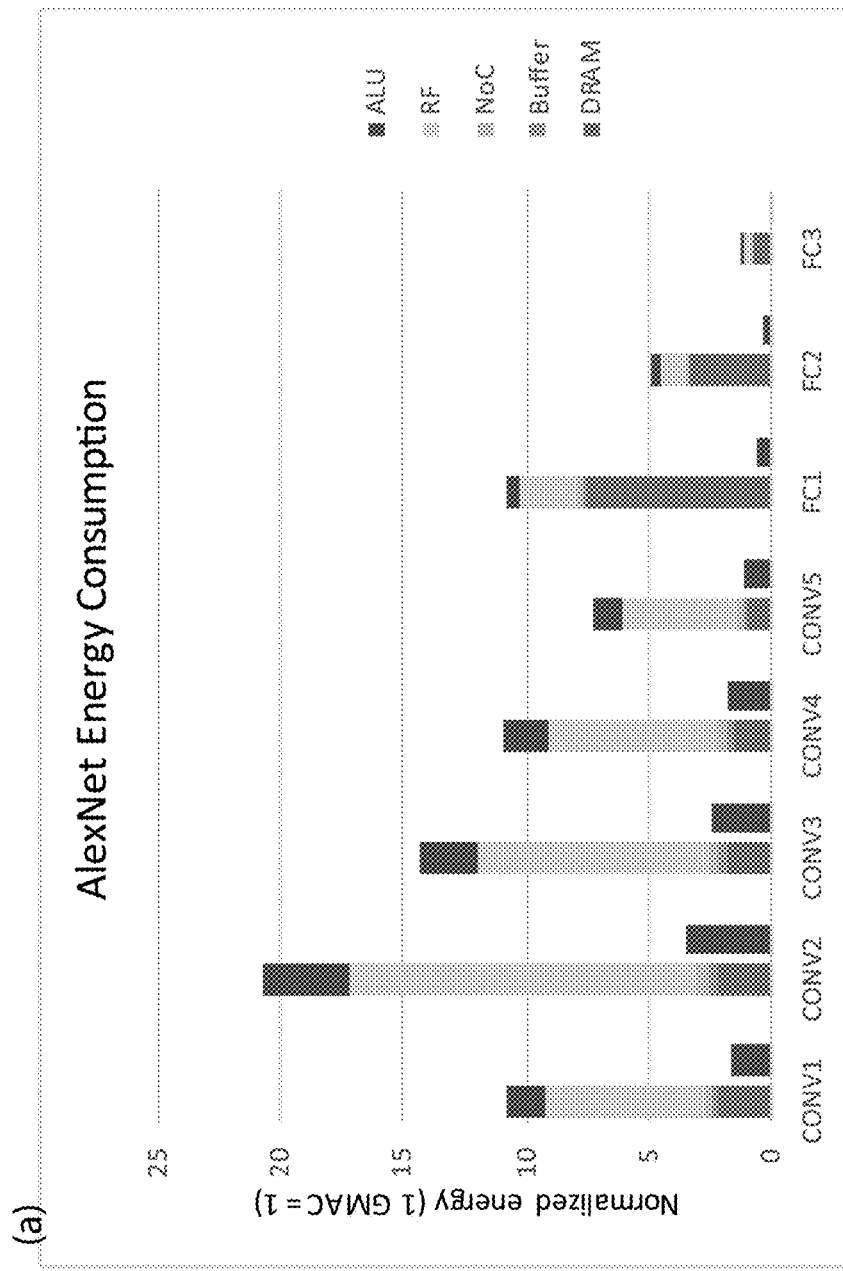

FIG. 11A is a bar chart of AlexNet energy consumption broken down into logic (darker bar segments) and memory access (lighter bar segments).

Figure 11B:
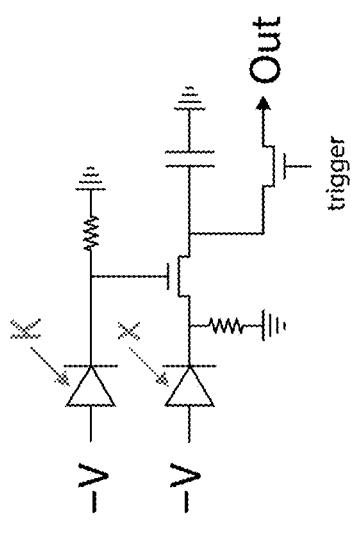

FIG. 11B is a circuit diagram of an analog weighted accumulator restricted to positive signals/weights.

Figure 11C:
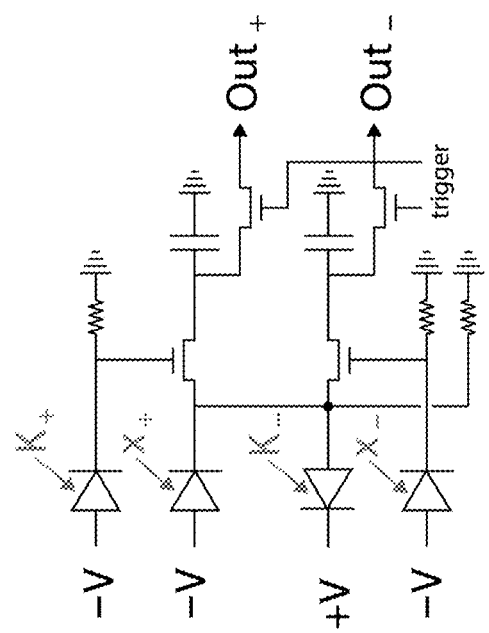

FIG. 11C is a circuit diagram of a weighted accumulator for both positive and negative signals/weights. Result= (Out$_+$)−(Out$_-$).

Figures 12A, 12B:
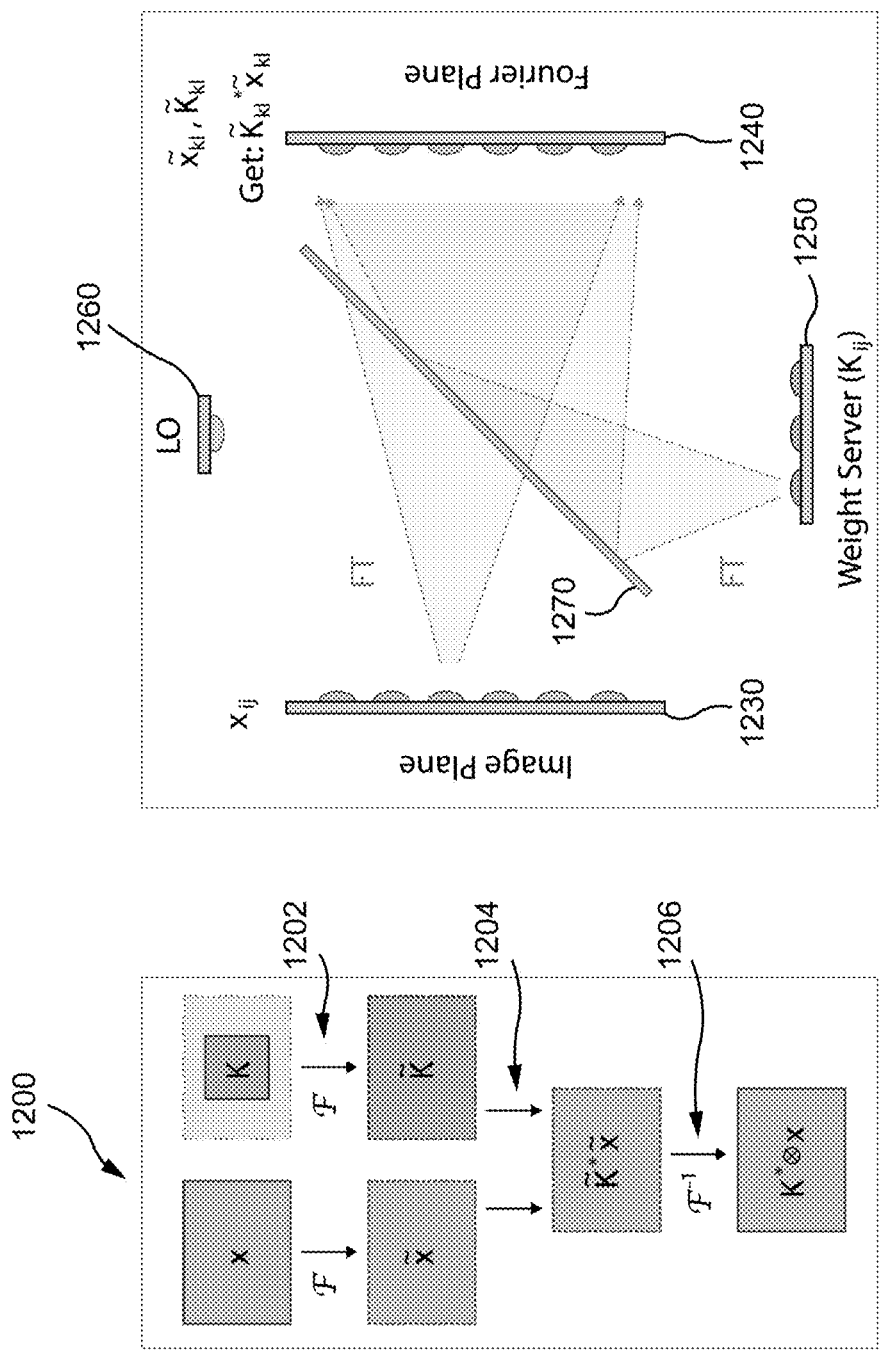

FIG. 12A illustrates a process for performing a convolution using three Fourier transforms and a multiplication.

FIG. 12B illustrates Fourier transformation of weights and feature maps and detection of the product $\tilde{K}_{kl}^* \tilde{x}_{kl}$ in the Fourier plane as part of an optical implementation of the convolution process in FIG. 12A.

Figure 12C:
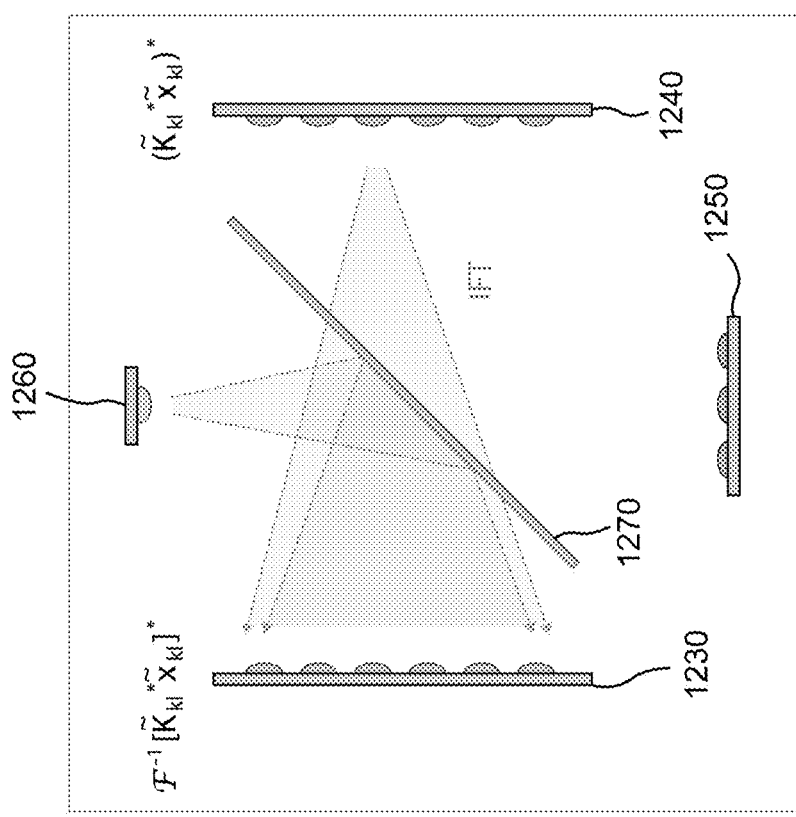

FIG. 12C illustrates Fourier transformation and coherent detection of the product $(\tilde{K}_{kl}^* \tilde{x}_{kl})^*$ in the image plane, producing the convolution $(\mathcal{F}^{-1}[\tilde{K}^* \tilde{x}])^*$ as part of an optical implementation of the convolution process in FIG. 13A.

Figure 13:
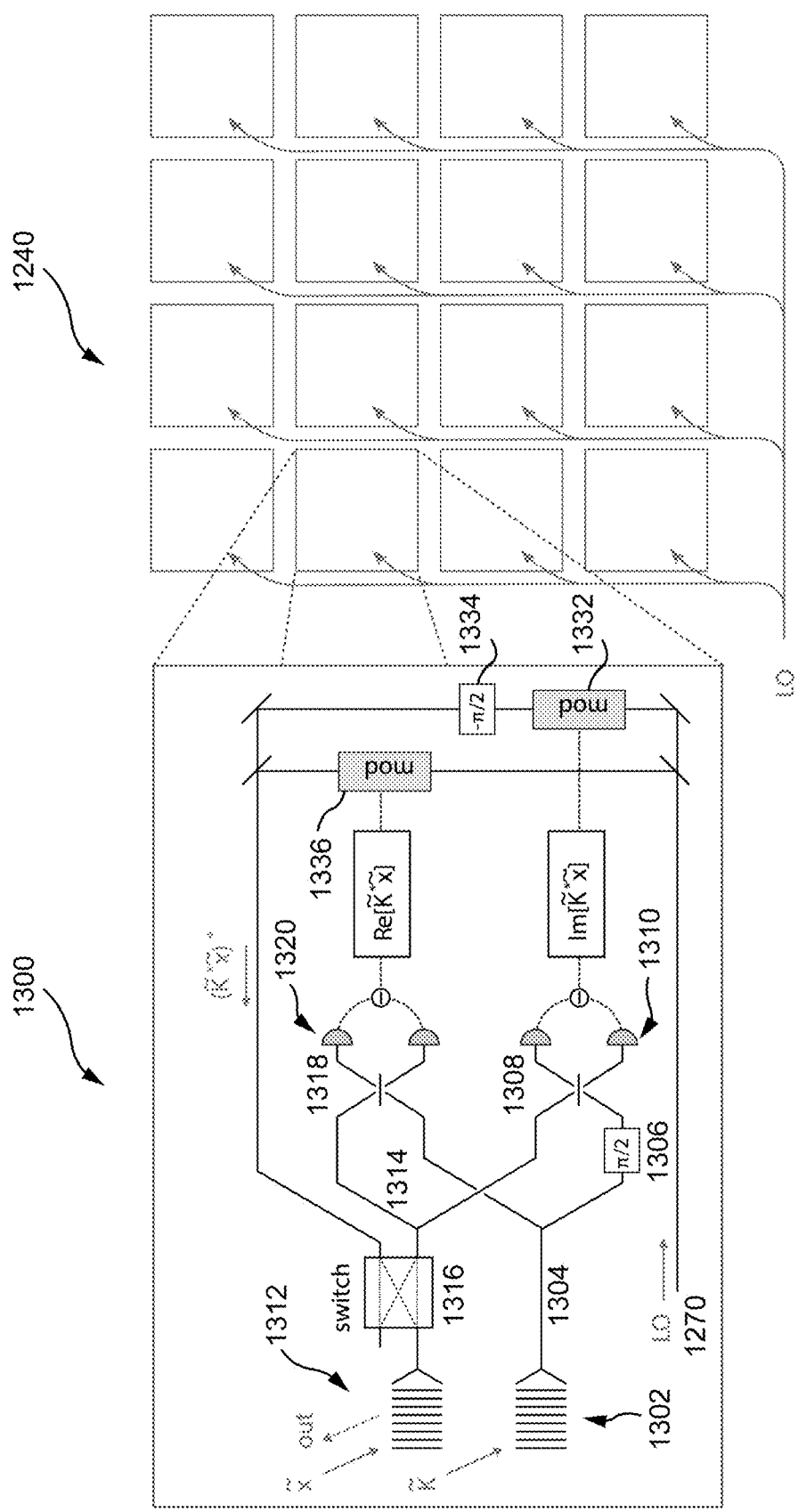

FIG. 13 illustrates a transceiver chip suitable for use in the Fourier plane in the optical implementation of the convolution process in FIGS. 12B and 12C.

Figures 14A, 14B:
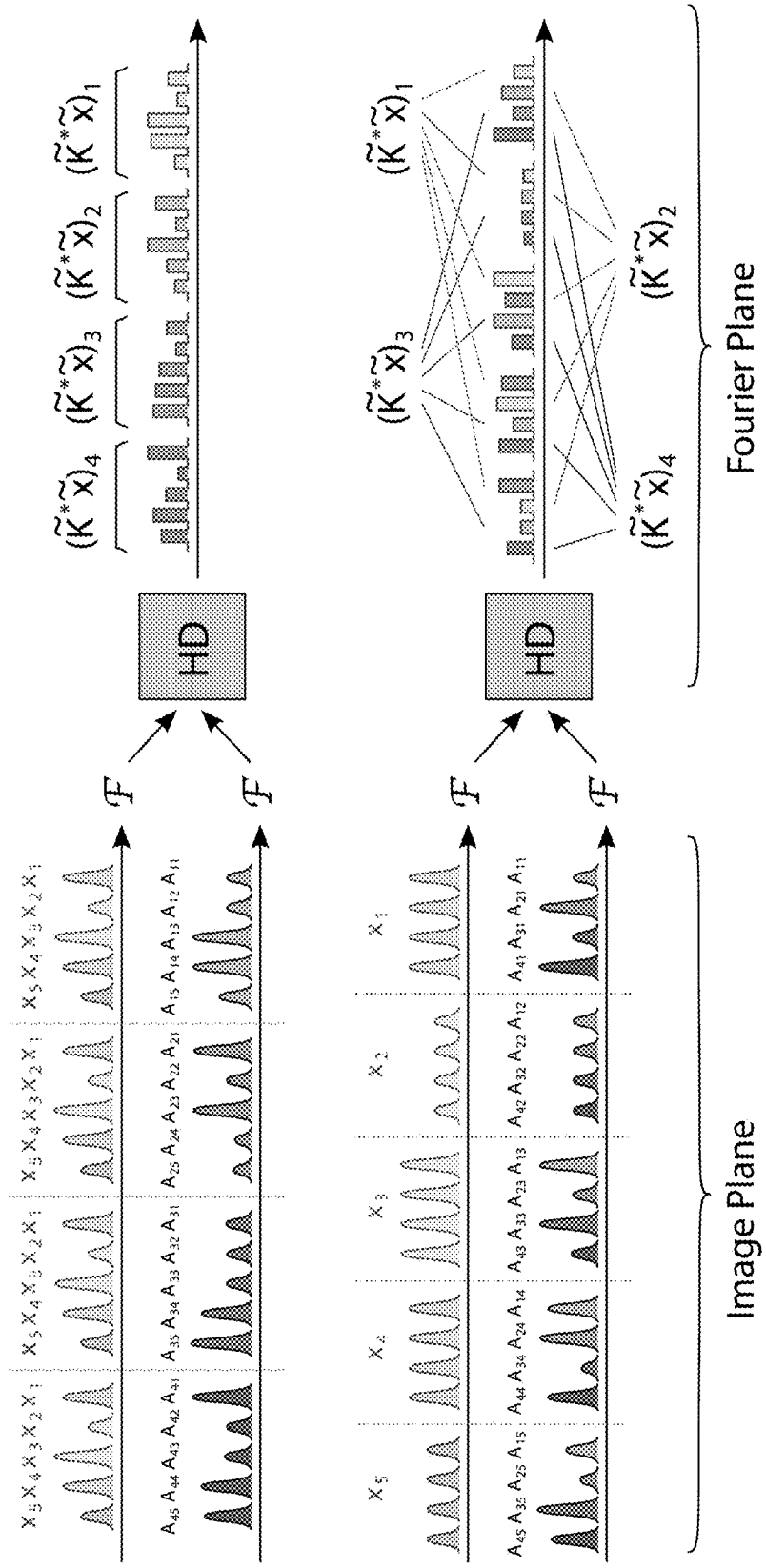

FIG. 14A illustrates C-ordering for serializing channel data with C=5 channel input and C'=4 channel output layer (spatial dimensions (i,j) are suppressed and only channel dimensions (m,n) are shown for clarity).

FIG. 14B illustrates Fortran ordering for serializing channel data with C=5 channel input and C'=4 channel output layer (spatial dimensions (i,j) are suppressed and only channel dimensions (m,n) are shown for clarity).

Figure 15B:
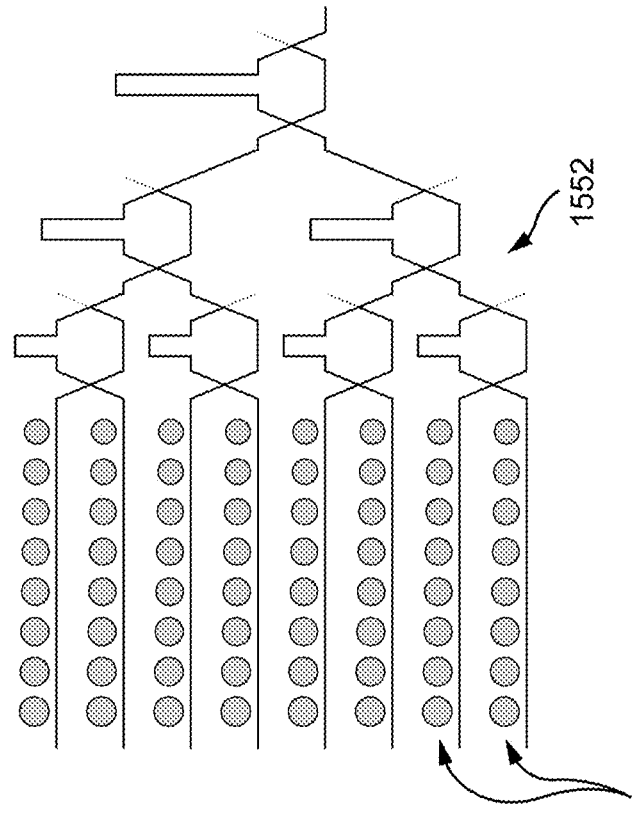
Figure 15A:
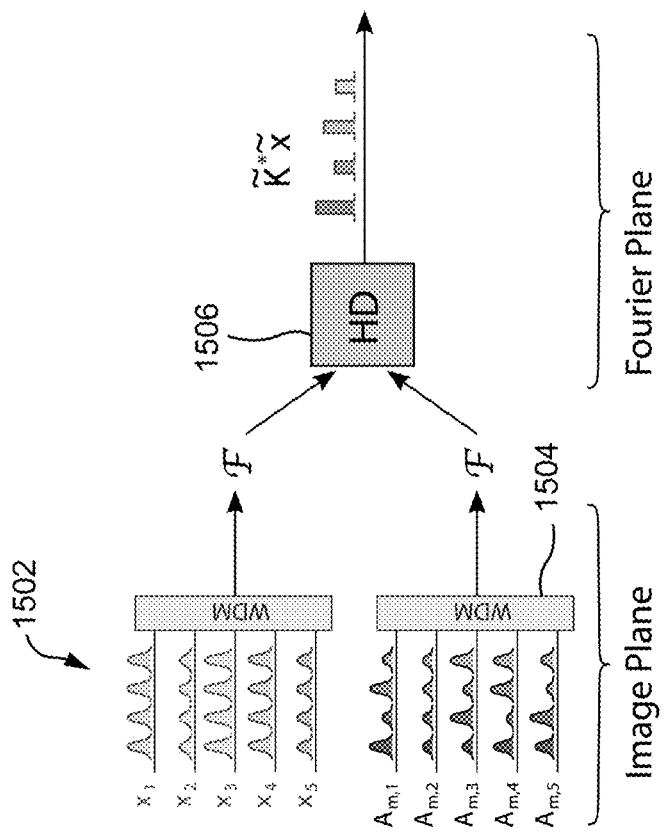

FIG. 15A illustrates encoding channels in frequency space using wavelength-division multiplexing (WDM).

FIG. 15B illustrates an implementation of a many-channel WDM using rings and delay-Mach-Zehnder modulator (MZM) filters.

Figure 16:
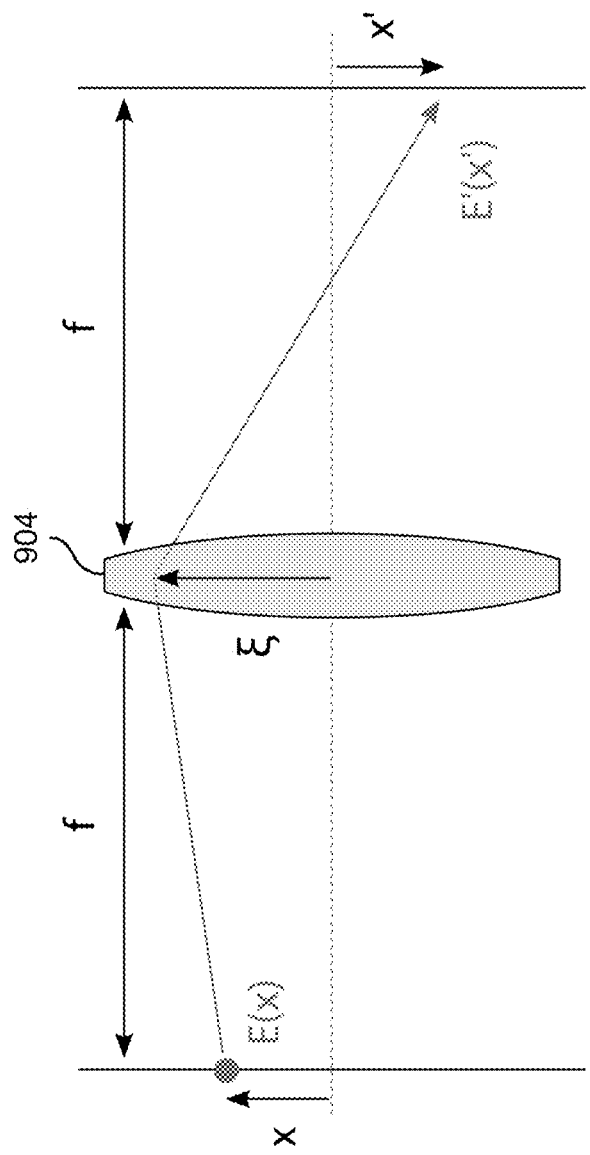

FIG. 16 shows a confocal setup to produce an optical Fourier transform (x'>0 corresponds to below the optical axis).

Figure 17:
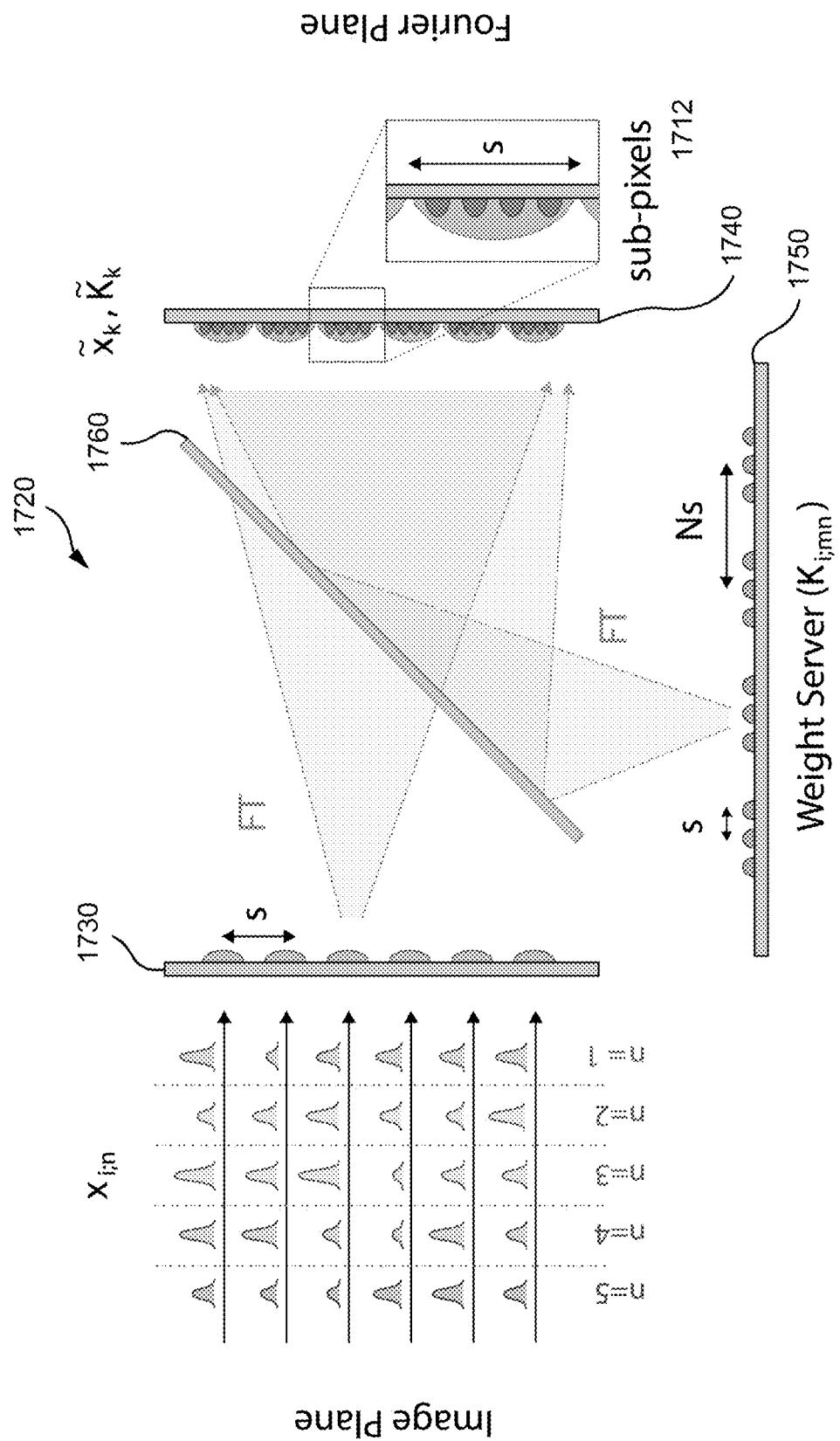

FIG. 17 illustrates an optical architecture for performing a multi-channel optical Fourier transform, with subpixels (C'=4) in the Fourier plane and additional emitters in the weight server.

Figure 18:
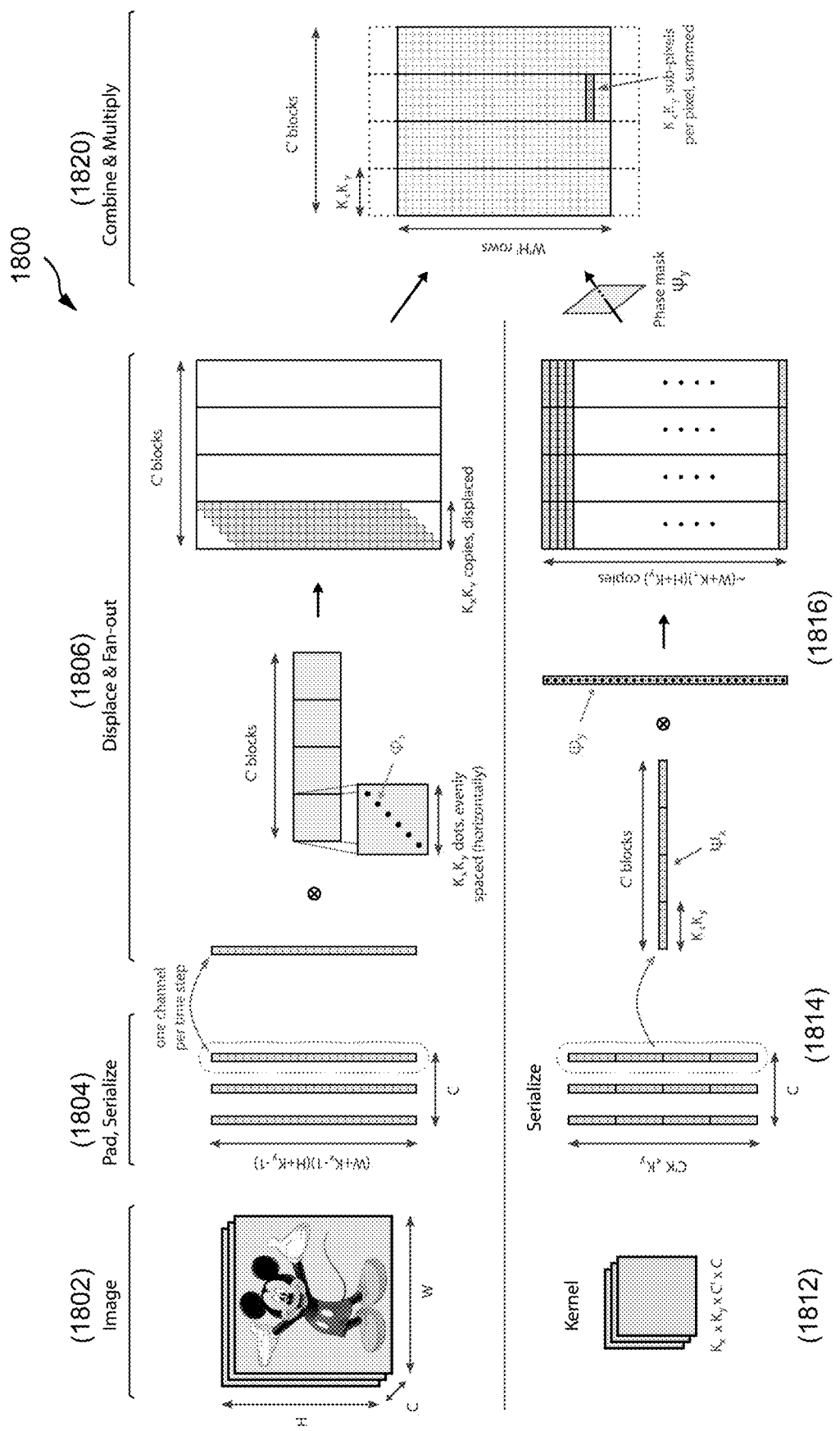

FIG. 18 illustrates a Row-Column method for computing a convolution.

Figure 19:
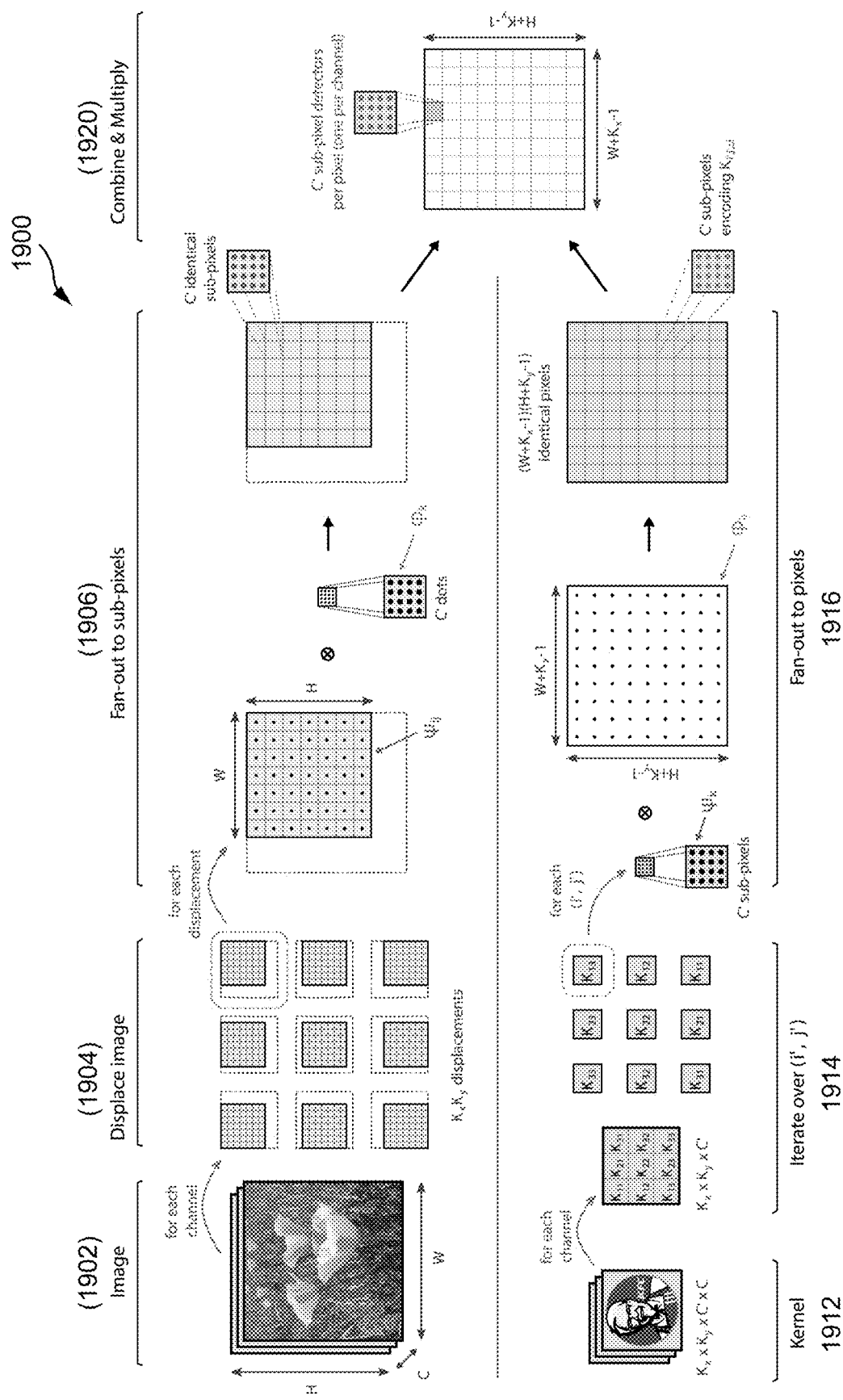

FIG. 19 illustrates a Displaced Image Method for computing a convolution.

Figure 20:
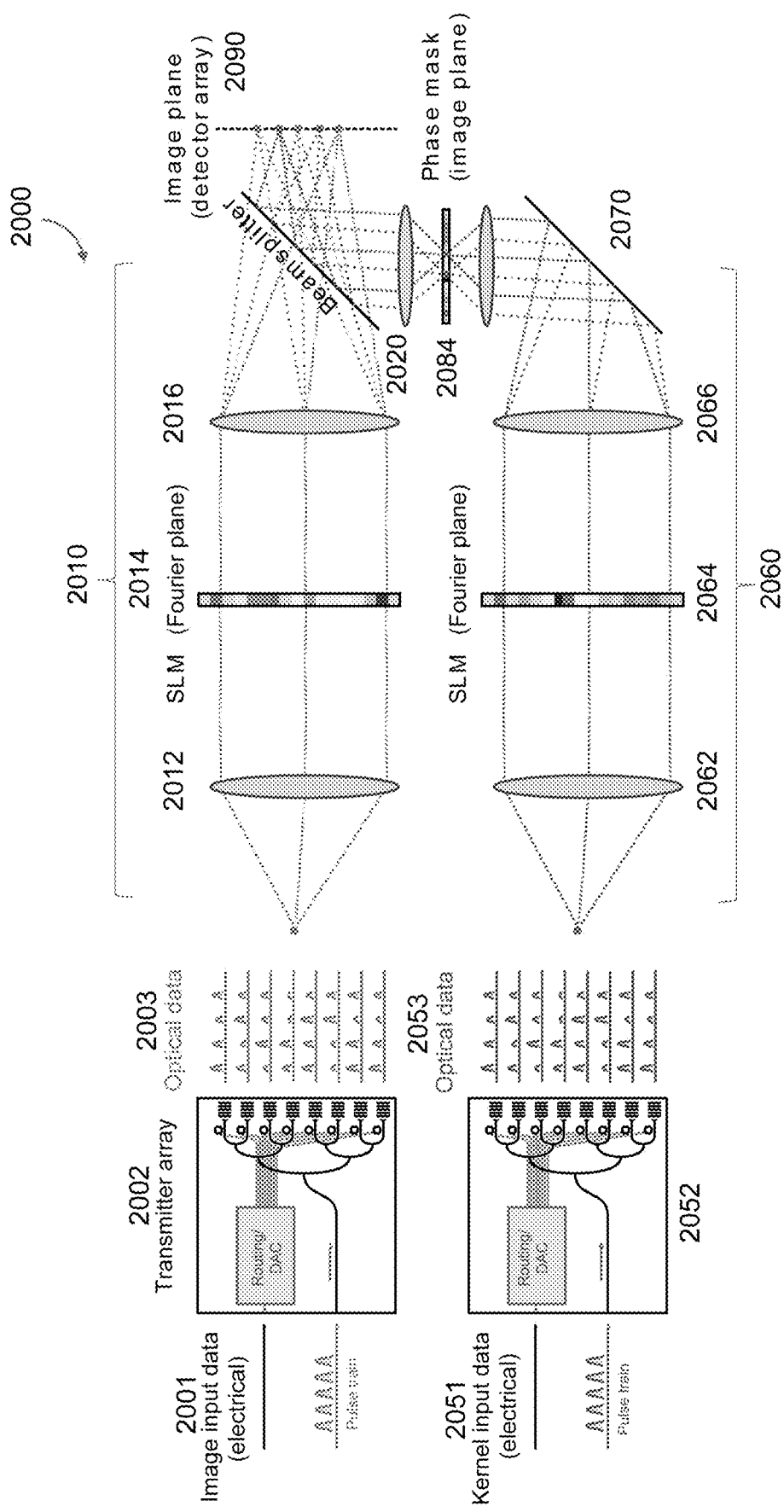

FIG. 20 illustrates an optical system for performing the Row-Column method of FIG. 18 and the Displaced Image Method of FIG. 19.

DETAILED DESCRIPTION

The Detailed Description of this specification is divided into different sections. Section 1 discloses additional details and examples of optical neural network accelerators, including a coherent optical matrix-vector multiplier (FIGS. 2A and 2B) and the extension to matrix-matrix (batched) operations (FIGS. 5A-5D). Section 2 discloses a related "digital" optical neural network, where the computation is performed in digital logic while the optics are used for data movement and fan-out. This is a well-adapted application of optical interconnects to deep neural networks. Section 3 discloses optical convolutional neural networks that combine the concepts in Sec. 1 and classical Fourier optics. Section 4 discloses alternative techniques for optical convolutional neural networks that use optical data fan-out and may be less complex than the Fourier-optical setup.

1. Large-Scale Optical Neural Networks Based on Coherent Detection

A system that performs the matrix-vector multiplication for a neural network optically using coherent (homodyne) detection can be fast, low-power, compact, and readily scalable to large ($N \gtrsim 10^6$) numbers of neurons. In contrast to other systems, it encodes both the inputs and weights in optical signals, allowing the weights to be changed on the fly at high speed. The ultra-high data bandwidth of multimode free-space optics and the high pixel density of CMOS photodetectors allows this system to scale to far more neurons than can be supported in nanophotonics. The optical energy consumption is subject to a fundamental standard quantum limit (SQL) arising from the effects of shot noise in the homodyne detectors, which lead to classification errors. Simulations based on MNIST neural networks empirically show the SQL to be 50-100 zJ/MAC. Using realistic laser, modulator, and detector energies, performance at the sub-fJ/MAC level should be possible with present technology. The optical system can be used for both fully connected and convolutional layers. Finally, backpropagation is straightforward to implement in this optical system, allowing both inference and training to be performed in the same optical device.

Coherent Matrix Multiplier

Figures 1, 2:
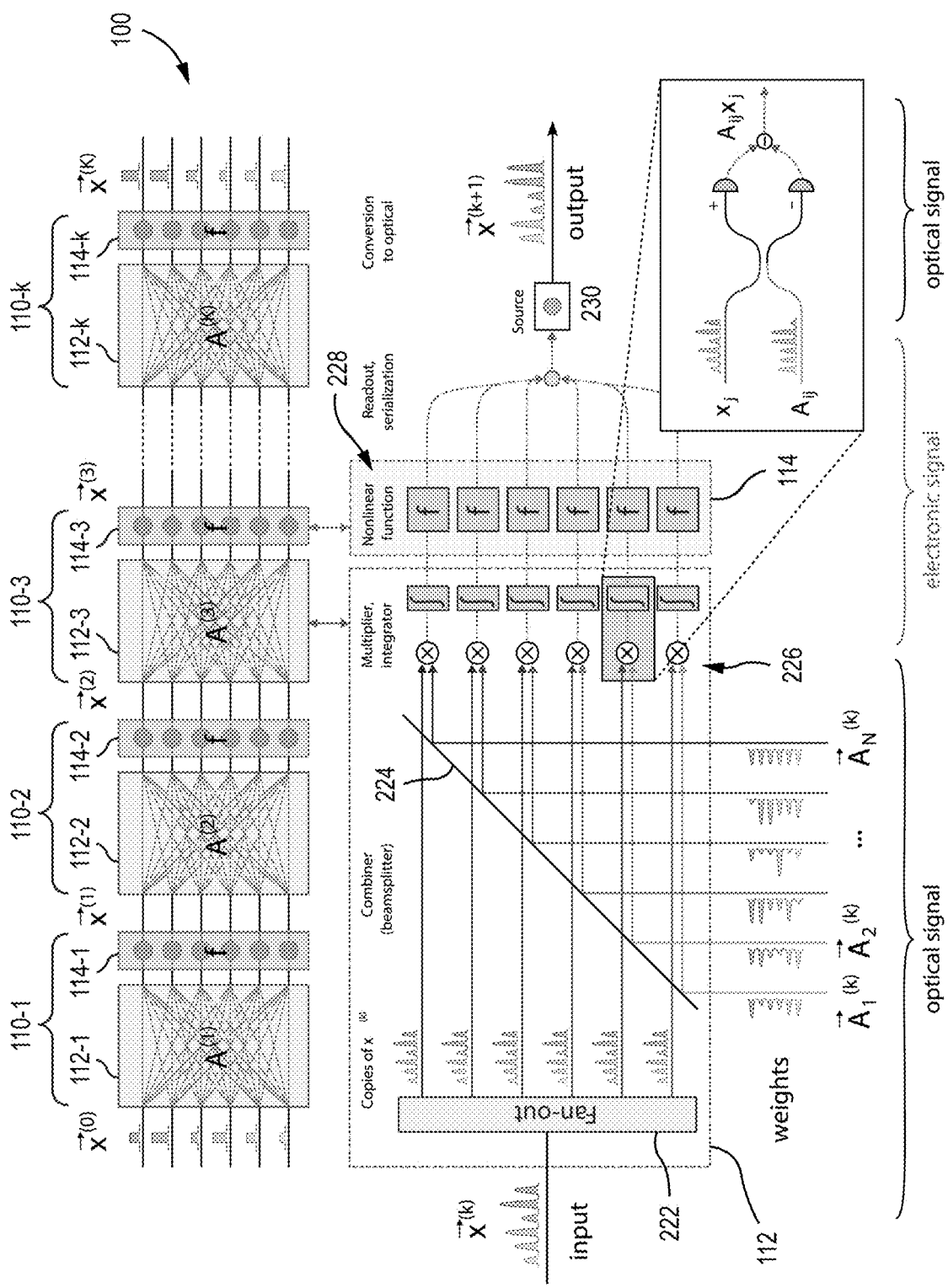
FIG. 1 illustrates the dataflow in a typical deep neural network, which includes a sequence of layers containing linear matrix-vector products and nonlinear activation functions.
FIG. 2 illustrates a homodyne optical neural network accelerator with temporally encoded weights. As shown, this accelerator implements a single layer in the neural network of FIG. 2A.

FIG. 1 illustrates a deep neural network 100. The neural network is a sequence of K layers 110-1 through 110-K, each including a matrix multiplication element 112 that performs the matrix multiplication $\vec{x} \rightarrow A\vec{x}$ and an element-wise nonlinearity element 114 that executes a corresponding neuron activation function $x_i \rightarrow f(x_i)$. The input into the $(k+1)^{th}$ layer 110-$k$+1 is related to the $k^{th}$ layer input 110-$k$ by:

$$x_i^{(k+1)} = f(\Sigma_j A_{ij}^{(k)} x_j^{(k)}) \qquad (1)$$

This optical processor 100 can work with both fully-connected and convolutional neural-network layers.

FIG. 2 illustrates special-purpose optical processor, also called an optical neural network accelerator, for artificial neural networks that can perform both (a) inference on pre-trained neural networks and (b) neural-network training. In this case, the accelerator is an optical implementation of a single layer 110 in the deep neural network 100 of FIG. 1 using coherent optical matrix multiplication. Many of these layers 110 can be pipelined together, e.g., as in FIG. 1, to create a single optical neural network with multiple layers. Alternatively, a single unit in FIG. 1 can be used to implement the entire deep neural network 100 with K layers. In this alternative, the layer's outputs are fed back into the input at each of K time steps via a switch (not shown), with one time step per layer in the neural network. The weights are also updated at each time step, so that the input to the layer 110 at the $(k+1)^{th}$ time step obeys the relationship given in Eq. (1). Actuating the switch at the output of the layer 210 directs the output at the $K^{th}$ time step to the output of the neural network instead of to the input of the layer 110.

Referring again to FIG. 2, inputs $\vec{x}$ and weights $\vec{A}_i$ are encoded onto optical pulse amplitudes $\vec{x}$ (while time encoding into pulses is shown, frequency encoding or a time-frequency hybrid is also acceptable). An optical fan-out element 222, such as a cylindrical lens or a 1×k beam splitter, splits the inputs $\vec{x}$ into copies, each of which is combined with a corresponding weight $\vec{A}_i$ with a beam splitter 224. The beam splitter 224 transmits the copies of the input signal to an array of differential homodyne detectors 226, which detect optical-domain interference between the copies of the input signal $\vec{x}$ and corresponding weight signals $\vec{A}_i$ reflected by the beam splitter 224. As explained below, each weight signal represents one row of a weight matrix. The homodyne detectors 226 produce an electrical domain signal representing the vector product between the input $\vec{x}$ and the weight matrix rows $\vec{A}_i$. This implements the linear step 114 for the layer.

Circuitry 228 coupled to the differential homodyne detectors 226 applies a nonlinear function (e.g., a Sigmoid function) in the electrical domain to each detector output, which are read out and used to serially modulate a light source 230, such as a laser, that emits a coherent optical carrier modulated with the layer output. This circuitry 228 may include an array of analog-to-digital converters (ADCs), an array of digital logic elements, and an array of digital-to-analog converters (DACs). Each ADC is coupled to a corresponding homodyne detector 226 and converts the analog detector output into a digital signal. A corresponding digital logic element applies the nonlinear function to the digital signal, which is then converted back into the analog domain by a corresponding DAC. The resulting analog signal modulates the light source 230 in series with the analog signals from the other DACs in the circuitry 228. This modulated optical signal emitted by the light source 230 becomes the input to the next layer 110 in the optical neural network 100. Alternatively, the electrical-domain outputs from the nonlinear step can be combined and encoded onto the optical domain using optical modulators, producing a pulse sequence that is combined with a fan-in element, such as another beam splitter, fed into the next layer 110 of the deep neural network 100.

The light source 230 in each layer 110 emits light (optical output signals) that is coherent with the light used to generate the optical weights for the subsequent layer 110. More specifically, the light source 230 in layer 110-1 emits light that is coherent with the light used to generate the optical weights in layer 110-2. This allows the weights and optical input signals for a given layer 110 to interfere at the homodyne detectors 226 in that layer 110. This can be accomplished by using a single pulsed laser to generate light that is distributed and modulated to provide weights and optical input/output signals for all of the layers (that is, one laser split 2K ways by a 1×K beam splitter); by using one laser per layer to generate the optical weights and optical input signals for that layer (that is, K lasers, each split two ways, for K layers 110); or by using pairs or arrays of lasers that are coherent with each other.

For a given layer 110, let N and N' be the number of input and output neurons, respectively. Input (output) data are encoded temporally as N (N') pulses on a single channel as shown in FIG. 2. This encoding, reminiscent of the Coherent Ising Machine, contrasts with other approaches used for neural networks, which encode inputs in separate spatial channels. As there are NN' weights for an N'×N fully-connected matrix, the weights enter on N' separate channels, each carrying a single matrix row encoded in time. The fan-out element 222 optically fans out the input data to an array of N' detectors 226, so that each detector 226 calculates the homodyne product between the two signals (inset). As long as both signals are driven from the same coherent source and the path-length difference is less than the coherence length, the charge $Q_i$ accumulated by homodyne receiver i is:

$$Q_i = \frac{2\eta e}{\hbar \omega} \int \text{Re}\left[E^{(in)}(t)^* E_i^{(wt)}(t)\right] dt \propto \sum_j A_{ij} x_j \quad (2)$$

Note that, due to properties of the Fourier transform, it is also possible to the encode the input (output) data in the frequency domain (e.g., in amplitudes of the teeth of a frequency comb) or in a hybrid fashion (e.g., a pulse train combined with wavelength multiplexing).

Here $E^{(in)}(t)$ and $E_i^{(wt)}(t)$ are the input and weight fields for receiver i, which are taken to be sequences of pulses with amplitudes proportional to $x_j$ and $A_{ij}$, respectively ($x_j$, $A_{ij} \in \mathbb{R}$). Thus, each receiver 226 performs a vector-vector product between $\vec{x}$ and a column $\vec{A}_i$ of the weight matrix; taken together, the N' electronic outputs give the matrix-vector product $A\vec{x}$. Fields are normalized so that power is given by $P(t) = |E(t)|^2$, and $\eta$ is the detector efficiency. A serializer 228 reads out these values one by one, applies the nonlinear function $f(\cdot)$ in the electrical domain, and outputs the result to a modulated source 230 to produce the next layer's inputs.

The inset of FIG. 2 shows the homodyne detector 226 in greater detail. The homodyne detector 226 includes a 2×2 beam splitter, with one input port for the input signal, one input port for the weight signal, and one photodiode 234 per output port. The homodyne detector 226 combines the advantages of optics and electronics: it can process data encoded at extremely high speeds, limited only by the bandwidth of the beam splitter 232 ($\gtrsim$THz) and the (optical) bandwidth of the photodiodes 234 (typically $\gtrsim$100 nm, or $\gtrsim$10 THz). The electrical bandwidth can be much slower, since only the integrated charge is measured. Finally, the optical neural network avoids the need for nonlinear optics that is a major stumbling block in all-optical logic: since the output is electrical, the dot product $A_{ij} x_j$ can be computed at extremely low power (aJ/MAC) using standard non-resonant components (photodiodes 234) that are CMOS-compatible and scalable to arrays of millions.

Coherent detection greatly simplifies the setup compared to alternative approaches. With a given set of weight inputs, the layer 110 in FIG. 2B takes N input pulses and N' detectors to perform a matrix-vector operation with NN' MACs, performing an operation that should scale quadratically with size using only linear resources. This is in contrast to electrical approaches that require quadratic resources (NN' floating-point operations total). The (optical) energy consumption of nanophotonic systems also scales linearly for the same operation; however, a nanophotonic circuit is much more complex, requiring a circuit with O(NN') phase shifters, which becomes very challenging to scale beyond several hundred channels and may be sensitive to propagation of fabrication errors.

The optical neural network accelerator in FIG. 2 does consume energy to generate the weights, which imposes an energy cost that scales quadratically. However, in many cases (particularly in data centers) neural networks are run simultaneously over large batches of data, so with appropriate optical fan-out, the cost of the weights can be amortized over many clients. Put another way, running the neural network on data with batch size B, the optical neural network computes a matrix-matrix product $Y_{N'\times B} = A_{N'\times N} X_{N\times B}$, which involves N'NB MACS, with an energy cost that should scale as O(N'N)+O(N'B)+O(NB) rather than O(N'NB).

Compared to all-electronic neural network processors, such as CMOS integrated circuits, the optical neural network accelerator shown in FIG. 1 consumes much less (e.g., ≳100×less) energy. Currently, artificial neural networks are run on CMOS integrated circuits, such as CPUs, GPUs and TPUs. The computing power of these circuits is limited by their energy consumption, with fundamental physics-based rules related to wire-charging capacitance that set lower limits to this energy consumption. The optical neural network accelerator in FIG. 1 performs connections optically and does not have the same lower limits on energy consumption as CMOS integrated circuits. In addition, the optical neural network accelerator in FIG. 1 can be scaled to much larger neural networks (e.g., ≳$10^6$ neurons per layer) than nanophotonic optical machine-learning approaches, which are usually limited by the chip areas of their photonic components.

The optical neural network accelerator in FIG. 1 can be used for a range of commercial applications, including cloud computing, data centers, and supercomputers, since these applications heavily utilize neural networks and suffer from high energy consumption and high cooling costs. Energy-limited embedded computing (e.g. image/video processing in drones, security cameras, phones) may also be possible. Machine learning is a huge industry. Many large and small companies (e.g., Amazon, Google, FloydHub, and Paperspace) provide cloud-computing GPU services specifically optimized for running deep neural networks. The development of the Google TPU (an ASIC specifically designed for neural-network inference and training) underscores the significant industry investment in developing special-purpose hardware for machine learning.

Deep Learning at the Standard Quantum Limit

As energy consumption is a primary concern in neuromorphic and computing hardware generally, an optical approach should outperform electronics by a large factor to justify investment in a new technology. In addition, optical systems should show great potential for improvement, e.g., by many orders of magnitude, to allow continued scaling beyond the physical limits of Moore's Law. Thus, it is worth investigating (1) the fundamental, physical limits to the energy consumption of an optical neural network and (2) the energy consumption of a practical, near-term optical neural network using existing technology.

Without being bound by any particular theory, the fundamental energy consumption limit for an optical neural network stems from quantum-limited noise. In an electrical signal, energy is quantized at a level $E_{el} = h/\tau_{el}$, where $\tau_{el} \sim 10^{-10}$ s is the signal duration. Optical energy is quantized at a level $E_{opt} = h/\tau_{opt}$, where $\tau_{opt} \equiv c/\lambda \sim (2-5) \times 10^{-15}$ s, which is $10^4$-$10^5$ times higher. As a result, $E_{opt} \gg kT \gg E_{el}$ and electrical signals can be treated in a classical limit governed by thermal noise, while optical signals operate in a zero-temperature quantum limit where vacuum fluctuations dominate. These fluctuations are read out on the photodetectors 234, where the photoelectric effect produces a Poisson-distributed photocurrent. While the photocurrents are subtracted in homodyne detection, the fluctuations add in quadrature, and Eq. (1) is replaced by:

$$x_i^{(k+1)} = f\left(\sum_j A_{ij}^{(k)} x_j^{(k)} + w_i^{(k)} \frac{\|A^{(k)}\|\|x^{(k)}\|}{\sqrt{N^2 N'}} \frac{\sqrt{N}}{\sqrt{n_{mac}}}\right) \quad (3)$$

Here the $w_i^{(k)} \sim N(0,1)$ are Gaussian random variables, $\|\cdot\|$ is the $L_2$ norm, and $n_{mac}$ is the number of photons per MAC, related to the total energy consumption of the layer by $n_{tot} = NN' n_{mac}$. The noise term in Eq. (3) scales as $n_{mac}^{-1/2}$, and therefore the signal-to-noise ratio (SNR) of each layer 220 should scale as SNR $\propto n_{mac}$. Since noise adversely effects the network's performance, the energy minimum should correspond to the value of $n_{mac}$ at which the noise becomes significant.

Figure 3A:
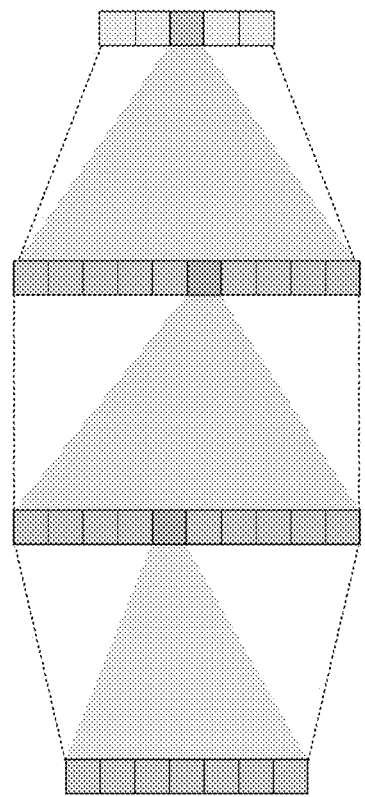
FIG. 3A illustrates a three-layer neural network with full connectivity.

To quantify this statement, we perform benchmark simulations using two versions of the three-layer, fully connected neural network shown in FIG. 3A. In the first version, the size of the inputs, two inner layers, and outputs scales as (784→100→100→10). In the second version, the size of the inputs, two inner layers, and outputs scales as (784→1000→1000→10). These networks are trained on the MNIST dataset as shown in FIG. 3B. While MNIST digit classification is a relatively easy task, the intuition developed here should generalize to more challenging problems. In the absence of noise, the networks classify images with high accuracy, as shown in FIG. 3B.

FIG. 3C shows the error rates for both networks as a function of photons per MAC $n_{mac}$ (equivalently energy $E_{mac} = (hc/\lambda) n_{mac}$, here $\lambda = 1.55$ μm). The plots in FIG. 3B indicate that the error rate is a monotonically decreasing function of $n_{mac}$. The two asymptotic limits correspond to the noiseless case ($n_{mac} \to \infty$, which returns the network's canonical accuracy), and the noise-dominated case ($n_{mac} \to 0$, where the network is making a random guess). The cutoff point, which is loosely defined as the lowest possible energy at which the network returns close to its canonical accuracy, and is around 0.5-1 aJ (5-10 photons) for the small network (inner layer size N=100), and 50-100 zJ (0.5-1 photon) for the large network (inner layer size N=1000). Without being bound by any particular theory, this bound stems from the standard quantum limit (SQL): the intrinsic uncertainty of quadrature measurements on coherent states, which is temperature- and device-independent. This should be viewed as an absolute lower bound for the energy consumption of neural networks of this type; although the use of squeezed light allows one to reach sensitivity below the SQL, this involves squeezing all inputs (including vacuum inputs) which may lead to a net increase in overall energy consumption.

The SQL is network-dependent, and not all layers contribute equally. For each MAC, we have SNR a $n_{mac}$; however, the signal adds linearly while the errors add in quadrature. As a result, the larger network is more resilient to individual errors because each output is averaging over more neurons. Moreover, the solid curves in FIG. 3C are restricted to the case when $n_{mac}$, is the same for all layers. The dashed lines show the error rate in a fictitious device where quantum-limited noise is only present in a particular layer. For the large network, a smaller $n_{mac}$ can be tolerated in the second layer, suggesting that slightly better performance could be achieved by tuning the energy for each layer.

Energy Budget

FIGS. 4A-4C illustrate how viewing the neural network as an analog system with quantum-limited performance shifts the paradigm for comparing neural networks. FIG. 4A shows the standard approach: a scatterplot comparing error rate with number of MACs, a rough proxy for time or energy consumption, for different fully-connected MNIST neural networks. There is a tradeoff between size and accuracy, with larger networks requiring more operations but also giving better accuracy.

FIG. 4B plots the error rate as a function of photon number for the same neural networks as in FIG. 4A. Each point in FIG. 4A becomes a curve in FIG. 4B because it is possible to vary the number of photons per MAC, and the energy bound is set by the total number of photons, not the number of MACs. While the general tradeoff between energy and accuracy is preserved, there are a number of counterintuitive results. For example, according to FIG. 4A, networks 1 and 2 have similar performance but the network 1 uses eight times more MACs, so under a conventional analysis, network 2 would always be preferred. However, FIG. 4B indicates that network 1 has better performance at all energy levels. This is because network 1 is less sensitive to shot noise due to averaging over many neurons, and therefore can be operated at lower energies, compensating for the increased neuron count. The same apparent paradox is seen with networks 3 and 4. This suggests that, in a quantum-limited scenario, reducing total energy may not be as simple as reducing the number of operations. Besides, the total energy may will depend on many other factors besides the SQL.

FIG. 4C is a plot of energy per MAC as a function of the average number of input neurons per layer N, a rough "size" of the neural network. The SQL data are plotted for the eight networks in FIGS. 4A and 4B, and the corresponding dashed line is an empirical fit. SQL dots correspond to minimum $E_{mac}$ to make the error rate $p_{err}(E_{mac})<1.5p_{err}(\infty)$ (error bars correspond to $p_{err}(E_{mac})=))[1.2, 2.0]p_{err}(\infty))$. $E_{mac}=n_{mac}(hc/\lambda)$, $\lambda=1.55$ µm. The SQL is an absolute lower bound, assumes perfect detectors, and only counts input optical energy. In a realistic device, this curve may be shifted up by a factor $(\eta_d \eta_c \eta_s \beta_{mod})^{-1}$, where $\eta_d$, $\eta_c$ and $\eta_s$ are the detector, coupling, and source (laser) efficiencies and $\beta_{mod}$ is the modulator launch efficiency.

The detector electronics also affect the energy budget. The homodyne signal from each neuron is sent through a non-linear function $y_i \rightarrow f(y_i)$ and converted to the optical domain using a modulator or by modulating a light source directly (e.g., as in FIG. 2B). One way to do this is to digitize the signal, perform the function $f(\cdot)$ in digital logic, serialize the outputs, convert back to analog, and send the analog signal into the modulator. ADCs in the few-pJ/sample regime are available and simple arithmetic can be performed at the pJ scale. A range of modulator designs support few-fJ/bit operation. Thus, a reasonable near-term estimate would be few-pJ/neuron; this figure is divided by the number of inputs per neuron to give the energy per MAC (top sloped curve in FIG. 4C). A much more aggressive figure of 1 fJ/neuron is also plotted in FIG. 4C—approaching this bound may be possible with state-of-the-art modulators, but this bound is below the energy figures for ADCs. It may be achievable using well-designed analog electronics. At these energies, the SQL becomes relevant, but as mentioned above, due to optical inefficiencies the SQL may be relevant at much higher energies as well.

For context, the ~1 pJ/MAC figure from state-of-the-art ASICs is shown in FIG. 4C (top trace). Energy consumption in non-reversible logic gates is bounded from below by the Landauer (thermodynamic) limit $E_{op}=kT\log(2)\approx 3$ zJ. While multiply-and-accumulate is technically a reversible operation, realistic computers perform this operation using non-reversible binary gates, so Landauer's principle applies. A 32-bit multiplication involves approximately $10^3$ binary gates and each bit operation consumes at least $kT\log(2)$, giving a limit $E_{mac} \geq 3$ aJ (dotted line in FIG. 4C). This is already higher than the SQL for the larger networks with $N \geq 100$. The optical neural network can achieve sub-Landauer performance because the matrix product is performed through optical interference, which is reversible and not subject to the Landauer bound.

A final consideration is the energy required to generate the weights in the first place. There is one weight pulse per MAC, so at the minimum this may be 1 fJ/MAC for the modulator and may rise above 1 pJ/MAC once the driver electronics and memory access are included. However, once the optical signal is generated, it can be fanned out to many neural networks in parallel, reducing this cost by a factor of B, the batch size. Large batch sizes should enable this contribution to $E_{mac}$ to reach the few-femtojoule regime, and potentially much lower.

Training and Convolutions with Optical GEMM

As discussed above, the optical unit in FIG. 2B computes a matrix-vector product. Running multiple units in parallel with the same set of weights yields a general matrix-matrix product (GEMM), a function in the Basic Linear Algebra Subprograms (BLAS).

FIG. 5A shows a schematic for an optical GEMM unit 500 based on homodyne detection inspired by the neural-network concept illustrated in FIG. 2B. The inputs are two matrices $(M_1)_{m \times k}$ and $(M_2)_{n \times k}$, encoded into optical signals on the 1D transmitter arrays 510a and 510b, and mapped with cylindrical lenses (not shown) and a bulk optical beam splitter 520 to rows (columns) of a 2D detector array 530.

FIG. 5B shows a 1D transmitter array 510 in greater detail. The 1D transmitter array includes a waveguide 512 that receives an optical pulse train from a pulsed laser, modulated continuous-wave laser, or other suitable source. The waveguide branches, splitting the optical pulse train into multiple copies. At the same time, routing and digital-to-analog conversion (DAC) circuitry 514 converts digital input signals into analog signals for driving modulators 516 at the outputs of the branched waveguide 512. The 1D transmitter array 510 emits the resulting modulated optical pulses as matrix elements that are arrayed in one spatial dimension, indexed by i, and in time, indexed by j.

From the accumulated charge at each pixel in the detector array 530, one can extract the matrix elements of the product $(M_1 M_2^T)_{m \times n}$. This operation uses m·n·k MACs, with a total energy consumption (and energy per MAC) of:

$$E_{tot} = (mk+nk)E_{in} + (mn)E_{out}, \quad E_{mac} = \left(\frac{1}{n}+\frac{1}{m}\right)E_{in} + \frac{1}{k}E_{out} \quad (4)$$

where $E_{in}$, $E_{out}$ are the transmitter and receiver energy use, per symbol, which include all optical energy plus electronic driving, serialization, DAC/ADC, etc. If the matrix dimensions (m, n, k) are large, significant energy savings per MAC are possible if $E_{in}, E_{out}$ can be kept reasonably small.

FIG. 5C shows matrix operations for inference, training, and back-propagation in a deep neural network that can be executed by the optical system 500 in FIG. 5A. When running a batch of B instances $X=[x_1 \ldots x_B]$, the output $Y=[y_1 \ldots y_B]$ can be computed through the matrix-matrix product $Y=AX$. In fully-connected layers, training and back-propagation also rely heavily on GEMM. The goal of training is to find the set of weights $A^{(k)}$ that minimize the loss function L, which characterizes the inaccuracy of the model. Training typically proceeds by gradient-based methods. Since the loss depends on the network output, training starts at the final layer and works backward in a process called back-propagation. At each layer, the optical processor 500 computes the gradient $(\nabla_A L)_{ij}=\partial L/\partial A_{ij}$ from the quantity $(\nabla_Y L)_{ij}=\partial L/\partial Y_{ij}$, and propagates the derivative back to the input $(\nabla_X L)_{ij}=\partial L/\partial X_{ij}$ (FIG. 5(c)). These derivatives are computed from the chain rule and can be written as matrix-matrix multiplications:

$$\nabla_A L=(\nabla_Y L)X^T, \nabla_X L=A^T(\nabla_Y L) \quad (5)$$

Once the derivative has been propagated to $\nabla_{X^{(k)}}L$ (for layer k) we use the chain rule to compute $\nabla_{Y^{(k-1)}}L=f'(\nabla_{X^{(k)}}L)$ and proceed to the previous layer. In this way, the optical processor 500 sequentially computes the derivatives $\nabla_{A^{(k)}}L$ at each layer in the neural network.

In addition to fully-connected layers, it is also possible to run convolutional layers on the optical GEMM unit by employing a technique called patching. In a convolutional layer, the input $x_{ij;k}$ is a W×H image with C channels. This is convolved to produce an output $y_{ij;k}$ of dimension W'×H' with C' channels:

$$y_{ij;k}=\Sigma_{i'j',l}K_{i'j',kl}x_{(s_x i+i')(s_y j+j');l} \quad (6)$$

Here $K_{i'j',kl}$ is the convolution kernel, a 4-dimensional tensor of size $K_x \times K_y \times C' \times C$, and $(s_x, s_y)$ are the strides of the convolution. Naïvely vectorizing Eq. (6) and running it as a fully-connected matrix-vector multiply is very inefficient because the resulting matrix is sparse and contains many redundant entries.

FIG. 5D illustrates a patching process to recast a convolution ($K_x=K_y=3$, $s_x=s_y=2$ shown) as a matrix-matrix multiplication. Patching expresses the image as a matrix X of size $K_x K_y C \times W'H'$, where each column corresponds to a vectorized $K_x \times K_y$ patch of the image. The elements of the kernel are rearranged to form a (dense) matrix K of size $C' \times K_x K_y C$. Eq. (6) can then be computed by taking the matrix-matrix product Y=KX, which has size C'×W'H'.

On virtually any microprocessor, GEMM is a highly-optimized function with very regular patterns of memory access; the benefits of rewriting the convolution as a GEMM greatly outweigh the redundancy of data storage arising from overlapping patches. The time to rearrange the image as a patch matrix is typically very small compared to the time to compute the GEMM; therefore, by accelerating the GEMM, the optical matrix multiplier significantly increases the speed and energy efficiency of convolutional layers.

Since the optical processor performs the convolution as a matrix-matrix (rather than matrix-vector) operation, it is possible to obtain energy savings even without running the neural network on large batches of data. Computing the convolution requires W'H'$K_x K_y$C'C MACs. Following Eq. (4), the energy per MAC (not including memory rearrangement for patching) is:

$$E_{mac} = \underbrace{\left(\frac{1}{C'}+\frac{1}{W'H'}\right)}_{1/c_{in}}E_{in} + \underbrace{\frac{1}{K_x K_y C}}_{1/c_{out}}E_{out} \quad (7)$$

The coefficients $c_{in}=(1/C+1/W'H')^{-1}$ and $c_{out}=K_x K_y C$ govern the energy efficiency when the optical processor 500 is limited by input/output energies (transmitter/receiver and associated electronics). Since reading a 32-bit register takes pJ of energy, a reasonable lower bound for near-term systems is $E_{in}$, $E_{out} \gtrsim 0$. Thus, the optical processor 500 should have $c_{in}$, $c_{out} \gg 1$ for its energy performance to beat an ASIC (~pJ/MAC).

TABLE 1

Layers in AlexNet. Values of $c_{in}$, $c_{out}$ are calculated from Eq. (7). Max-pooling layers after CONV1, CONV2 and CONV5 are used to reduce the image size, but the relative computational cost for these layers is negligible.

| Layer | Input | Output | Kernel | Stride | MACs | $c_{in}$ | $c_{out}$ |
|---|---|---|---|---|---|---|---|
| CONV1 | 227 × 227 × 3 | 55 × 55 × 96 | 11 × 11 × 96 × 3 | 4 | 105M | 93 | 363 |
| (pool) | 55 × 55 × 96 | 27 × 27 × 96 | — | 2 | — | — | — |
| CONV2 | 27 × 27 × 96 | 27 × 27 × 256 | 5 × 5 × 256 × 96 | 1 | 448M | 189 | 2400 |
| (pool) | 27 × 27 × 256 | 13 × 13 × 256 | — | 2 | — | — | — |
| CONV3 | 13 × 13 × 256 | 13 × 13 × 384 | 3 × 3 × 384 × 256 | 1 | 150M | 117 | 2304 |
| CONV4 | 13 × 13 × 384 | 13 × 13 × 384 | 3 × 3 × 384 × 384 | 1 | 224M | 117 | 3456 |
| CONV5 | 13 × 13 × 384 | 13 × 13 × 256 | 3 × 3 × 256 × 384 | 1 | 150M | 102 | 3456 |
| (pool) | 13 × 13 × 256 | 6 × 6 × 256 | — | 2 | — | — | — |
| FC1 | 6 × 6 × 256 | 4096 | — | — | 38M | — | — |
| FC2 | 4096 | 4096 | — | — | 17M | — | — |
| FC2 | 1000 | 1000 | — | — | 4M | — | — |
| | 1.08 G | 132 | 1656 | | | | |
| | 59M | — | — | | | | |

As a benchmark problem, consider AlexNet, shown in FIG. 6A, the first convolutional neural network to perform competitively at the ImageNet Large-Scale Visual Recognition Challenge. AlexNet includes five convolutional (CONV) layers and three fully-connected (FC) layers. Consistent with deep neural networks generally, the majority of AlexNet's energy consumption comes from the CONV layers. TABLE 1 above gives the layer dimensions and the values of $c_{in}$, $c_{out}$ for the CONV layers in AlexNet. The MAC-weighted averages for all layers are $\langle c_{in}\rangle$>100 and $\langle c_{out}\rangle$>1000. Thus, even under extremely conservative assumptions of $E_{in}$, $E_{out} \gtrsim 100$ pJ (comparable to DRAM read energies), it is still possible to achieve sub-pJ/MAC performance. More advanced technology, such as few-fJ optical interconnects, may significantly reduce $E_{in}$ and $E_{out}$, and therefore the energy per MAC. However, the performance is still fundamentally limited by detector shot noise (e.g., Eq. (3) for FC layers).

Using a pre-trained AlexNet model, FIG. 6B shows the top-10 accuracy on the ImageNet validation set as a function of the number of photons per MAC $n_{mac}$. Consistent with FIG. 3C, there are two limits: $n_{mac}$, ≪1 corresponds to the random guess regime with 99% error rate (for top-10 accuracy with 1,000 classes), while $n_{mac} \gg 1$ recovers the accuracy of the noiseless model.

The dashed lines in FIG. 6B show the (fictitious) case where noise is present in only a single layer, while the solid line corresponds to the case where all layers have noise and $n_{mac}$, is the same for each layer. Not all layers contribute equally to the noise: CONV1 is the most sensitive, requiring $n_{mac} \gtrsim 20$, while the deeper layers (particularly the fully-connected layers) can tolerate much lower energies $n_{mac} \gtrsim 1$. Since the SNR is related to the total power received, which scales as $c_{out} n_{mac}$ for the convolutional layers ($c_{out}$ pulses per detector), it is not surprising that the deeper layers, which have a larger $c_{out}$, are less sensitive to quantum noise. The SQL obtained for AlexNet ($n_{mac} \gtrsim 20$ or $E_{mac} \gtrsim 3$ aJ) is slightly larger than that from the MNIST networks in FIG. 3C, but of the same order of magnitude, suggesting that the SQL is somewhat problem-dependent.

Discussion

This architecture for optically accelerated deep learning is scalable to large problems and can operate at high speeds with low energy consumption. It takes advantage of the photoelectric effect, via the relation $I \propto |E|^2$, to compute the required matrix products opto-electronically, obviating the need for all-optical nonlinearity that has hobbled past approaches to optical computing. Since the device can be constructed with free-space optical components, it can scale to much larger sizes than nanophotonic implementations, being ultimately limited by the size of the detector array (e.g., $N \gtrsim 10^6$).

One advantage to this optical processor is that the multiplication is performed passively by optical interference, so the main speed and energy costs are associated with routing data into and out of the optical processor. For a matrix multiplication $C_{m \times n} = A_{m \times k} B_{n \times k}$, the input/output (I/O) energy scales as $O(mk) + O(nk) + O(mn)$, while the number of MACs scales as $O(mnk)$. For moderately large problems found in convolutional neural-network layers (e.g., m, n, $k \geq 100$) with moderate input/output (I/O) energies (e.g., ~pJ), performance in the ~10 fJ/MAC range should be feasible, which is 2-3 orders of magnitude smaller than state-of-the-art CMOS circuits. Advances in optical interconnects may reduce the I/O energies by large factors, translating to further reductions in energy per MAC.

The fundamental limits to optical processors affect their long-term scaling. For the optical neural network presented here, detector shot noise presents a standard quantum limit (SQL) to neural network energy efficiency. Because this limit is physics-based, it cannot be engineered away unless non-classical states of light are employed. Monte Carlo simulations of pre-trained models for MNIST digit recognition (fully-connected) and ImageNet image classification (convolutional) show that optical neural network performance is a function of the number of photons used, which sets a lower bound on the energy per MAC. This bound is problem- and network-dependent and lies in the range 50 zJ-5 aJ/MAC. By contrast, the Landauer limit for electronic neural networks is 3 aJ/MAC (assuming 1,000 bit operations per MAC); sub-Landauer performance is possible in optical neural networks because the multiplication is performed through optical interference, which is reversible and not bounded by Landauer's principle.

2. Digital Optical Neural Networks with Holographic Optical Fan-Out Interconnects Convolutional neural networks (CNNs) are a key tool in machine learning. As neural networks grow larger and deeper, so do the energy requirements of the convolutional layers. Even small CNNs (by 2018 standards) like AlexNet use nearly 0.5 GMACs per classification step, and more modern CNNs use orders of magnitude more. Thus, there is strong motivation to find special-purpose hardware to both speed up and increase the energy efficiency of CNNs.

Taxonomy of Convolutional ONNs

The section above describes an analog optical neural network (ONN) based on homodyne imaging. This section describes a digital optical CNN. In a conventional processor, both the logic and the interconnections are done in electronics. The digital ONN retains the electronics for logic, but does interconnection using optics. Holography and Fourier optics are especially well-suited to realize the data and weight fan-out in a convolutional network, which reduces the number of memory-access calls per MAC by a large factor, significantly reducing the total energy consumption.

TABLE 2 lists differences between electronic CNNs, digital ONNs, analog ONNs, and coherent ONNs. An analog ONN uses analog circuits in place of the digital logic in a digital ONN. Because energy consumption in the digital ONN is limited by the arithmetic logic units (ALUs), replacing digital logic with analog circuits can deliver several orders of magnitude of speed and efficiency gains despite analog noise and calibration issues. While analog, this system is still optically incoherent and relies on the optics only for communication. The most powerful neural network is the coherent ONN, which performs both logic and communication optically, relying on electronics merely as a buffer for integration and readout. The coherent system beats the energy consumption analog and digital ONN by several orders of magnitude; however, it is the most complex of the three systems and uses coherent sources and detection.

TABLE 2

Comparison between different CNN hardware platforms.

| | GPU/TPU | ONN (digital) | ONN (analog) | ONN (coherent) |
|---|---|---|---|---|
| Logic | Digital ALUs | Digital ALUs | Analog electronics | Optical (homodyne) |
| Interconnects | Wires | Optical (incoherent) | Optical (incoherent) | Optical (coherent) |
| Energy/MAC | $\gtrsim 20$ pJ | <1 pJ | $\gtrsim$ fJ | aJ-fJ |

Before describing the digital ONN in greater detail below, it is useful to discuss the differences between fully-connected (FC) and convolutional (CONV) layers so that one can glean insight into how optical connections can save energy. An FC layer has all-to-all connectivity between neurons: $y_j = \Sigma_j A_{ij} x_j$. Therefore, one desires a broadcast connection (one-to-all) for the data, while the weight connections are one-to-one (Sec. 1). Significant savings are possible by routing the data optically, but most of the energy in FC layers comes from accessing the weights; reducing this contribution depends on careful engineering of the weight server and running multiple neural networks in parallel, amortizing the cost of the weights.

A convolutional layer, by contrast, implements a far more structured map:

$$\frac{y_{ij;n}}{(W' \times H' \times C')} = \sum_{kl;n} \left( \frac{K_{kl;mn}}{(K_x \times K_y \times C' \times C)} \frac{x_{i+k,j+l;n}}{(W \times H \times C)} \right) \quad (8)$$

Here (k,l) are the x- and y-indices of a pixel, and m is the channel index. Typical dimensions are W, H, W', H'=10-50, $K_x$, $K_y$=3-5, and C, C'=100-400 in the hidden layers. Each input $x_{ij;m}$ is fanned out to $K_x K_y C'$ outputs, while each weight is fanned out W'H' times. This is an extraordinary amount of redundancy, both for inputs and for weights. Therefore, significant performance improvements are possible if one can passively perform the required fan-out. As I will show in the following section, free-space optics can be adapted to precisely this end, both in the digital and analog (incoherent) cases.

Interconnects for a Digital ONN

FIG. 7A shows a single CONV layer for a CNN. The convolution Eq. (8) is represented as a weighted fan-in to a single output pixel $y_{ii}$ as shown in FIG. 7B. By flipping the kernel around, the convolution can equivalently be viewed as a fan-out from a single pixel $x_{kl}$ as shown in FIG. 7C. The fan-out picture is helpful for designing an optical interconnect that reduces or minimizes the number of memory calls (either from inputs or weights) per calculation.

Patch Method for Input Fan-Out: Maximum Input Fan-Out

Each input maps to $K_x K_y C'$ outputs. This fan-out can be achieved if each input pixel can be mapped to a $K_x \times K_y$ patch of output pixels, with each output pixel comprising C' detectors (sub-pixels), one for each channel. This effectively down-samples the image, and channel data is sent in sequentially, so $K_x K_y C$ clock cycles are used to transfer the data, but since the total number of MACs is $K_x K_y W'H'C'C$ and approximately $(W'/K_x)(H'/K_y)C'$ MACs are performed per clock cycle, the ALUs are operating at near 100% utilization in this scheme, which is very efficient.

FIG. 8 illustrates this patch method 800 and its implementation with a Fourier optical system shown in FIGS. 9A and 9B and described below. In this method 800, a (W×H)=9×9 image is convolved with a $(K_x \times K_y)$=3×3 kernel. First, the image is broken into patches of size $K_x \times K_y$ (802). Rather than firing all inputs simultaneously, only one pixel fires per patch in a given "frame." To transmit the data, the CONV layer uses $K_x \times K_y$ frames, and each frame includes C steps, where C is the channel dimension.

Following Eq. (8) and FIG. 7C, for maximum fan-out, the active pixel (i,j) is mapped to the $K_x \times K_y$ patch that intersects (i,j) at the lower-right corner, that is, (i–k, j–l) for all k<$K_x$, l<$K_y$. To do so, the transmitter output is convolved with a box function that spreads the field evenly over all pixels in the patch (804). The convolution causes all pixels to fill up their respective patches, resulting in a "down-sampled" image 806.

Each $K_x \times K_y$ patch is weighted with a (flipped) kernel (e.g., as in FIG. 7C). Therefore, the kernel is accordingly convolved with a lattice of delta-functions with x- and y-spacing $K_x$ and $K_y$, respectively (814). This convolution causes the $K_x \times K_y$ kernel to tile the image (816). Care should be taken to ensure that the kernel tiles line up with the input patches; thus, each frame should input an appropriately shifted kernel as shown in FIG. 8.

The input and kernel signals are imaged onto a detector chip (808), which has W'×H' pixels with C' sub-pixels per pixel and within each sub-pixel, an ALU to do MACs, and one detector each for $x_{ij;n}$ and $K_{kl;mn}$. For each step, within a given pixel the x sub-pixel inputs are the same (broadcast of optical data), while the K sub-pixel inputs are different. During frame (k,l), each pixel (i,j) is performing an all-to-all matrix-vector multiply between matrix $K_{kl;mn}$ and vector $x_{i+k,j+l;n}$ (Eq. (8)). Within each pixel, the process is identical to the digital ONN for FC layers disclosed above.

TABLE 3

Comparison between $D^2NN$, a coherent Fourier ONN, and a digital ONN

| | $D^2NN$ | Fourier ONN (Sec. 3) | Digital ONN |
|---|---|---|---|
| Encoding | Analog | Analog | Digital |
| Coherence? | Yes | Yes | No |
| Inputs $x_{ij;n}$ | Optical | Optical | Optical |
| Kernel $K_{ij;mn}$ | SLMs/ diffraction layers | Optical | Optical |
| Use of Fourier optics | Perform convolution | Perform convolution | Fan out data |
| # channels | 1 | >>1 | >>1 |

A convolution can be implemented with two Fourier transforms and a filter:

$$A * \otimes B = \sqrt{2\pi} \mathcal{F}^{-1}[\mathcal{F}(A)^* \mathcal{F}(B)] \quad (9)$$

Since the convolutions in the method 800 of FIG. 8 are taken on spatially-encoded optical data, they can be performed using Fourier optics: convert the image to its Fourier transform with a lens, pass the Fourier-transformed image through an SLM, and perform an inverse Fourier transform on the SLM output with another lens. This looks deceptively similar to the recent "diffractive deep neural network" ($D^2NN$) because both networks perform convolutions and use Fourier optics. However, the similarities end there. In the $D^2NN$, the kernel is hard-coded into the diffraction layers; by contrast, the digital ONN disclosed here encodes the kernel optically, which allows it to be changed on the fly and shared among multiple "client" networks if a batch of data is being processed in with the same network. Another distinction is that although the $D^2NN$ and the Fourier ONN both use the optical Fourier transform to perform the convolution (albeit in different ways), a digital ONN uses the optical Fourier transform only to fan out the data. Because the data in for the digital ONN is encoded digitally, Fourier optics, which are designed for coherent analog signals, would not perform the convolution correctly.

Performing the optical fan-out efficiently can be tricky in practice. If the phase of the light should be constant, there will be an N-fold power reduction when fanning out one mode to N modes. This can be seen by inputting a plane wave (all pixels on with same amplitude). Since the convolution of a constant is also a constant, without the factor-of-N hit, the output power would be greater than the input power. In terms of Eq. (9), the input light is a series of tightly confined dots with most power at large spatial frequencies. This power is filtered out by the box convolution, which is a tightly-peaked sin h. Fortunately, the patch method 800 for the digital ONN does not rely on the optical phase. Relaxing the phase constraints, some results from Fourier holography can be used here.

FIG. 9A illustrates the basic principle of Fourier holography in a 4$f$ optical system, where $f$ is the focal length of the lenses and 4$f$ refers to the total system length. A point source 902 is mapped to a plane wave using a confocal lens 904, and the amplitude and/or phase of that wave is modified using a spatial filter or SLM 906 in the Fourier plane 907 of the confocal lens 904. A second lens 908 Fourier-transforms this waveform into an image (the Fourier hologram 910). It is possible to produce a Fourier hologram with high image quality and good efficiency by using a quadratic (Guoy) or random phase pattern with error diffusion. FIG. 9B shows that the effect is the same as a convolution for multiple point sources 912 as long as the resulting holograms 920 do not overlap. Thus, the fan-out convolutions in FIG. 8 can be performed all-optically. The fan-out kernels are static, can be pre-computed, and depend only on the size of the kernel $K_{ij;mn}$, not its values. Therefore, the SLM state can be changed infrequently (e.g., when the kernel size changes), so is unlikely to affect the computation time or energy consumption.

While the input fan-out is extremely efficient, the kernel fan-out is less so. Each kernel weight is called W'H' times, however, the fan-out in FIG. 8 is $(W'/K_x)(H'/K_y)$. While still ≳20 for typical CNN layers, this is much less than the input fan-out ratio. To reduce it further, the CONV layer can be run on multiple datasets at once, increasing the potential fan-out by the batch size.

Another complication arises from the kernel "shifting" done to ensure the kernel patches lined up with the data patches. If done electronically, this may incur a large communication cost if the chip is not sufficiently small (the amount of memory required for weights is actually quite large—$K_x$ and $K_y$ are minimal, but C and C' can be in the hundreds). The shifting could be done optically using programmable nanophotonic processors (PNPs) or a fast beam-steering SLM if one can be developed, but these technologies are in their infancy and may be power-hungry (and there are many modes to shift: $K_x K_y C'$ in all). The added energy costs of shifting should be sufficiently diluted by the fan-out that they become irrelevant.

Shift Method for Input and Kernel Fan-Out: Maximum Kernel Fan-Out

FIG. 10 illustrates a shift method 1000 for fanning out inputs and kernels that maximizes kernel fan-out. As before, the calculation is broken down into $K_x K_y$ frames, with each frame including C steps, one for each input channel (1002). Each frame corresponds to a pair (k,l) in Eq. (8). Each frame is convolved with a box function (1004), resulting in a "down-sampled" image 1006, which is weighted with a kernel.

Each kernel element $K_{kl;mn}$, which is a C'×C fully-connected matrix, is convolved with a lattice of delta-functions (1014) and broadcast to all pixels during the frame (there are C steps per frame and C' sub-pixels per pixel, allowing C'C matrix elements to be transferred during the frame) for detection by a detector array (1008). Thus, the weight fan-out is W'H', the maximum possible fan-out (1016). Typically, this is around 100-2000 for CONV layers. As in the patch method 800 (FIG. 8), this fan-out can be achieved all-optically using Fourier holography, e.g., using the Fourier optical system shown in FIGS. 9A and 9B with the SLM 906 set to produce the desired shifts for the input and kernel fan-out.

The price for maximizing kernel fan-out is a reduced fan-out for the inputs and some added complexity in sending them in. The input fan-out is C' rather than $K_x K_y C'$ since the pixels are mapped one-to-one (convolution and fan-out still happen because each input maps to all C' sub-pixels). However, the channel number is large in hidden CONV layers, so this is typically hundreds.

In addition, the shift method 1000 uses shifted images rather than the originals. The shifting can be done electronically at a cost of higher energy per bit (because we need to send data between pixels in each step). However, reading data from a Network-on-Chip (NoC) or local buffer is usually only 2-6 times more costly than reading from a register, so fan-out should win out over this added cost.

Finding an efficient optical steering mechanism to do the shifts is not essential to this scheme (or the patch method 800 in FIG. 8). However, it would allow some benefits: local memory accesses for the $x_{ij;m}$, and if the sum in Eq. ([eq:s3-conv]) is done in the right order (iterate over (k,l) in the inner loop, n in the outer loop), the effective fan-out increases to $K_x K_y C'$ because the modulator is only set once at the beginning of the $K_x K_y$ consecutive pulses (for channel n). (Likewise, one can increase the kernel fan-out in the patch method 800.) Several ways to optically steer an image are programmable PNPs or beam-steering SLMs. One- or two-dimensional steering can also be achieved with a frequency-swept source and one- or two-dimensional grating or virtually image phased array.

The initial layers of CNNs down-sample using a stride $s_x$, $s_y$ > 1. Thus, the convolution function becomes:

$$y_{ij;m} = \sum_{kl;n} K_{kl;mn} x_{s_x i+k, s_y j+l;n}$$

Stride reduces the output size (W', H') as well as fan-out because we are no longer taking a convolution over every $K_x \times K_y$ block. While the kernel fan-out is unaffected, input fan-out is reduced to $\lceil K_x/s_x \rceil \lceil K_y/s_y \rceil C'$ for the patch method 800 of FIG. 8. The fan-out in the shift method 1000 is unaffected because each input is fanned out to one pixel in each step anyway. Stride also scrambles the order of the shifted kernels in the patch method 800 of FIG. 8, but this can be pre-computed.

TABLE 4

Comparison of patch and shift methods for optical fan-out.

| | Input fan-out | Kernel fan-out | Steps | Complexity |
|---|---|---|---|---|
| Theoretical Limit | $\lceil K_x/s_x \rceil \lceil K_y/s_y \rceil C'$ | W'H' | — | — |
| Patch Method | $\lceil K_x/s_x \rceil \lceil K_y/s_y \rceil C'$ | W'H'/$K_x K_y$ | $K_x K_y C$ | Kernel shifting |
| Shift Method | C' | W'H' | $K_x K_y C$ | Input shifting |

Incoherent Analog ONN

The same optical fan-out can be ported to an incoherent analog ONN, which may be orders of magnitude more efficient than a digital ONN. In the best-case scenario, the memory-access costs can be rendered negligible. Since this comprises 80-90% of the energy in CNNs like AlexNet, as shown in FIG. 11A, the energy reduction may be only a ten-fold. A floating-point operation at 32-bit involves around 1,000 gate operations and consumes about 1 pJ. By extrapolation, if the operation were performed in analog, with one or two transistors, it should consume O(fJ).

FIG. 11B shows a simple analog circuit that implemented a weighted MAC: $\Sigma_i f(K_i) x_i$. The top photodetector charges the transistor that gates the signal from the bottom photodetector. The function $f(\cdot)$ is highly nonlinear and depends on the leakage resistances, but by inverting it and sending an input $f^{-1}(K_i)$ one can obtain the desired product. A simple extension of this circuit allows both K and x to be negative, at the cost of doubling the number of circuit elements.

CMOS photodetectors and reasonably short wires (e.g., about 10 μm in length) have a capacitance of several fF, so fJ/MAC seems to be a lower bound in the incoherent analog case. Whether this bound is reached in practice depends on the memory-access costs. The overall energy per MAC, $E_{mac}$, can be estimated with the following equation:

$$E_{mac} = E_{logic} + E_{pd} + \left(\frac{1}{F_x} + \frac{1}{F_K}\right)(E_{mem} + E_{mod} + E_{dac}) \quad (11)$$

The various energy costs are tabulated below in TABLE 5.

TABLE 5

Parameters in Eq. (11).

| Name | Description | Value (digital)‡ | Value (analog) | Notes |
|---|---|---|---|---|
| $E_{logic}$ | Logic gate | $(n/32)^2 \times$ pj | fJ | See Refs. |
| $E_{pd}$ | Photodetection* | $(n/32) \times 32$ fJ | fJ | fJ/bit |
| $E_{mem}$ | Memory read† (register) | $(n/32) \times$ pJ | (??) | 30 fJ/bit |
| $E_{mod}$ | Modulator | $(n/32) \times 32$ fJ | fJ | fJ/bit |
| $E_{dac}$ | DAC | 0 | pJ (??) | |
| $F_x, F_K$ | Fan-out for $x_{ij;m}$, $K_{ij;mn}$ | | | |

*Optical plus electrical (receiver) power. †Read from register file. Non-register local memory is 2-6 times larger. ‡n = number of bits.

Several factors make the analog approach more complicated. Process variations may make some transistors more responsive than other, leading to a non-uniform weighting function $f(K)$; this will need to be corrected for, perhaps by tuning the resistor values. Also, while the box/lattice convolution kernels which perform the optical fan-out in FIGS. 8 and 10 only needed to be specified approximately in a digital ONN, the signal should fan-out in a uniform manner for an analog ONN. Otherwise, the convolution function may become position-dependent, which could degrade performance (unless corrected). Put another way, the Fourier hologram image-quality requirements are higher in the analog case. This may reduce the hologram efficiency and may involve both amplitude and phase modulation, increasing system complexity.

3. Convolutional Neural Network Based on Fourier Optics

The ONN in Sec. 1 uses coherent (homodyne) detection to combine the weights and neuron activations, thus performing a matrix-vector multiplication to implement a fully-connected (FC) layer. However, convolutional (CONV) layers are used in many neural networks, especially in image processing. This section describes a modified ONN that uses combines Fourier optics and coherent detection to efficiently implement a CONV layer.

Convolutional Neural Networks

Convolutional neural networks are used to process data with structure, particularly images. For large feature vectors, convolutions are much faster than all-to-all matrix multiplications and have fewer degrees of freedom, which speeds up training.

In a convolutional network, the data is represented as a 3-dimensional (W×H×C) array: $x_{ij;m}$. Here (i,j) are the physical coordinates, while m is the channel index. Equivalently, one can view the data as a collection of C feature maps, each of dimension W×H. Each CONV layer convolves the feature-map array with a kernel $K_{kl;mn}$ to produce the synaptic inputs:

$$y_{ij;n} = \Sigma_{kl,n} K_{kl;mn} x_{i+k,j+l;n} \quad (12)$$

The kernel has a dimension $(K_x \times K_y \times C' \times C)$, giving the output the shape (W'×H'×C'), where W'=W $K_x$+1, H'=H $K_y$+1. A nonlinear function (e.g., sigmoid, ReLU, etc.) maps each y to the neuron activations: $x_{ij;m} = f(y_{ij;m})$. These are the feature-maps input to the next layer of the network.

For a single input and output channel, Eq. (12) is a simple convolution. However, the feature-maps in real neural networks have many channels, e.g., C, C'≫1. K acts as a matrix multiplication in the channel index m, and as a 2D convolution for the coordinate indexes (i,j).

In the deeper layers, the images are quite small, but involve a large number of channels (e.g., as in the AlexNet shown in FIG. 6B). The kernel matrix can be quite large, even though its dimension in (i,j)-space is only 3×3. Nevertheless, the matrices are extremely sparse (~1% of elements are nonzero) and very repetitive (each weight used ~280 times), so naively implementing the convolution as a dense matrix-vector multiplication is extremely inefficient (e.g., 118 GMAC vs. 1.08 GMAC) and the matrices (~0.5 TB total) may not fit into memory.

TABLE 6

Layers in AlexNet. Max pooling is done before FC1 to reduce 13 × 13 × 256 feature-vector to 6 × 6 × 256. Most of the weights are in the FC layers, while most of the MACs are in the CONV layers.

| Layer | Feature-map | (size) | Kernel | (size) | MACs |
|---|---|---|---|---|---|
| CONV1 | 227 × 227 × 3 | 150 k | 11 × 11 × 96 × 3 | 35 k | 105M |
| CONV2 | 55 × 55 × 96 | 290 k | 5 × 5 × 256 × 96 | 615 k | 448M |
| CONV3 | 27 × 27 × 256 | 186 k | 3 × 3 × 384 × 256 | 885 k | 150M |
| CONV4 | 13 × 13 × 384 | 65 k | 3 × 3 × 384 × 384 | 1.3M | 224M |
| CONV5 | 13 × 13 × 384 | 65 k | 3 × 3 × 256 × 384 | 885 k | 150M |
| FC1 | 6 × 6 × 256 | 9 k | 4096 × 9216 (FC) | 37M | 37M |
| FC2 | 4096 | 4 k | 4096 × 4096 (FC) | 16M | 16M |
| FC3 | 4096 | 4 k | 1000 × 4096 (FC) | 4M | 4M |

Several approaches can be taken to compute a convolution efficiently. One approach is to vectorize the kernel and convert the feature-map to a Toeplitz matrix (with redundant data). Another vectorization approach called patching has been implemented on GPUs and is amenable to all-optical computation with time-encoded data if delay lines are used, however, the total delay length needed is quite large and may not be practical in the near term.

Convolution via Fourier Optics

FIG. 12A illustrates a method 1200 for performing a convolution efficiently by Fourier transform. This is a common technique in signal processing and is particularly efficient for large kernels. It works in both discrete and continuous space. Define the convolution as:

$(A \otimes B)_i = \Sigma_j A_j B_{i+j}$ (discrete)

$[A \otimes B](x) = \int A(y) B(x+y) dy$ (continuous) \quad (13)

With the symmetric normalization for the Fourier transform ($\mathcal{F}^{-1}$ obtained by flipping the sign in the exponent) (1202)

$$\mathcal{F}[A]_k = \frac{1}{\sqrt{N}} \sum_l e^{2\pi i k l/N} A_l \text{(discrete)} \qquad (14)$$

$$\mathcal{F}[A]_k = \frac{1}{\sqrt{2\pi}} \int e^{ikx} A(x) dx \text{(continous)},$$

the convolution may be computed by an elementwise multiplication in Fourier space (1204) followed for an inverse Fourier transform (1206) back to real space:

$$A*\circledast B = \sqrt{N} \mathcal{F}^{-1}[\mathcal{F}_{(A)} * \mathcal{F}_{(B)}] \text{(discrete)}$$

$$A*\circledast B = \sqrt{2\pi} \mathcal{F}^{-1}[\mathcal{F}_{(A)} * \mathcal{F}_{(B)}] \text{(continuous)}$$

In the digital electronic domain, this process 1200 uses three fast Fourier transforms (FFTs). Since an FFT involves 0 (N log N) steps while a straightforward approach (banded matrix-vector multiply) involves 0 (NK) steps, the FFT is advantageous when the kernel is sufficiently large.

Optical diffraction in the Fraunhofer limit also implements a 2D Fourier transform. A convolution can be implemented by hard-coding the kernel with an SLM and using a pair of lenses to perform the Fourier transform, e.g., as shown in FIG. 9A. A 3D-printed "diffractive deep neural network" ($D^2NN$) based on this principle achieves reasonable performance for digit classification. However, filters of this sort only produce a single-channel convolution; scaling it to a large number or channels may be problematic. Moreover, the $D^2NN$ is hard-wired to solve one and only one problem. A modified $D^2NN$ using SLM's would be programmable, but the programming speed would be slow and anyways it is not clear that the architecture will work for deep CNN's which almost always have many channels (C>>1).

FIGS. 12B and 12C show a convolution (CONV) layer 1220 that implements a convolution using three Fourier transforms and a product with optically encoded weights and coherent detection. FIG. 12B shows how weights and feature maps are Fourier-transformed and the product $\tilde{K}_{kl}^* \tilde{x}_{kl}$ is detected in the Fourier plane. FIG. 12C shows how that product $(\tilde{K}_{kl}^* \tilde{x}_{kl})^*$ is Fourier-transformed and coherently detected in the image plane, producing the convolution $(\mathcal{F}^{-1}[\tilde{K}^*\tilde{x}])^*$. Like the $D^2NN$, this system uses the optical Fourier transform to perform the convolution. However, the weights are encoded optically and are thus tunable.

The CONV layer 1220 includes a coherent transceiver array 1230 in the image plane and a coherent transceiver array 1240 in the Fourier plane. The neurons reside on the image plane. A separate transmitter array 1250 (Weight Server) provides the kernel weights. A beam splitter 1270 and other optional optics (not shown) are arranged so that signals at the image-plane transceiver array 1230 and weight server 1250 are Fourier-transformed when they arrive at the Fourier-plane transceiver array 1240.

In the first step of the convolution, shown in FIG. 12B, the image-plane transceiver array 1230 and weight server 1250 fire. All transmitters fire simultaneously, producing the 2D Fourier transforms of the image and kernel that are detected by the Fourier-plane transceiver array 1240. For simplicity, suppose that the transceivers 1240 at the Fourier plane can distinguish between the weights and feature-map signals (they could come in at opposite angles to oppositely-oriented grating couplers, or pinhole arrays and appropriate imaging could be used to ensure the appropriate signals map to the appropriate gratings). Each pixel (transceiver 1240) in the Fourier plane measures the homodyne product $\tilde{K}_{kl}^* \tilde{x}_{kl}$. In this case, both real and imaginary components are stored (say by having two homodyne detectors per transceiver, 90 degrees out of phase, as shown in FIG. 13 and described below).

In the second step of the convolution, shown in FIG. 12C, the transceivers 1240 in the Fourier plane transmit the product $(\tilde{K}_{kl}^* \tilde{x}_{kl})^*$ back to the image plane. This product is produced using modulators and the real and imaginary parts stored in the first step of the convolution (FIG. 12B). Since the output at the Fourier plane is the conjugate of the desired field, the CONV layer 1220 does an inverse Fourier transform going back to the image plane. The homodyne signal relative to a local oscillator 1260 produces the desired convolution $K^*\circledast x$. Note that x and K are real and therefore the conjugate is irrelevant.

FIG. 13 shows a transceiver 1300 suitable for use in the Fourier-plane transceiver array 1240 of FIGS. 12B and 12C. In operation, the transceiver 1300 detects in-phase and quadrature components of input signals (e.g., elements of the Fourier-transformed input and kernel) and emits an output equal to the product of the input signals (e.g., the product of the Fourier-transformed input and kernel elements). Gratings 1302 and 1312 couple light to a first and second 1×2 beam splitters 1304 and 1314, respectively, via waveguides integrated into a photonic integrated circuit. Each beam splitter 1304, 1314 sends one output to a quadrature beam splitter 1308 and one output to an in-phase beam splitter 1318. A phase shifter 1306 shifts the phase of one input to the quadrature beam splitter 1308 by π/2. The quadrature and in-phase beam splitters 1308, 1318 combine these outputs for detection by respective differential detectors 1310, 1320. The outputs of the differential detectors 1310, 1320 drive respective modulators 1332, 1336, which modulate copies of a local oscillator (LO) beam from the LO 1270 in FIGS. 12B and 12C. Another phase shifter 1334 shifts the phase of the output of the quadrature modulator 1336 by π/2. The modulated LO beams are recombined and emitted through grating 1312 via a crossbar optical switch 1316.

Multiple Channels

The hidden layers of a convolutional neural network have relatively small image dimensions, but a very large number of channels, with the number of channels increasing deeper in the network. This feature of convolutional networks allows high-resolution spatial information to be collapsed into low-resolution "contextual" information enabling the detection of edges, polygons, and more complex features, such as faces.

Time Encoding

FIGS. 14A and 14B show time multiplexing schemes that can be used to encode channel information with the optics of FIGS. 12B, 12C, and 13. For a layer with C and C' input and output channels, respectively, there are a total of CC' Fourier transforms (on both signal and weights), in addition to CC' MACs at each Fourier-plane pixel. In this way, the Fourier-plane circuit obtains C' outputs $\Sigma_n \tilde{K}_{mn}^* \tilde{x}_n$. These outputs are then sent back to the image plane, performing inverse Fourier transforms one channel at a time, to obtain the multi-channel convolution in Eq. (12). Because this involves a total of CC' steps, each layer is a factor of CC' slower than the single-channel case, which is a very large factor ($10^4$-$10^5$) for the inner layers in convolutional networks.

This approach is also problematic because of the multiple read/write steps for each memory element. The problem exists regardless of whether the matrix is C-ordered, as in FIG. 14A, or Fortran-ordered, as in FIG. 14B. For C-ordering, each input x is read C' times, with one write step is needed per output (each pulse train is integrated until the end of the sequence and then read out). Conversely, Fortran ordering simplifies the input step (each modulator is set once for each $x_m$), but the readout to each memory is staggered and involves C writes per element. Accessing analog memory can be noisy because there is no error correction, and many reads/writes may lead to large errors. Conversely, accessing digital memory incurs DAC/ADC costs, which are 0 (pJ) per sample, which is may be prohibitive.

Frequency Encoding

FIGS. 15A and 15B illustrate encoding the channels in frequency rather than time. This scheme takes advantage of wavelength-division multiplexing (WDM) technology to avoid multiple read/write operations as in the time-encoded scheme. As shown in FIG. 15A, an image-plane client 1502 sends out C' identical pulses on each WDM channel, where the amplitudes of the pulses for each channel are the inputs $x_m$. A single memory read sets the modulator. Similarly, a weight generator 1504 encodes each matrix column $A_n$ in the corresponding ($n^{th}$) channel. As a result, the output at time-step m is $\Sigma_n \tilde{K}_{mn} \tilde{x}_n$; the summation is done for free in a homodyne detector 1506 and the memory is written to once.

One downside with frequency encoding is the added complexity of the WDM channels. For the deeper layers of AlexNet with C'=384, this is a very large number of channels, which may not be practical. However, existing WDM systems rely on fast modulators where the data rate per channel is 25 Gbps, so the channel spacing is usually ≳50 GHz. The C-band is 30 nm wide and accommodates 80 channels with 50 GHz spacing. By working at lower speeds (e.g., GHz), the C-band can accommodate more than 80 channels, e.g., using thermally stabilized high-Q filters.

FIG. 15B illustrates one way to realize a many-channel WDM on-chip. This uses a traditional WDM, such as an arrayed waveguide grating (AWG) or cascaded Mach-Zehnder filters 1552, to do the (de)multiplexing at coarse channels, while high-Q ring resonators 1554 provide the fine resolution. Each pixel (transceiver) has a separate WDM unit on each pixel, which may be practical for inner layers with hundreds of pixels.

Chromatic aberration presents a separate problem. The FFT performs the mapping $$A_k \to \frac{1}{\sqrt{N}} \sum_l e^{2\pi i k l/N} \qquad (17)$$

The maximum phase in the exponential is O(N), occurring when k=l=N−1. In optics, however, the phase is proportional to wavelength. If the wavelength is changed by Δλ, all phases in the optical FFT scale by $\phi \to (1+\Delta k/k)\phi \approx (1-\Delta\lambda/\lambda)\phi$. If the optical FFT has a phase tolerance of Δϕ, the tolerance on Δλ will be:

$$\frac{\Delta\lambda}{\lambda} \lesssim \frac{\Delta\phi}{N} \qquad (18)$$

Fortunately, N (the width/height of the image) is not that large. For an intermediate layer with N=27 and Δϕ=0.1, the wavelength tolerance is Δλ≲6 nm. This is about 1 THz, which is enough for several hundred channels, each spaced by a couple of GHz. Note the ≲ sign indicates there may be some O(1) factor here too.

Spatial Encoding

It is also possible to encode the data in spatial modes. However, the principle here is more subtle and care should be taken to prevent the Fourier transform from distorting or degrading the spatial encoding. To start, consider several facts about Fourier transforms.

The Fourier transform of a comb is a comb (a sum of evenly spaced delta functions). Of relevance here are the Fourier transforms of functions that are nearly comb-like, but not quite. To begin, recall two definitions: (1) a function $f(x)$ is nearly periodic with period L if $|f(x+L)-f(x)| \ll f(x)$ and (2) function $f(x)$ is a spike train with period L if $f(x) \approx 0$ for all x unless x≈mL for m∈$\mathbb{Z}$.

The Fourier transform of a spike-train function with period L is a nearly-periodic function with period 2π/L. To see why, consider a spike-train written as $f(x)=\Sigma_n f_n(x-nL)$, where $f_n(x) \approx 0$ unless $|x| \ll L$. Taking the Fourier transform of this spike-train yields:

$$\tilde{f}(k)=\Sigma_n e^{inkL}\tilde{f}_n(k) \qquad (19)$$

Since the $e^{inkL}$ term is periodic with period 2π/L (or fractions thereof), displacement by 2π/L gives $|\tilde{f}(k+2\pi/L)-\tilde{f}(k)|=\Sigma_n|\tilde{f}_n(k+2\pi/L)-\tilde{f}_n(k)|$. Now because each $f_n(x)$ is nonzero only for $|x| \ll L$, $\tilde{f}_k(k)$ is nearly periodic with period 2π/L, and therefore so is $\tilde{f}(k)$.

Similarly, the Fourier transform of a nearly-periodic function with period L is a spike-train function with period 2π/L. This is the converse to the Fourier transform of a spike-train function with period L being a nearly-periodic function with period 2π/L. To see why, recall that any continuous function can be written as a piecewise Fourier series:

$$f(x)=\Sigma_m e^{2\pi i m x/L} f_{m,n}, x\in[(n-½)L,(n+½)L] \qquad (20)$$

If $f(x)$ is nearly periodic, then $|f_{m,n}-f_{m,n+1}| \ll |f_{m,n}|$. With a little perturbation theory, one can trade the discrete $f_{m,n}$ for a continuous $f_m(x)$ that is slowly-varying, i.e. $|f_m(y)-f_m(x)| \ll |f_m(x)|$ if $|y-x| \leq L$. The Fourier transform of each summand of Eq. (20) is the convolution of a delta function δ(k−m(2πm/L)) and $\tilde{f}_m(k)$. The latter is highly concentrated around $|k|=0$. Thus $\tilde{f}(k)$ is a spike-train function with period 2π/L.

It follows from the above two points that the Fourier transform of a nearly-periodic spike-train is another nearly-periodic spike-train. A nearly-periodic spike train may be expressed as:

$$f(x)=\Sigma_{n=-\infty}^{+\infty} F(x-nL,nL) \qquad (21)$$

where F(x,y) (replaces $f_n(x-nL)$ above) is a continuous function that is sharply peaked around x=0 (F(x,y)≈0 unless $|x| \ll L$) and slowly-varying in y (F(x,y)≈F(x, y') for $|y-y'| \lesssim L$). The Fourier transform is:

$$\tilde{f}(k) = \frac{\sqrt{2\pi}}{L} \sum_n \tilde{F}\left(\frac{2\pi n}{L}, k-\frac{2\pi n}{L}\right) \qquad (22)$$

where $\tilde{F}(k_x, k_y)$ is the 2D Fourier transform of F(x,y). It is slowly-varying in $k_x$ and sharply peaked around $k_y=0$. As an aside, this technique of reducing the 1D Fourier transform of a slowly varying pulse train to a much smaller and more manageable 2D Fourier transform has unrelated applications in frequency-comb simulations, e.g., in extracting radio-frequency (RF) beat-note spectra of micro-combs or synchronously-pumped optical parametric oscillators (OPOs).

Additional math shows how the Fourier transform properties of spike trains can be used to perform a discrete Fourier transform (DFT) in the optical domain. FIG. 9A, described above, depicts the optical Fourier transform of a point source. A lensless transform is possible if the Fourier plane is in the far field. A lens brings the Fourier plane to the lens's focal plane as in FIG. 9A.

FIG. 16 illustrates an optical Fourier transform of a shifted source using a lens 904. In the paraxial approximation, the lens 904 imparts a phase shift $\Delta\phi = -k_0 \xi^2/2f + \text{const}$. For an emitter array at the left plane, calculating the pattern at the right plane is a straightforward exercise with path integrals; the result is:

$$E'(x') \propto \int E(x) e^{2\pi i x x'/\lambda f} dx \tag{23}$$

This is the optical Fourier transform.

FIG. 17 shows an optical system 1720 that converts this optical Fourier transform into a discrete Fourier transform. This system 1720 has consider transceivers 1730 and transceivers (pixels) 1740 located at discrete, evenly-spaced points in the image plane and Fourier plane, respectively: $x'_k = \sqrt{\lambda f/N} k$, $x_l = \sqrt{\lambda f/N} l$. A beam splitter 1760 combines pulses from the image-plane transceivers 1730 with light from weight-server emitters 1750, which are also located in an image plane. In this system 1720, Eq. (23) reduces to the canonical form Eq. (14).

Each transceiver 1740 in the Fourier plane is composed of sub-pixels 1742. There are C' sub-pixels 1742 per transceiver 1740, one for each output channel. The following derivation is for a 1D detector array, but 2D is a straightforward extension. Suppose that the sub-pixels 1742 are evenly spaced with positions $x'_{k;m} = (k+m/C')s$, where $s = \sqrt{\lambda f/N}$. The field from the neuron inputs $x_{l;n}$ is:

$$E'(x'_{k;m})|_{neurons} \propto \frac{1}{\sqrt{N}} \sum_l e^{2\pi i(k+m/C')l} x_{l;n}$$

The channels are piped in one at a time, so the $n^{th}$ input channel arrives at time-step n. At time-step n, the field from the weight-server emitters 1750 takes the form:

$$E'(x'_{k;m})\Big|_{weights} \equiv \hat{K}_{k;mn} \equiv \sum_l e^{2\pi i(k+m/C')l} K_{l;mn}$$

(Note the subtle difference between $\hat{K}$ and the Fourier transform Eq. (14).) The convolution kernel K is much smaller than the image. As a result, its Fourier transform is relatively smooth: $\tilde{K}_{k;mn} \approx \tilde{K}_{k+1;mn}$. This means that, for a given sub-pixel index m, the input field from the weight-server emitters 1750 is also slowly varying; therefore $E'(x')|_{weights}$ is a nearly periodic function in the sense described above. As a result, the output at the weight server $E(x)|_{weights}$ takes the form of a spike train. In particular, for C' sub-pixels 1742 per pixel 1740, the weight server's outputs C' clusters of $K_x$, spaced every N pixels, where N and $K_x$ are the sizes of the image and kernel, and $N \gg K_x$.

In total, the weight server 1750 has $C'K_x$ independent outputs in each time-step, for $CC'K_x$ total. This is the total number of weights for a (1D) kernel, giving enough degrees of freedom to make it work. There is a Fourier-series relation between the weight-server outputs and the desired weights (e.g., Eq. 19), but this can be pre-computed.

After C time steps, the (conjugated) heterodyne output from Eqs. (24) and (25) gives the quantity:

$$\Sigma_{l;n} e^{-2\pi i(k+m/c')l} (\hat{K}_{k;mn}^* x_{l;n})^* \tag{26}$$

This has an extra m/C' term. This extra term can be eliminated by performing a proper inverse Fourier transform. Recall that in step 2 of the optical Fourier transform (shown in FIG. 12C), the pixels 1740 in the Fourier plane fire and the result is read out by the image-plane transceivers 1730. This time, each channel fires one at a time, from each sub-pixel 1742. So, on time-step m, all of the sub-pixels $x'_{k;m}$ fire, producing the following output at the image plane:

$$E(x_j) \propto \sum_{kl;n} e^{2\pi i(k+m/C')j} e^{-2\pi i(k+m/C')l} (\hat{K}_{k;mn}^* x_{l;n})^* \propto \tag{27}$$
$$\sum_{klp;n} e^{2\pi i(k+m/C')j} e^{-2\pi i(k+m/C')l} e^{2\pi i(k+m/C')p} (K_{p;mn}^* x_{l;n})^* \propto$$
$$\left(\sum_{p;n} K_{p;mn}^* x_{j+p;n}\right)^*$$

The final step of Eq. (27) uses the identity $$\Sigma_{k=0}^{N-1} e^{2\pi i(k+\xi)l/N} = N\delta_{l,0} \tag{28}$$

which holds for all $\xi$ (the case $\xi=0$ is the traditional DFT).

Recall that in the original FC optical neural network, the neurons fired sequentially, and their signals were broadcast to the neurons of the next layer and then weighted. In the present scheme, each channel fires sequentially, but the neurons fire simultaneously. In the Fourier plane, within each pixel 1740, the channel output n at wave-vector k is likewise broadcast to all m sub-pixels 1742, corresponding to the output channels. C steps implement a C'×C FC matrix-vector multiplication at every point in k-space. Looking inside each pixel 1740, the operational principle of this CONV unit is the same as the original FC unit. The tricky part was to decorate the input and output with Fourier optics to convert this FC problem (technically block-diagonal FC, one block for each pixel 1740) into a convolutional problem.

TABLE 7 summarizes the three channel-encoding schemes from this section. Time-encoding is the simplest but is slowest and requires a large number or reads or writes, which may lead to signal degradation in analog and/or higher energy costs. Frequency encoding is an elegant solution, but requires many modes and WDM elements, and suffers from chromatic aberration in the Fourier transform (which is intrinsically chromatic), limiting its bandwidth. Spatial encoding achieves the same performance as frequency encoding but uses multiple sub-pixel detectors (and transmitters) per pixel. But it has no other apparent defects, so it may be the way to go. Hybrids are also possible.

TABLE 7

Different channel-encoding methods

| | Time steps | Complexity | |
|---|---|---|---|
| Time | (Sec. 3.4) | CC' | Multiple reads/writes per (analog) memory. |
| Frequency | (Sec. 3.5) | C' | C WDM channels. Separate WDM per pixel. |
| Space | (Sec. 3.6) | C | C' sub-pixels per pixel. |

4. Realizing Optical CNNs without Fourier Optics

Many deep neural networks make extensive use of convolutional layers. The original homodyne-optical approach was designed for fully-connected networks (Sec. 1) and thus not well-suited to the convolutional case; however, a clever use of Fourier optics could realize the convolution with optically-encoded weights (Sec. 3). However, that scheme involves simultaneous measurement of both quadratures (heterodyne detection), as well as (possibly) co-integration of sources and detectors. Finally, the math of the spatial channel multiplexing (sub-pixels) was quite involved. An easier scheme implemented the digital neural network with optical fan-out via Fourier holography (Sec. 2). However, the phases of Fourier holograms are generally scrambled, making coherent detection problematic in this digital optical neural network. Fortunately, it is possible to realize an optical CNN in a coherent mode without the Fourier optics of Sec. 3 using many of the optical fan-out components from Sec. 2. In this type of optical CNN, Fourier optics can be used to fan out optical-domain data but are not used for the convolution itself.

Row-Column Method

FIG. 18 illustrates a row-column method 1800 for computing a convolution. The image is zero-padded on the right and bottom with $K_x-1$ and $K_y-1$ entries so that any 2D convolution (with shifts $\Delta x, \Delta y$) on the image is equivalent to a 1D convolution on the padded, serialized array (with shift $\Delta x+W\Delta y$ if the array is C-ordered).

The input is an array of dimension W×H×C (1802). The channels are sent in one at a time over a total of C time steps. In time step l, the $l^{th}$ channel is zero-padded and serialized (1804) and transmitted as a vertical array of beams (e.g., using Rui's fan-out circuit with fast modulators, arranging the couplers on a line). This signal passes through an optical fan-out circuit like the one shown in FIG. 9A. The kernel to this fan-out has C' blocks (one per output channel), each with $K_xK_y$ points. These points are equally spaced in x, and their y displacements correspond to the different convolution shifts.

The kernel is a $K_x \times K_y \times C' \times C$ array (1812). Like the input (1802), the kernel is loop over the input channel index over C time steps. In time step l, the kernel of the $l^{th}$ channel (dimension $K_x \times K_y \times C'$) is sent in as a horizontal line of pixels (1814), from a similar device (e.g., grating array or edge coupler array). The line is divided into C' blocks, each of size $K_xK_y$. This is fanned out in the vertical direction giving approximately $(W+K_x)(H+K_y)$ copies of the $l^{th}$ channel of the kernel, one on each row (1816).

Finally, the kernel and image outputs are combined onto a photodetector array (1820). Since the photodetector array only needs to collect light (unlike the photodetectors coupled to logic in Sec. 3), this photodetector array can be very slow, simple, compact, cheap, and high-resolution. Reading out the photodetector array twice with opposite phases makes it possible to compute the homodyne signal, which gives the product between the fields (assuming the phases are controlled for).

The photodetector array has dimension $(K_xK_yC') \times (W'H')$. Each row corresponds to a pair of image coordinates $y \leftrightarrow (i,j)$ (there are W'H' rows for an image of size W'×H'). The columns are grouped into C' blocks for the channels, and each block containing $K_xK_y$ columns which can be indexed by coordinates (i'<$K_x$, j'<$K_y$). Thus, each point on the grid can be uniquely assigned five indices (i, i', j, j', k). The homodyne signal is:

$$z_{ij,i'j',k}=K_{ij',kl}x_{i+i',j+j',l} \qquad (29)$$

Read-out circuitry integrates the photocurrent over all C input channels. This sums over l. Next, within each block, the photocurrents in each row are summed (light-blue box in figure). This sums over (i', j'). At the end, one obtains:

$$y_{ij,k}=\Sigma_{i'j'l}z_{ij,ij',k}=\Sigma_{i'j'l}K_{ij',kl}x_{i+i',j+j',l} \qquad (30)$$

This is exactly the desired convolution function.

One potential problem with this scheme is achieving the desired phase relation between image and kernel. Recall that the image data is fanned out with Fourier holography. The fan-out kernel for the Fourier hologram includes an array of dots with equal amplitude and different phases. Since there is one dot per column, the phase is column-dependent and is denoted $\phi_x$ (see FIG. 18). The same problem occurs with the kernel fan-out. Here the fan-out is in the vertical direction, and each dot on the fan-out kernel also has its own phase, denoted $\phi_y$. Without any phase correction, the actual photocurrent is $y_{ij,k}=\Sigma_{i'j'l}$ Re $[K_{ij',kl}x_{i+i',j+j',l}e^{i(\phi_x-\phi_y)}]$. Since the kernel and image are real-valued, it might be possible to compensate this by rescaling the photocurrents by $\cos(\phi_x-\phi_y)^{-1}$; however, this would involve lots of extra computation and could be problematic if $\phi_x-\phi_y \approx \pi/2$ and the scaling factor is very large.

Another way to fix this problem is to correct the phase $\phi_x$ optically using an optical phase shifter before each grating coupler to apply a phase $\psi_x=\phi_x$ to the kernel outputs (FIG. 18). Applying a 2D phase mask $\psi_y=\phi_y$ to the kernel output after fan-out compensate $\phi_y$. The pattern of the dots, and therefore $\phi_x$, for the image fan-out depends on the convolution parameters C', $K_x$ and $K_y$; therefore, the phases $\psi_x$ should be tunable. However, the fan-out for the kernel is always the same, so the phase mask $\psi_y$ may be static (fixed) and can be implemented with a printed element or cylindrical lens rather than an SLM.

Displaced Image Method

FIG. 19 illustrates a displaced image method 1900 for computing a convolution. As before, the goal is to compute $y_{ij,k}$ (dimension W'×H'×C) from input $x_{ij,l}$ (dimension W×H× C) (1902). As in the row-column method 1800 in FIG. 18, following Eq. (30), the displaced image method 1900 first iterates over the input channel index l (C channels in all). For each channel, the method 1900 iterates over the $K_xK_y$ displacements performed for the convolution. Each displacement is represented by a unique index pair (i',j') in Eq. (30) (1904). The displaced image has W×H pixels, with a focused spot at the center of each pixel. There is enough space between the spots that each pixel can be fanned out to C' identical sub-pixels without overlap (1906). This image is sent to the detector array.

Simultaneously, for each channel, the displaced image method 1900 iterates over the (i',j') indices of the kernel (1912). For a particular index pair (i',j'), the kernel $K_{ij',kl}$ has C' elements (denoted by index k, the other indices fixed); these elements are encoded onto the sub-pixels of the center pixel (1914). A Fourier hologram fans this out with equal intensity to all pixels of the image (1916). This kernel is interfered with the image on the detector array, computing the homodyne product (1920).

The photodetector array has $(W+K_x-1)(H+K_y-1)$ pixels, with C' sub-pixel detectors per pixel. Each detector reads out the convolution $y_{ij,k}$, where (i,j) are the (pixel) coordinates and k is the sub-pixel index.

As before, the fan-out phases $\phi_{ij}$ and $\phi_k$ should be corrected so that the signals interfere correctly at the detector array. Fortunately, this can be done by placing phase modulators before every grating coupler at the transmitter chips for the image and kernel. These are denoted in FIG. 19 as $\psi_i$;

and $\psi_k$, respectively. If $\psi_{ij}=\phi_{ij}$ and $\psi_k=\phi_k$, the fan-out phases are compensated for and the detector array computes the product in Eq. (30).

Convolution Processor

FIG. 20 illustrates a processor 2000 for computing a convolution using the row-column method of FIG. 18 or the displaced image method of FIG. 19. The processor 2000 includes an image transmitter array 2002, like the transmitter array in FIG. 5B, that pads and serializes image data 2001 in the row-column method or displaces image data 2001 in the displaced image method. The image transmitter array 2002 does this by modulating an electrical-domain representation of the image data 2001 onto many copies of an optical pulse train to produce optical image data 2003.

The processor 2000 includes a first $4f$ optical system 2010 that displaces and fans out the optical image data 2003 in the row-column method or fans out the optical image data 2003 in the displaced image method. More specifically, the first $4f$ optical system 2010 has a first lens 2012 that spatially Fourier transforms the optical image data 2003. A first SLM 2014 in the Fourier plane (the focal plane of the first lens 2012) spatially phase modulates the Fourier-transformed optical image data; the result is spatially Fourier transformed by a second lens 2016 to produce a desired spatial shift at the output of the first $4f$ optical system 2010.

A kernel transmitter array 2052 serializes kernel data (weights) 2051 in the row-column method or displaces the kernel data 2051 in the displaced image method. The kernel transmitter array 2052 does this by modulating an electrical-domain representation of the image data 2051 onto many copies of an optical pulse train to produce optical kernel data 2053. This optical pulse train is coherent with the optical pulse train used to drive the image transmitter array 2002. Both optical pulse trains may be produced by the same source, such as a pulsed laser whose output is split by a beam splitter.

A second $4f$ optical system 2060 displaces and fans out the optical kernel data 2053 in the row-column method or fans out the optical kernel data 2053 in the displaced image method. Like the first $4f$ optical system 2010, the second $4f$ optical system has a first lens 2062 that spatially Fourier transforms the optical kernel data 2053. A second SLM 2064 in the Fourier plane (the focal plane of the first lens 2062) spatially phase modulates the Fourier-transformed optical kernel data, and the result is spatially Fourier transformed by a second lens 2066 to produce a desired spatial shift at the output of the second $4f$ optical system 2060.

A mirror 2070 reflects the output of the second $4f$ optical system 2060 to a beam splitter 2020 that combines the outputs of the first $4f$ optical system 2010 and the second $4f$ optical system 2060. A detector array 2090 senses combined output, which is a convolution of the image data 2001 and the kernel data 2051. When implementing the row-column method, a 2D phase mask 2084 in an image plane of the output of the second $4f$ optical system 2060 applies a 2D phase modulation $\psi_y = -\phi_y$ to the kernel output after fan-out to compensate for the row-dependent phase $\phi_y$. When implementing the displaced image method, this 2D phase mask 2084 may be omitted in favor of phase modulators in the image transmitter array 2002 and kernel transmitter array 2052 that apply fan-out phases $\phi_{ij}$ and $\phi_k$, respectively, the signals interfere correctly at the detector array 2090.

Resource Consumption

These neural network architectures can be compared by looking at how they perform on certain resource metrics. These metrics include (1) number of time steps, (2) number of transmitters and detectors, and (3) input- and kernel-fanout. TABLE 8 compares these figures for the Fourier-transform ONN (Sec. 3), row-column method, and displaced image method, and electronics. Since all of these schemes send the input channels are sequentially, the number of time steps is a multiple of C. However, the displaced image method displaces the image $K_xK_y$ times, so it performs $CK_xK_y$ steps, as does the standard electronic process.

TABLE 8

Resource consumption of different neural network architectures including electronics, the Fourier-Transform optical neural network (FT-ONN), the Row-Column (RC) method, and the Displaced Image (DI) method. Assuming stride of 1 with W' = W, H = H. †FT-ONN has 2 steps with fan-out $C'K_xK_y$ per step.

|  | Electronics | FT-ONN (Sec. 3) | RC Method (Sec. 4.1) | DI Method (Sec. 4.2) |
| --- | --- | --- | --- | --- |
| Time steps | $\geq CK_xK_y$ | 2 C | C | $CK_xK_y$ |
| Input transmitters | — | 2 W'H' | W'H' | W'H' |
| Kernel transmitters | — | $C'K_xK_y$ | $C'K_xK_y$ | $K_xK_y$ |
| Detectors $N_{det}$ | — | 2 W'H'C' | W'H'C'$K_xK_y$ | W'H'C' |
| Detectors/output | — | 2 | $K_xK_y$ | 1 |
| Input reads | W'H'C'$CK_xK_y$ | 2 W'H'C | 2 W'H'C | W'H'C'$K_xK_y$ |
| Input fan-out $F_{in}$ | — | 1/2 $C'CK_xK_y$† | $C'K_xK_y$ | C' |
| Kernel reads | W'H'C'$CK_xK_y$ | 2 $C'CK_xK_y$ | $C'CK_xK_y$ | $C'CK_xK_y$ |
| Kernel fan-out $F_{ker}$ | — | 1/2 W'H'† | W'H' | W'H' |
| Complexity | — | Optical FT | Extra detectors | Image shifting |

TABLE 8 shows that there is a tradeoff between spatial and temporal complexity. The row-column method uses C time steps, but it uses $K_xK_y$ detectors per output, while the displaced image method uses one detector per output. The product between the number of time-steps and the number of detectors is conserved ($N_{step}N_{det}$=W'H'C'$CK_xK_y$), consistent with the fact that both of these networks are performing the convolution in the conventional way, which involves W'H'C'$CK_xK_y$ MACs. Without wavelength multiplexing, each detector performs one MAC per time step. However, with the aid of a Fourier transform, the convolution uses just W'H'C'C MACs plus three FT's. As a result, the FT-ONN is more efficient than the row-column and displaced image methods with $N_{step}N_{det}$=2 W'H'C'C (the factor of 2 comes from the need for detectors at both image plane and Fourier plane). However, the FT-ONN also uses an optical Fourier transform.

Detector count is significant because the pixel count of the camera limits the size of images used in the row-column method much more severely than the displaced image method, especially for large kernels, and because each pixel has finite size and thus finite capacitance. Suppose each detector uses an energy $E_{det}$ to get a reasonable readout SNR. In the displaced image method, the optical energy per output is thus $\geq E_{det}$. But in the row-column method, each output is the average of $K_x K_y$ detectors, giving an energy $\geq K_x K_y E_{det}$. This may be significant depending on how large $E_{det}$ is. The optical energy bound per MAC for sufficient detector charging will be:

$$E_{opt} = \frac{N_{det}}{W'H'C'CK_xK_y} E_{det} \tag{31}$$

Another factor is input- and kernel-fanout ($F_{in}$, $F_{ker}$). Since memory reads dominate energy consumption in digital neural networks, a significant savings can be obtained by reading the memory once and fanning the result out to many detectors. Let $E_{tr}$ be the total transmitter energy, including the memory read, conversion to analog, and the electrical cost of driving a modulator. Then the electrical energy per MAC is:

$$E_{el} = \left(\frac{1}{F_{in}} + \frac{1}{F_{ker}}\right) E_{tr} \tag{32}$$

The total energy per MAC is $E_{mac} = E_{el} + \eta^{-1} E_{opt}$, where $\eta$ is the product of various efficiencies—detector, modulator, lightsource, etc.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical neural network comprising:
a first optical fan-out element to produce M copies of N optical weight signals;
a second optical fan-out element to create N copies of M optical input signals;
a two-dimensional array of homodyne receivers, in optical communication with the first optical fan-out element and the second optical fan-out element, to produce electronic signals representing interference of each of the N copies of the M optical input signals with a corresponding copy of the M copies of the N optical weight signals;
electronic circuitry, operably coupled to the two-dimensional array of homodyne receivers, to apply a nonlinear function to the electronic signals; and
a light source, operably coupled to the electronic circuitry, to emit an optical output signal representing a matrix multiplication of the M optical input signals with the N optical weight signals,
wherein M and N are positive integers.

2. The optical neural network of claim 1, wherein the first optical fan-out element, the second optical fan-out element, the two-dimensional array of homodyne receivers, the electronic circuitry, and the light source form a convolutional layer in a series of layers in the optical neural network.

3. The optical neural network of claim 2, wherein the series of layers comprises additional convolutional layers and at least one fully connected layer.

4. The optical neural network in claim 2, further comprising:
another series of layers to compute a matrix multiplication of the N optical weight signals with another M optical input signals.

5. The optical neural network of claim 1, wherein N is about 1,000 to about 10,000,000.

6. The optical neural network of claim 1, wherein the N copies of the M optical input signals propagate in free space between the second optical fan-out element and the two-dimensional array of homodyne receivers.

7. The optical neural network of claim 1, wherein each optical input signal encodes a vector of length N and each corresponding optical weight signal represents a row of a weight matrix.

8. The optical neural network of claim 1, wherein each homodyne receiver in the two-dimensional array of homodyne receivers comprises:
a two-port beam splitter to interfere the copy of the corresponding optical input signal and the corresponding optical weight signal; and
a differential detector, in optical communication with the two-port beam splitter, to detect light emitted by outputs of the two-port beam splitter.

9. The optical neural network of claim 1, wherein the electronic circuitry comprises:
an array of analog-to-digital converters (ADCs), each ADC in the array of ADCs operably coupled to a corresponding homodyne receiver in the two-dimensional array of homodyne receivers comprises and configured to digitize the electronic signal emitted by the corresponding homodyne receiver; and
digital logic, operably coupled to the array of ADCs, to apply the nonlinear function to the electronic signals from the array of ADCs; and
an array of digital-to-analog converters (DACs), operably coupled to the digital logic and the light source, to convert the electronic signals into analog signals for modulating the light source.

10. The optical neural network in claim 1, further comprising:
an array of optical modulators to modulate copies of an optical pulse train with weights representing a corresponding row in a weight matrix to produce the N optical weight signals.

11. The optical neural network in claim 1, further comprising:
a beam splitter, in optical communication with the first optical fan-out element and the second optical fan-out element, to combine each of the N copies of the M optical input signals with the corresponding copy of the M copies of the N optical weight signals.

12. A method of computing an output of a layer of an optical neural network, the method comprising:
producing N optical weight signals, where N is a positive integer;
producing M copies of the N optical weight signals, where M is a positive integer;
creating N copies of M optical input signals;
transducing, with an array of homodyne receivers, interference of each of the N copies of the M optical input signals with a corresponding copy of the M copies of the N optical weight signals into electronic signals;
applying a nonlinear function to the electronic signals; and
emitting an optical output signal representing a matrix multiplication of the M optical input signals with the N optical weight signals.

13. The method of claim 12, wherein the layer is a convolutional layer in the optical neural network.

14. The method of claim 12, further comprising:
computing a matrix multiplication of the N optical weight signals with another M optical input signals.

15. The method of claim 12, wherein the N copies of the M optical input signals propagate in free space to the array of homodyne receivers.

16. The method of claim 12, wherein each optical input signal encodes a vector of length N and each corresponding optical weight signal represents a row of a weight matrix.

17. A convolutional layer for a coherent optical neural network, the convolutional layer comprising:
an image-plane transceiver array to emit an array of input signals;
a weight server transmitter array to emit an array of weight signals;
a beam splitter, in optical communication with the image-plane transceiver array and the weight server transmitter array, to combine the array of input signals with the array of weight signals; and
a Fourier-plane transceiver array, in a Fourier plane of the image-plane transceiver array and in optical communication with the beam splitter, to detect a homodyne product of a spatial Fourier transform of the array of input signals and a spatial Fourier transform of the array of weight signals.

18. The convolutional layer of claim 17, wherein the Fourier-plane transceiver array is configured to emit an array of product signals representing the homodyne product of the spatial Fourier transform of the array of input signals and the spatial Fourier transform of the array of weight signals and the image-plane transceiver array is configured to coherently detect a spatial Fourier transform of the array of product signals.

19. The convolutional layer of claim 17, wherein each transceiver in the Fourier-plane transceiver array is configured to detect an in-phase component and a quadrature component of the product of the spatial Fourier transform of the array of input signals and the spatial Fourier transform of the array of weight signals.

20. The convolutional layer of claim 17, wherein each transceiver in the Fourier-plane transceiver array comprises at least one detector element per output channel of the convolutional layer.

21. A method for fanning out data in a digital optical neural network, the method comprising:
for each image in a set of images, the set of images representing an input to a layer in the digital optical neural network,
breaking the image into a set of patches, each patch in the set of patches comprising $K_x \times K_y$ pixels; and
for each patch in the set of patches,
spatially convolving the patch with a box function;
spatially convolving a corresponding kernel with a size of $K_x \times K_y$, with a lattice function having a horizontal lattice spacing of $K_x$ and a vertical lattice spacing of $K_y$; and
imaging the patch and the corresponding kernel onto a detector array.

* * * * *